(12) United States Patent
Moffat et al.

(10) Patent No.: US 11,440,625 B2
(45) Date of Patent: Sep. 13, 2022

(54) WIND-POWERED COMPUTING BUOY

(71) Applicant: Lone Gull Holdings, Ltd., Portland, OR (US)

(72) Inventors: Brian Lee Moffat, Portland, OR (US); Garth Alexander Sheldon-Coulson, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 232 days.

(21) Appl. No.: 16/803,927

(22) Filed: Feb. 27, 2020

(65) Prior Publication Data

US 2020/0207446 A1 Jul. 2, 2020

Related U.S. Application Data

(63) Continuation of application No. 16/256,764, filed on Jan. 24, 2019, now Pat. No. 10,583,898.

(60) Provisional application No. 62/622,879, filed on Jan. 27, 2018.

(51) Int. Cl.
| | |
|---|---|
| *B63B 22/00* | (2006.01) |
| *B63B 35/44* | (2006.01) |
| *G06N 3/08* | (2006.01) |
| *H04L 9/06* | (2006.01) |

(52) U.S. Cl.
CPC .............. *B63B 22/00* (2013.01); *B63B 35/44* (2013.01); *G06N 3/08* (2013.01); *H04L 9/0643* (2013.01); *B63B 2022/006* (2013.01); *B63B 2035/446* (2013.01); *H04L 2209/38* (2013.01)

(58) Field of Classification Search
CPC ... B63B 22/00; B63B 35/44; B63B 2022/006; G06N 3/08; H04L 9/0643
See application file for complete search history.

(56) References Cited

U.S. PATENT DOCUMENTS

| | | | |
|---|---|---|---|
| 10,473,083 B2 * | 11/2019 | Sheldon-Coulson | ........................ F03B 13/148 |
| 2006/0162642 A1 * | 7/2006 | Morse | ........................ F03D 9/32 114/382 |
| 2019/0016419 A1 * | 1/2019 | Sheldon-Coulson | ........................ F03B 13/183 |

* cited by examiner

*Primary Examiner* — Manuel A Rivera Vargas
(74) *Attorney, Agent, or Firm* — Fulwider Patton LLP

(57) ABSTRACT

Disclosed is a novel type of computing apparatus which is integrated within a buoy that obtains the energy required to power its computing operations from winds that travel across the surface of the body of water on which the buoy floats. Additionally, these self-powered computing buoys utilize their close proximity to a body of water in order to significantly lower the cost and complexity of cooling their computing circuits. Computing tasks of an arbitrary nature are supported, as is the incorporation and/or utilization of computing circuits specialized for the execution of specific types of computing tasks. And, each buoy's receipt of a computational task, and its return of a computational result, may be accomplished through the transmission of data across satellite links, fiber optic cables, LAN cables, radio, modulated light, microwaves, and/or any other channel, link, connection, and/or network.

59 Claims, 51 Drawing Sheets

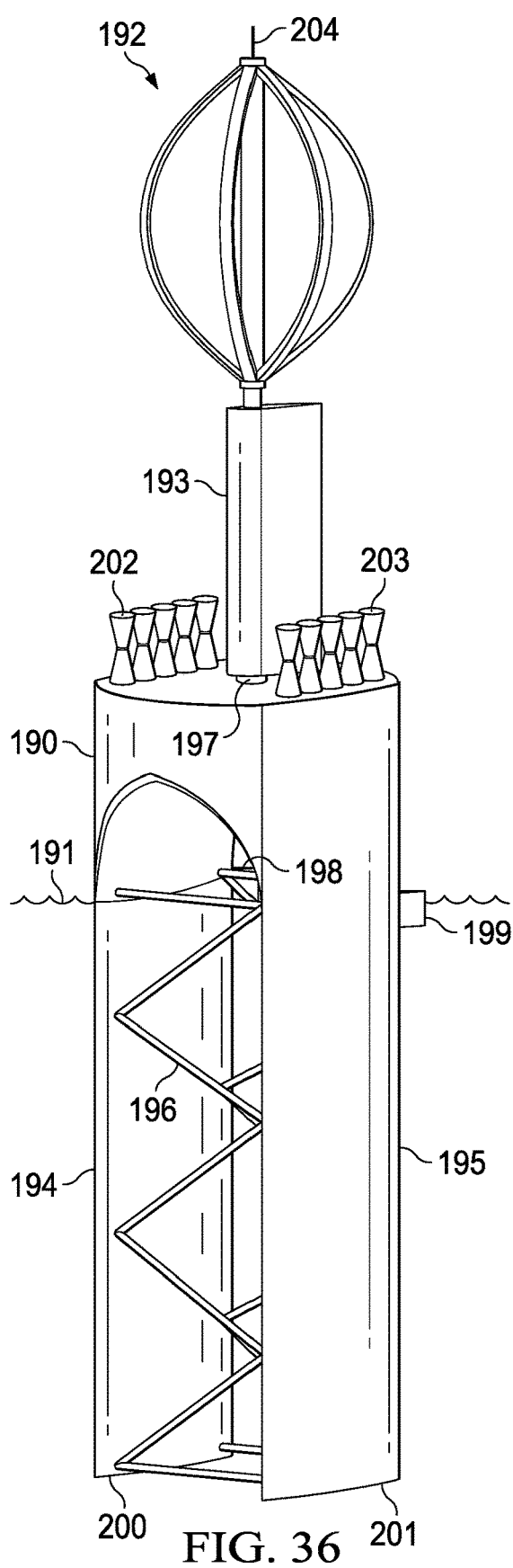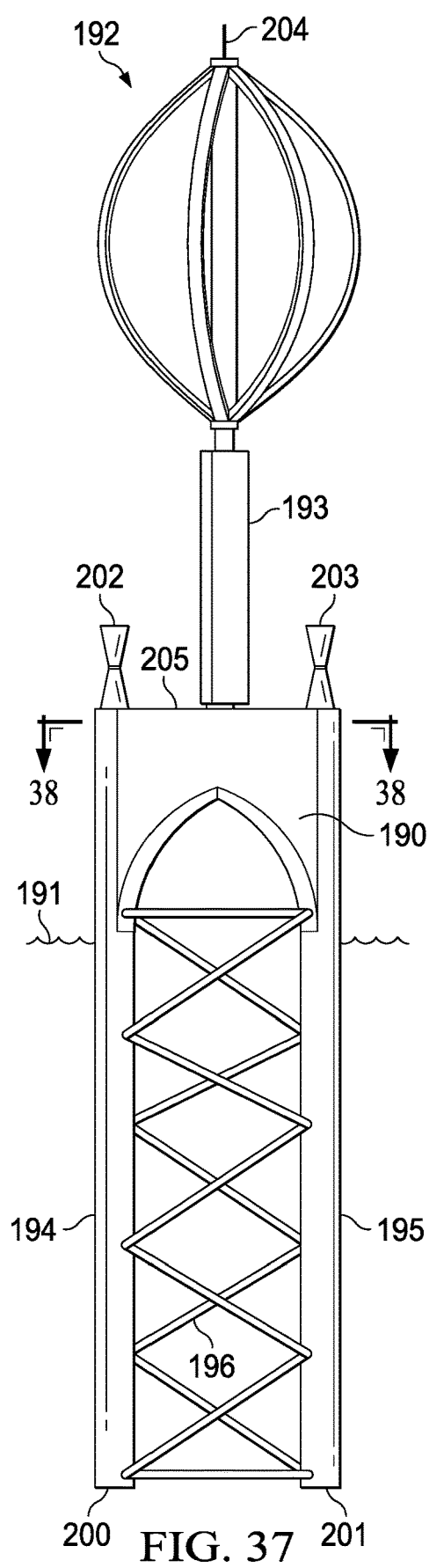
FIG. 36
FIG. 37

WIND-POWERED COMPUTING BUOY

CROSS-REFERENCES TO RELATED APPLICATIONS

This is a continuation application based on U.S. Ser. No. 16/256,764, filed Jan. 24, 2019 which claims priority from U.S. Application No. 62/622,879, filed Jan. 27, 2018 incorporated by reference in its entirety.

BACKGROUND

Large-scale computing currently has at least two significant limitations and/or drawbacks, each of which is ameliorated by the current disclosure.

1) Computers require electrical power in order to operate and perform their calculations. Some of the power energizes CPUs, GPUs, and/or TPUs. Some of it energizes the random-access memory. Some energizes shared and/or more persistent memory (e.g. hard disks). Some energizes switches, routers, and other equipment supporting network connections between computers.

As society's reliance on computers and computing increases, the portion of the world's energy budget that is consumed by computers and computing also increases. By some estimates, computers and computing currently consume approximately 2% of the world's total energy budget, and are predicted to consume approximately 25% of the world's electrical power by 2040. And, 2) Computers generate heat. Most (if not all) of the electrical power used to energize computers is converted to, and/or lost as, heat from the circuits and components that execute the respective computational tasks. The heat generated by computers can raise the temperatures of computers to levels that can cause those computers to make errors or fail, especially when the computers are located in close proximity to one another. Because of this, computers, and/or the environments in which they operate, must be cooled. And, cooling, e.g. through air conditioners and/or air conditioning, requires and/or consumes significant electrical power, in addition to the electrical power used to energize the computers (and generate the heat that must then be removed).

SUMMARY OF THE INVENTION

The apparatus disclosed herein locates and/or compartmentalizes computers within a buoy floating adjacent to the surface of a body of water. This buoy extracts power from winds flowing, moving, and/or blowing, across and/or over that body of water, thereby converting wind energy into electrical energy. The majority of the extracted electrical power is used to energize the buoy's cluster(s) of computers. The resulting heat generated by the computers is transmitted (e.g. passively and/or conductively) to the water on which the buoy floats.

The current disclosure offers many advantages, including, but not limited to:

1) Efficient Utilization of Wind Energy

If the electrical power generated by a wind-energy converting buoy is to be transmitted to land, e.g. where it might be added to an electrical grid, then that power must have a channel, method, and/or means, with which to do so. Many developers and/or deployers of wind energy devices use, or anticipate using, subsea electrical power cables to transmit power generated by anchored farms of their devices to shore. However, these cables are expensive. Their deployment (e.g. their burial in the seafloor) is also expensive. And, the anchoring and/or mooring of a farm of buoys (i.e. wind energy devices) is problematic, since storms and other infrequent but violent sea conditions are adept at dislodging buoys from their moorings.

The current disclosure allows floating wind energy devices to make good use of the electrical power that they generate without transmitting it to land.

While the current disclosure does not preclude the anchoring of the disclosed devices, it nevertheless allows floating wind energy devices to make good use of the electrical power that they generate without the requirement of being anchored and/or moored to the seafloor.

2) Efficient Scaling of Computing

By sequestering clusters of computers within independent buoys, the numbers of computers (i.e. the numbers of clusters) can be scaled with relative ease, e.g. there are no obvious nonlinear barriers, costs, and/or consequences, associated with a linear increase in the numbers of such sequestered clusters of computers made available for the processing of computing tasks.

The energy efficiency of interconnected sets of collocated computers can be discussed in terms of "power usage effectiveness" or "PUE."

PUE=(Total Computing Facility Power)/(Total Computing Equipment Power)

Because large terrestrial clusters of computers require the expenditure of energy not just for the computers themselves, and the computing they execute, but also for requirements such as: cooling, lighting, environmental considerations for staff, etc., their PUEs are typically estimated to be about 1.2. An ideal PUE would be 1.0, which would mean that all electrical power consumed, was consumed by the computers executing their respective computing tasks. And, by extension, that no electrical power was "wasted" doing anything else.

Many embodiments of the disclosed device utilize passive conductive cooling of their computers, which, because it is passive, consumes no electrical power. And, because the disclosed devices are typically autonomous and/or unmanned, many embodiments utilize approximately 100% of the electrical power that they generate energizing their respective computers, and providing them with the energy that they need to complete their respective computing tasks. Thus, many embodiments of the disclosed device will have a PUE of approximately 1.0, i.e. a "perfect" power usage effectiveness."

Also, because the computers stored and operated within the devices of the present disclosure are located on buoys that are floating on a body of water (e.g. on the sea far from shore), they provide significant computing power without requiring a concomitant dedication of a significant area of land. This potentially frees land that might otherwise have been used to house such computing clusters, so that it might instead be used for farming, homes, parks, etc.

3) Decoupling Large-Scale Computing from Large-Scale Support Costs

Some might regard the history of computing as having taught that progress, especially with respect to the scaling of computing, is often a consequence of an underlying progress in the discovery and/or invention of new ways to "decouple" the components, and the constituent tasks, on which large-scale computing relies, from the overhead and/or support requirements needed to support large "monolithic" collections of computers.

BRIEF DESCRIPTION OF THE DRAWINGS

FIG. 36 is an elevated, perspective view of another embodiment of the present invention;

FIG. 37 is a side view of the embodiment of FIG. 36;

DETAILED DESCRIPTION OF THE PREFERRED EMBODIMENTS

For a fuller understanding of the nature and objects of the disclosure, reference should be made to the preceding detailed description, taken in connection with the accompanying drawings. The following figures offer explanatory illustrations, which, like most, if not all, explanations and illustrations are potentially useful, but inherently incomplete. The following figures, and the illustrations offered therein, in no way constitute limitations, neither explicit nor implicit, on the scope of the current disclosure.

Figure 1:
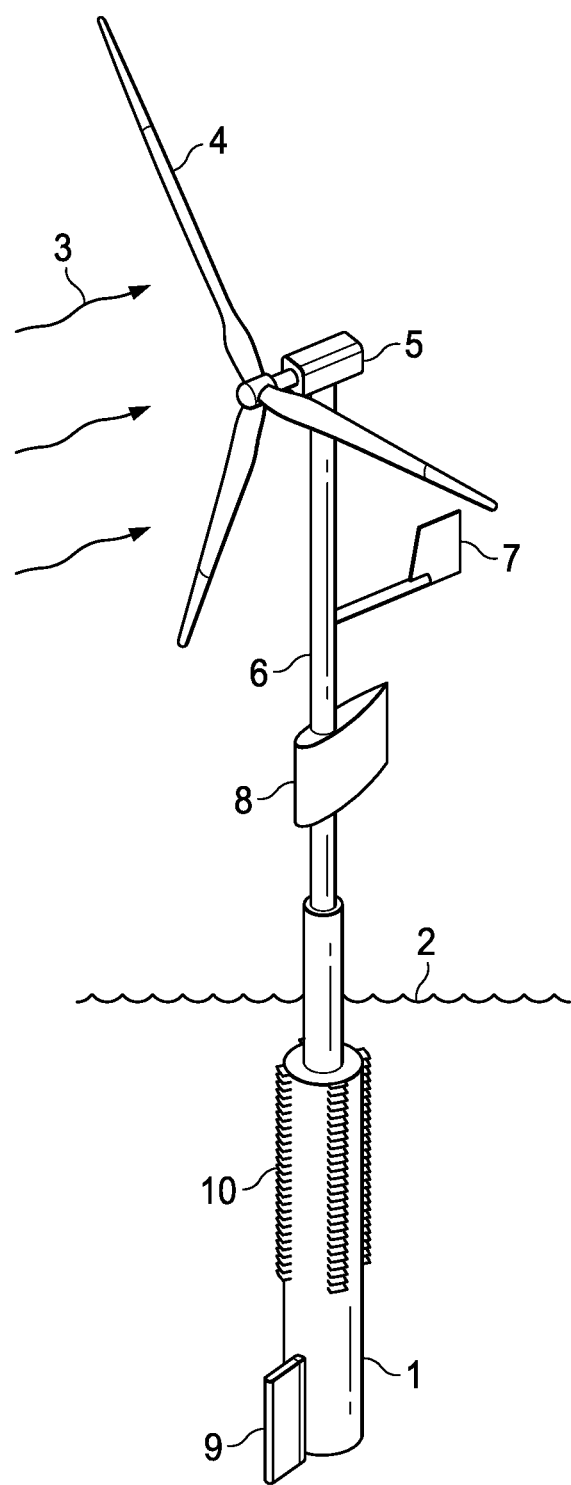
FIG. 1 is an elevated, perspective view of a first embodiment of the present invention.

FIG. 1 shows a perspective view of an embodiment of the current disclosure. The illustrated embodiment extracts energy from the wind by means of a horizontal-axis wind turbine (HAWT), and propels itself by means of the drag force imparted by wind to its wind turbine, combined with the wind-driven (e.g., "lift") forces generated by a airfoil-shaped rigid sail. Through the control of the orientation of both the sail and a rudder, the SPEHD is able to adjust its angular orientation and its speed (i.e., it's able to steer a course).

A "spar buoy" 1 floats adjacent to an upper surface 2 of a body of water over which wind 3 passes. Wind 3 drives and turns the blades 4 of a wind turbine rotatably connected to a generator within a nacelle 5. Nacelle 5 is fixedly attached to pole 6 which is able to rotate relative to spar buoy 1. Guide vane 7 causes pole 6 to rotate so as to keep the turbine "pointed into" the wind, i.e., to keep the rotational axis of the blades 4 parallel to the prevailing wind 3.

When wind 3 blows through the blades 4 of the wind turbine, the rotatably connected generator within the attached nacelle 5 generates electrical power. At least a portion of the electrical power is passed to, and consumed by, computational circuits (e.g., 11 in FIGS. 3-5) as they execute, calculate, and/or process, computational tasks communicated to them from an external source, network, computer, customer, client, application, and/or system.

Rigid sail 8 is rotatably connected to pole 6 and its angular orientation with respect to spar buoy 1 can be controlled independently of the angular orientation of pole 6 and turbine 4/5. A rudder 9 allows the course of the propelled embodiment to be steered and/or directed angularly.

Thermal conduction fins 10 about an upper portion of the outer wall of the spar buoy 1 permit heat generated by computational equipment mounted about the inside of an upper portion of the spar buoy to be transferred into the ambient ocean water, thereby cooling that equipment passively.

Figure 2:
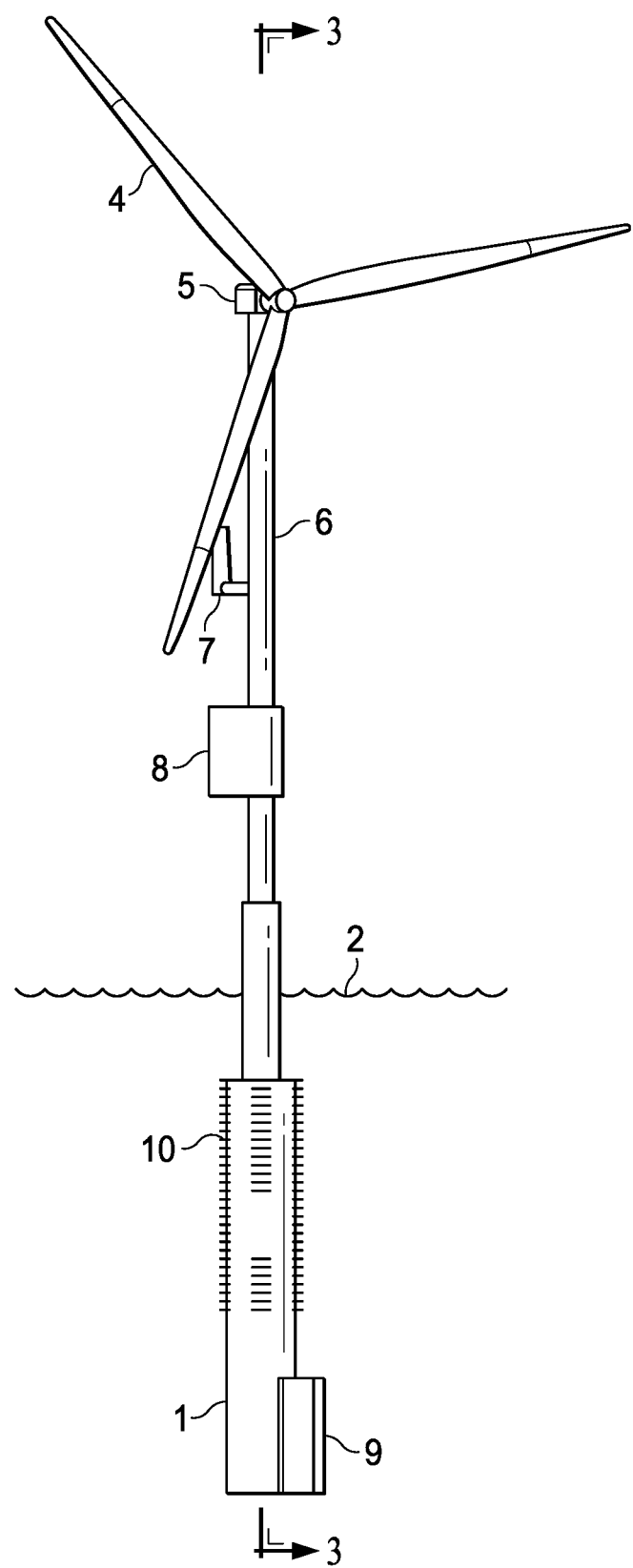
FIG. 2 is a side view of the embodiment of FIG. 1.

FIG. 2 shows a side view of the same embodiment illustrated and discussed in relation to FIG. 1.

Figure 3:
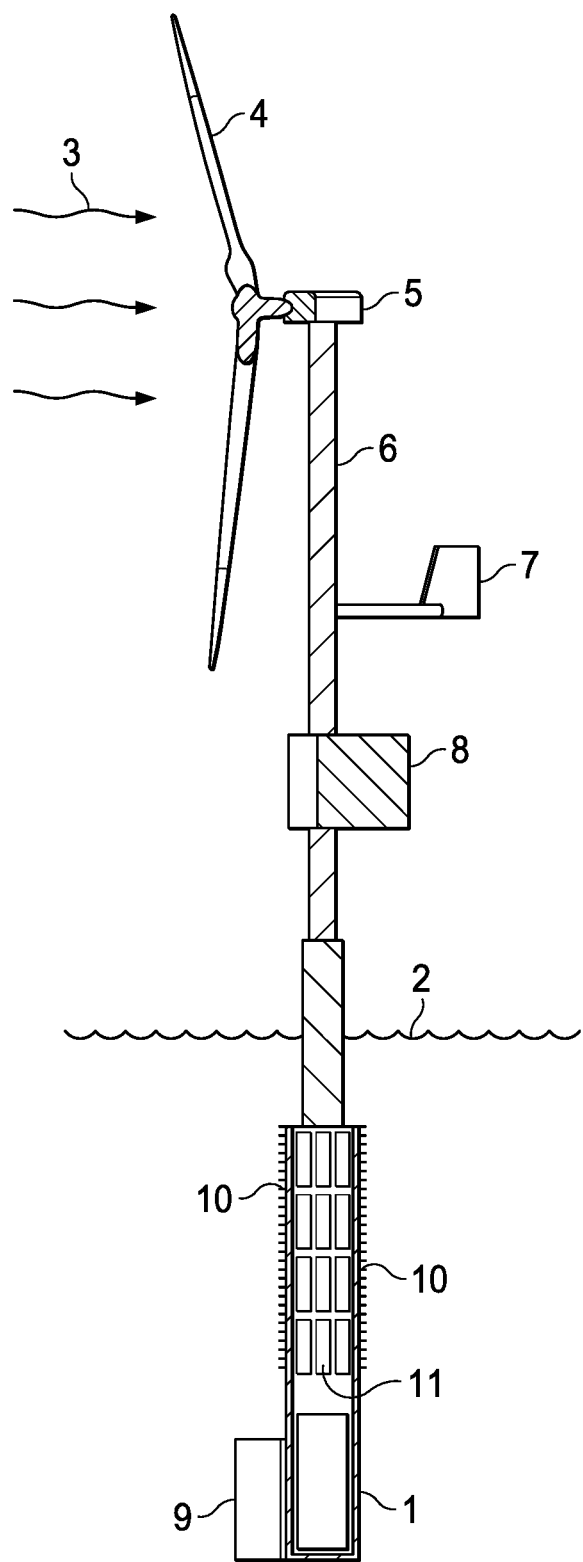
FIG. 3 is a cross sectional view taken along line 3-3.

FIG. 3 shows a side sectional view of the same embodiment illustrated and discussed in relation to FIGS. 1 and 2, wherein the vertical section plane is specified in FIG. 2 and the section is taken across line 3-3.

Computational modules, e.g., 11, may be seen inside, and mounted against an interior wall of the hollow spar buoy 1. Thermal cooling fins 10 help to dissipate heat generated by the computational circuits into the surrounding water 2, thereby passively cooling those circuits and avoiding the need to expend additional energy to achieve that cooling.

Figure 4:
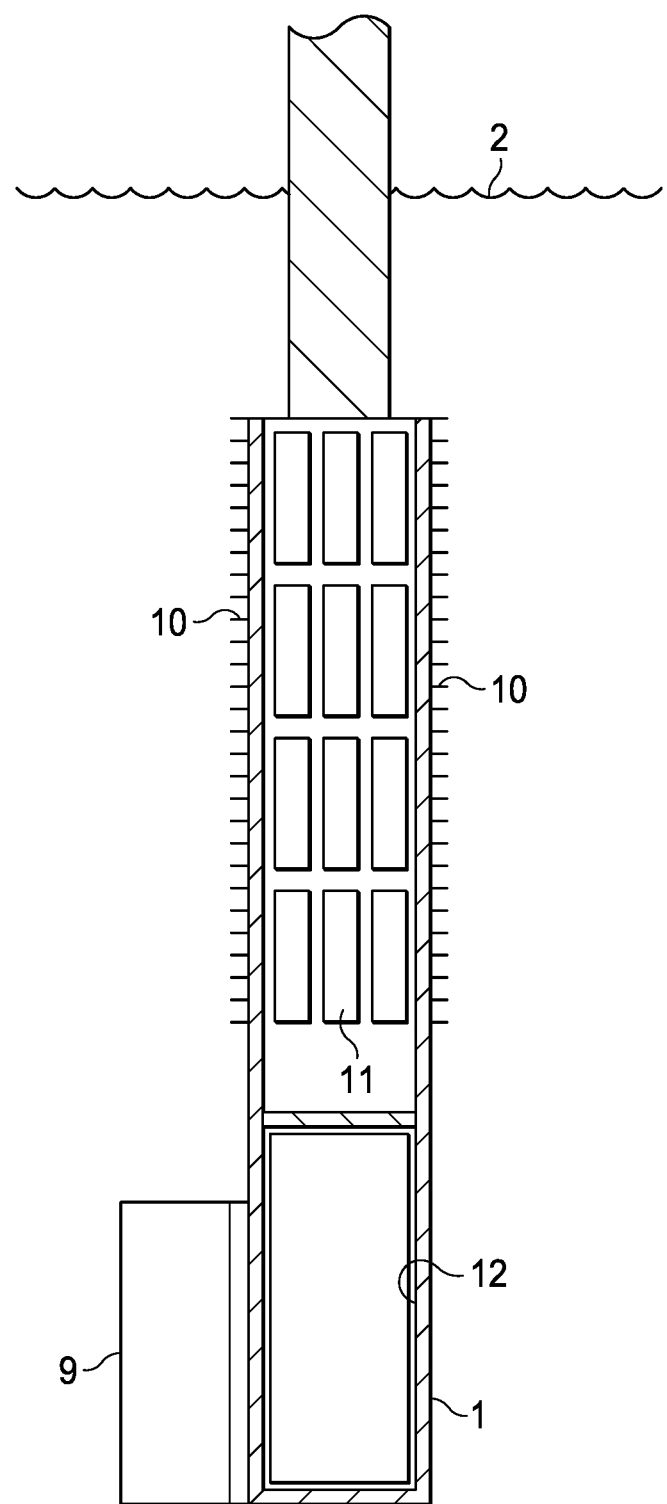
FIG. 4 is an enlarged cross sectional view of the computing compartment of the first embodiment.

FIG. 4 shows a close-up of the same side sectional view illustrated and discussed in relation to FIG. 3. Computational modules, e.g., 11, may be seen inside, and mounted against an interior wall 12 of the hollow spar buoy 1. Thermal cooling fins 10 help to dissipate heat generated by the computational circuits into the surrounding water 2, thereby passively cooling those circuits and avoiding the need to expend additional energy to achieve that cooling.

Figure 5:
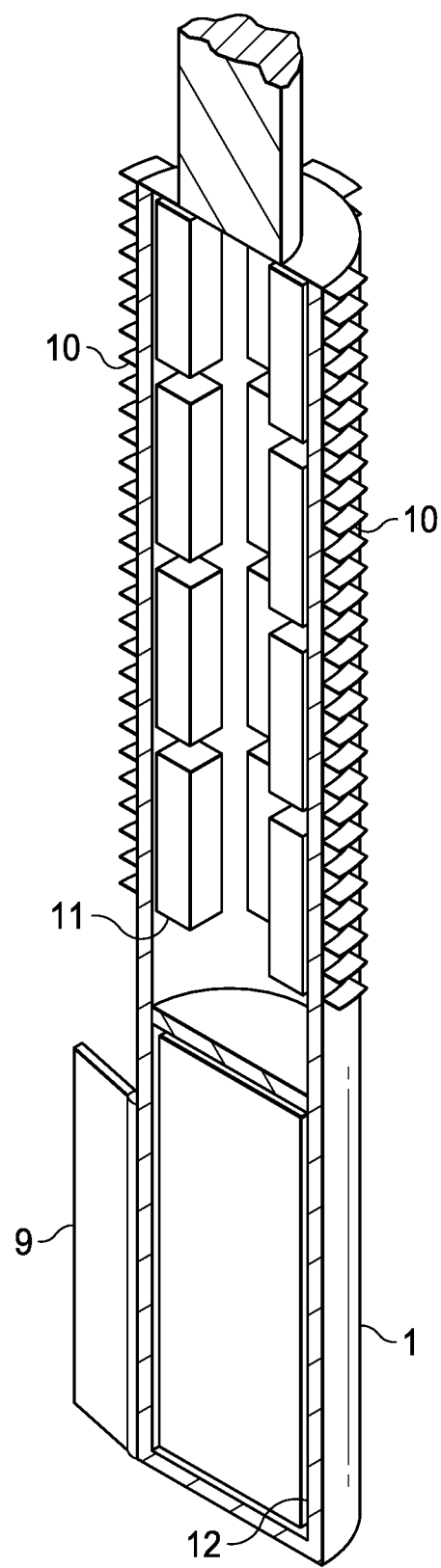
FIG. 5 is another enlarged cross sectional view of the computing compartment of the first embodiment.

FIG. 5 shows a perspective side view of the same close-up sectional view illustrated and discussed in relation to FIG. 4.

Figure 6:
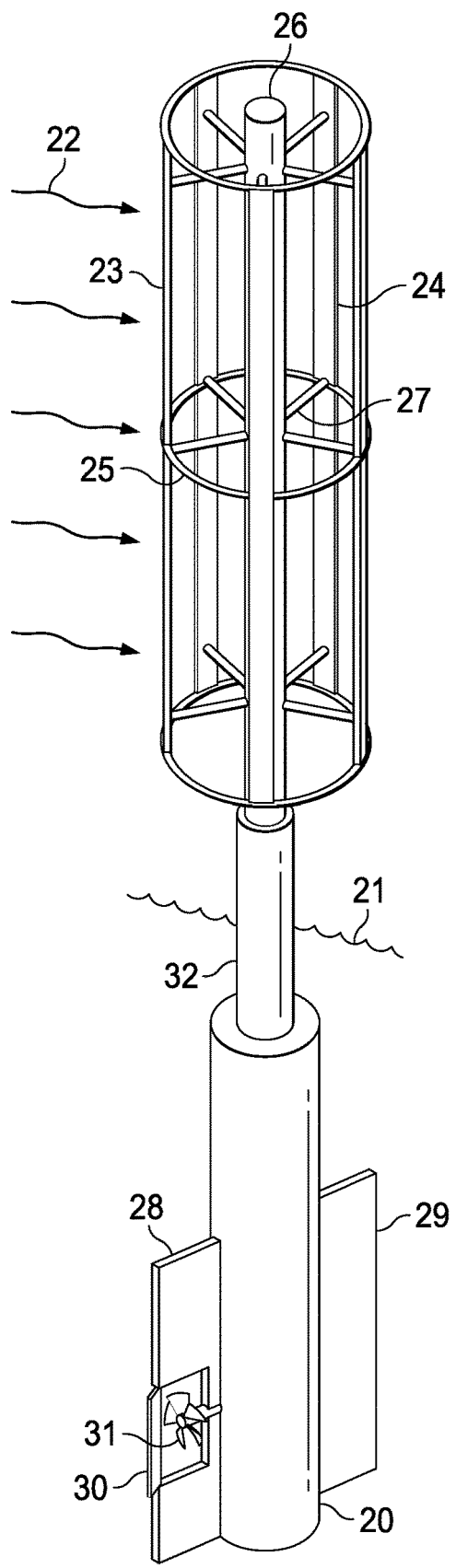
FIG. 6 is an elevated, perspective view of a second embodiment of the present invention.

FIG. 6 shows a perspective view of an embodiment of the current disclosure. The illustrated embodiment extracts energy from the wind by means of a vertical-axis wind turbine (VAWT), and propels itself by means of a propeller driven by an electrical motor (inside the spar buoy). Through the control of the orientation of a rudder and the rate at which the propeller rotates, the embodiment is able to adjust and/or control its course, e.g., its angular orientation, and its speed.

A "spar buoy" 20 floats adjacent to an upper surface 21 of a body of water over which wind 22 passes, flows, and/or blows. Wind 22 drives and turns the blades of a vertical-axis wind turbine 23 rotatably connected to a generator positioned inside the spar buoy 20. The blades, e.g., 24, of the wind turbine are fixedly attached to rings, e.g., 25, that are fixedly attached to a central shaft 26 by spokes, e.g., 27.

A pair of opposing vanes 28 and 29 act as a keel and help to direct the forward motion of the device. Movably attached to one of the vanes 28 is a rudder 30 whose rotation about a vertical axis (e.g., via an electrical motor controlled hinge or gear) helps to guide the angular orientation, e.g., the course, of the device when thrust is generated by the propeller 31, and/or by the drag force imparted to the turbine by the wind 22 that it obstructs.

The portion 32 of the spar buoy 20 that crosses the surface 21 of the water is of a smaller diameter than the lower portion of the buoy so that the responsivity of the buoy to heave wave motion is reduced.

At least a portion of the electrical power generated by the embodiment's generator in response to the turning of the VAWT when blown by wind 22 is communicated to, and/or consumed by, a plurality, plethora, network, assembly, collection, and/or array, of computational devices, circuits, devices, machines, and/or modules, positioned within the spar buoy 20, so as to provide at least a portion of those computational devices with the electrical power required to enable them to execute, process, complete, and/or compute, various computational tasks communicated to them from an external source, network, computer, customer, client, application, and/or system.

At least a portion of the electrical power generated by the embodiment's generator in response to the turning of the VAWT when blown by wind 22 is communicated to, and/or consumed by electric motors that spin the propeller 31 (e.g., in either clockwise and/or counter-clockwise directions, thereby providing forward and/or backward thrust), and control the angular orientation of the rudder 30.

Figure 7:
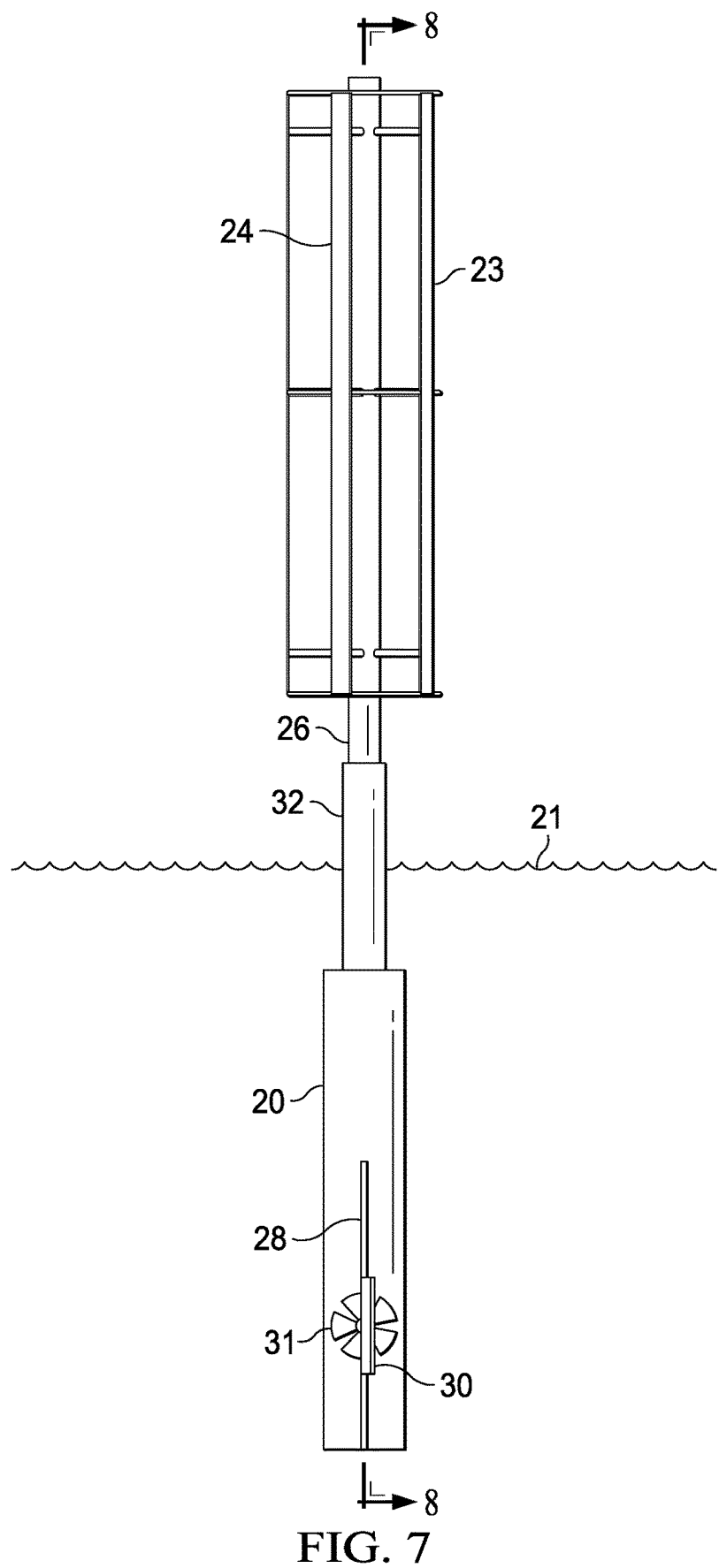
FIG. 7 is a side view of the embodiment of FIG. 6.

FIG. 7 shows a side view of the same embodiment illustrated and discussed in relation to FIG. 6.

Figure 8:
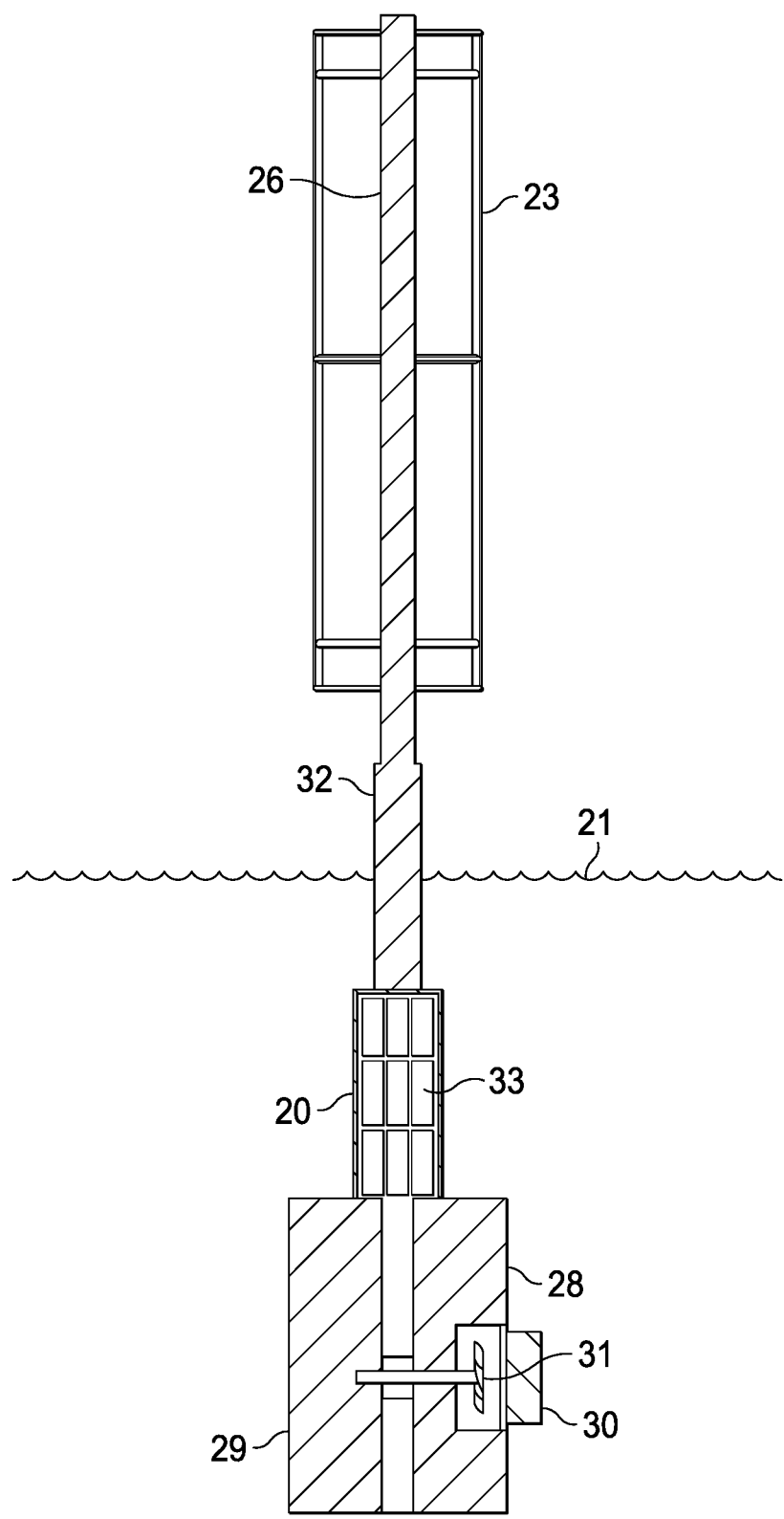
FIG. 8 is a cross sectional view taken along line 8-8.

FIG. 8 shows a side sectional view of the same embodiment illustrated and discussed in relation to FIGS. 6 and 7, wherein the vertical section plane is specified in FIG. 7 and the section is taken across line 8-8.

Mounted against the interior wall of the hollow spar buoy 20 are a plurality of computational modules 33 and/or devices. Heat generated by those computational modules 33 is conductively and passively transferred to the outside water 21.

Figure 9:
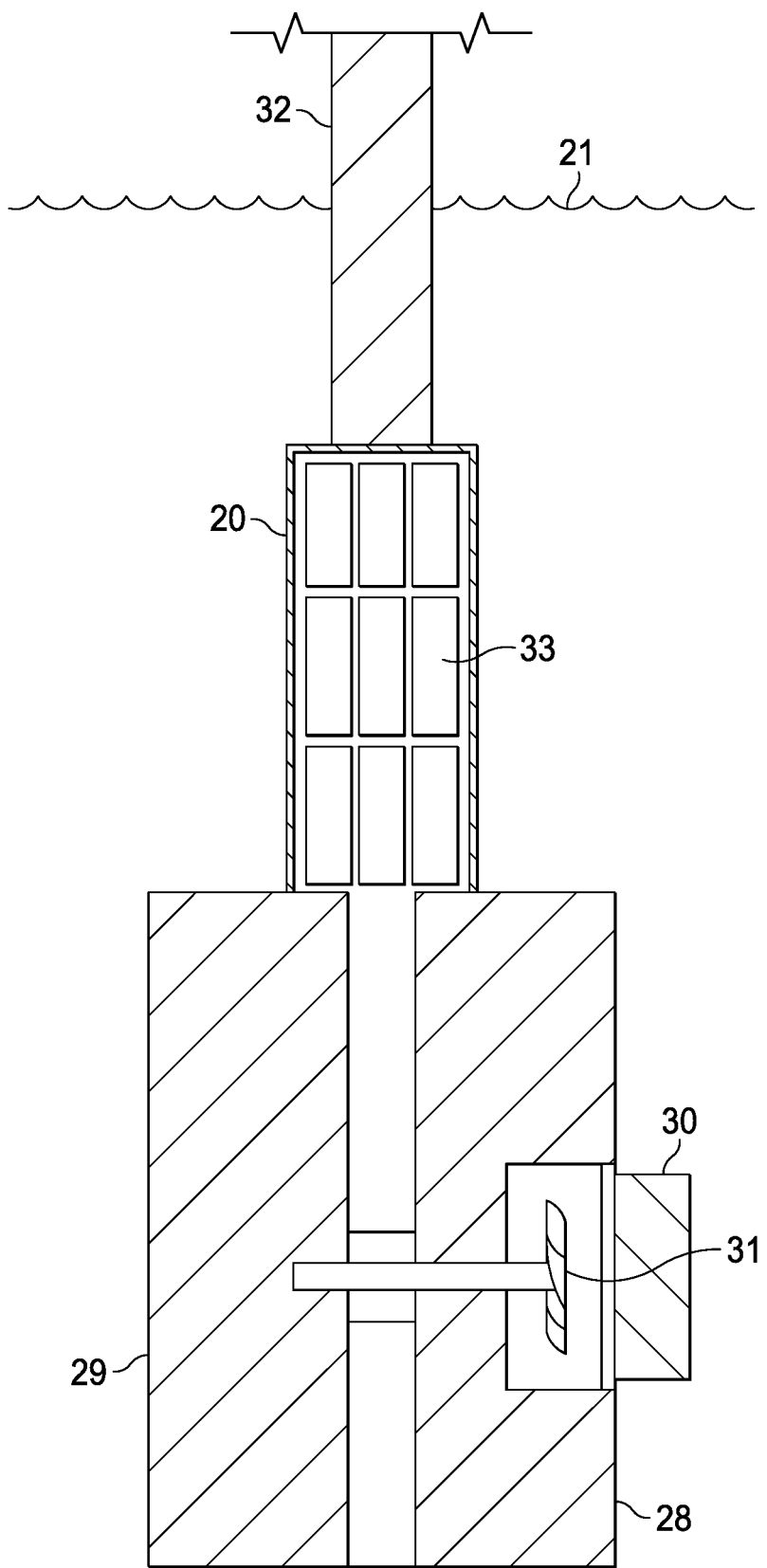
FIG. 9 is an enlarged view of the computing compartment of the second embodiment.

FIG. 9 shows a close-up of the same side sectional view illustrated and discussed in relation to FIG. 8.

Figure 10:
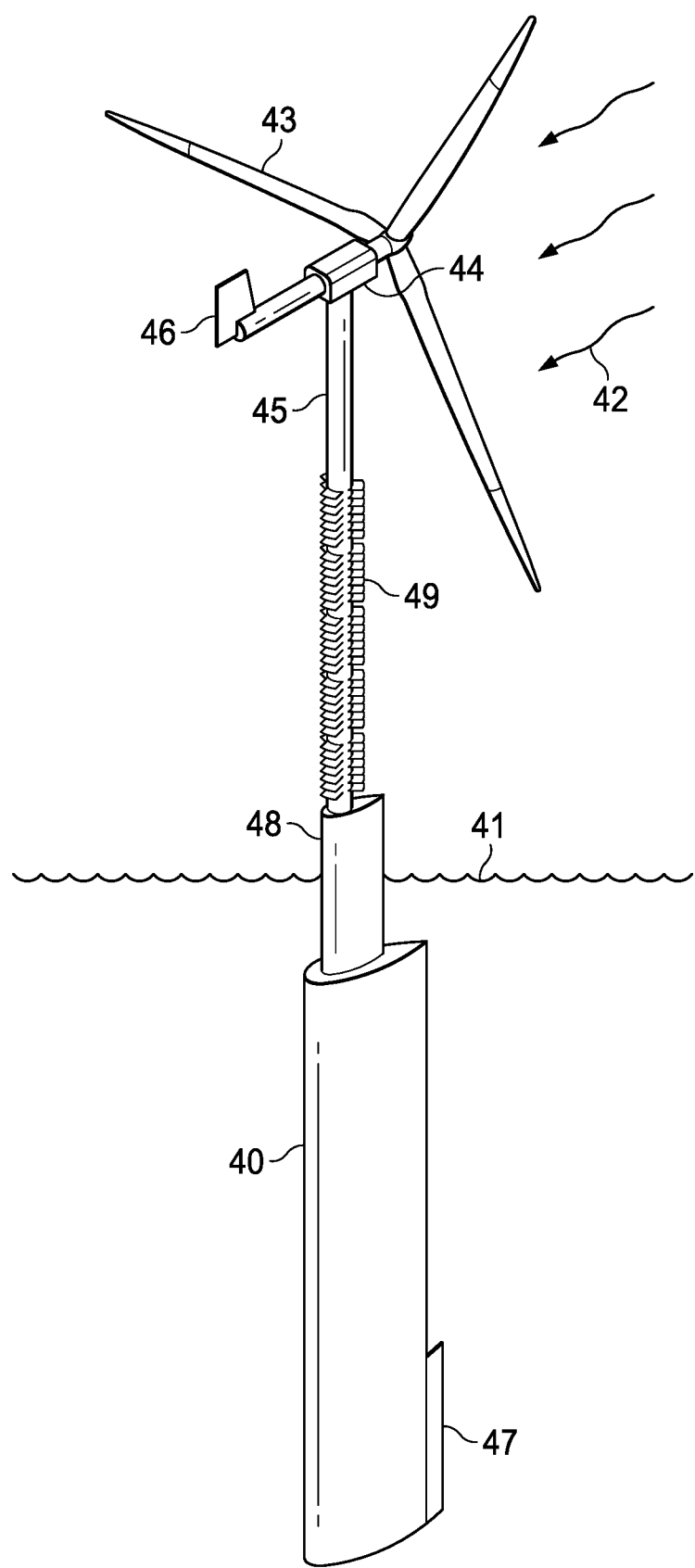
FIG. 10 is an elevated, perspective view of another embodiment of the present invention.

FIG. 10 shows a perspective view of an embodiment of the current disclosure. The illustrated embodiment extracts energy from the wind by means of a horizontal-axis wind turbine (HAWT), and is propelled, at least in part, by the force of the wind impacting the blades of the wind turbine, and the resulting drag force that is imparted to the turbine by the wind. Through the control of the orientation of a rudder, the embodiment is able to adjust and/or control its angular orientation and/or course. Through the control of the angles of the turbine's blades, both the amount of energy extracted from the wind by the turbine, as well as the amount of drag-induced force imparted to it (and to the device) by the wind, may be adjusted and/or controlled, which in turn also allows the device's speed to be controlled, to a degree.

A "spar buoy" 40 floats adjacent to an upper surface 41 of a body of water over which wind 42 passes, flows, and/or blows. Wind 42 drives, energizes, and/or turns, the blades 32 of a wind turbine rotatably connected to a generator positioned within the turbine's nacelle 44 which is fixedly attached to a pole 45. Pole 45 is turned by a motor and control system positioned inside the spar buoy 40.

When not aligned with, and/or parallel to, the wind direction, guide vane 46 applies a torque to pole 45. Likewise, when not parallel to the direction to which the spar buoy (and the device) is traveling through the water, rudder 47 applies a torque to spar buoy 40.

By adjusting the angular orientations of both the turbine's rotational axis, i.e., the angular orientation of pole 45, and the turbine's 43 axis of rotation, relative to the spar buoy 40, through angular adjustments to the rotational position of the pole 45, and the rudder 47, relative to the spar buoy 40, in combination with the drag-induced forces imparted to the turbine's blades by the wind, the magnitude of which may be controlled, at least in part, through adjustments of the "angles of attack" of the turbine's blades, and through adjustments the angular orientation of the turbine's 43 axis of rotation to the wind 42, and the aerodynamic lift forces produced by the movement of the airfoil-shaped spar buoy 40 through the water, the direction and speed of the embodiment can, to a degree, and within limits, be controlled.

The portion 48 of the spar buoy 40 that crosses the surface 41 of the water is of a smaller cross-sectional area (with respect to the horizontal plane at the surface of the water 41) than the lower portion of the buoy so that the responsivity of the buoy to heave wave motion is reduced.

Positioned with pole 45 is a plurality, plethora, network, assembly, collection, and/or array, of computational devices, circuits, devices, machines, and/or modules. At least a portion and/or subset of those computational circuits are energized by at least a portion of the electrical power generated by the generator positioned in nacelle 44 whose rotor is rotated by the shaft of wind turbine 43 in response to wind 42 blowing through its blades.

Heat-dissipating vanes 49 mounted to the turbine pole 45 are used to convectively dissipate heat generated by computational circuits positioned within that pole into the air surrounding the pole 45 and adjacent to the surface 41 of the body of water on which the embodiment floats.

Figure 11:
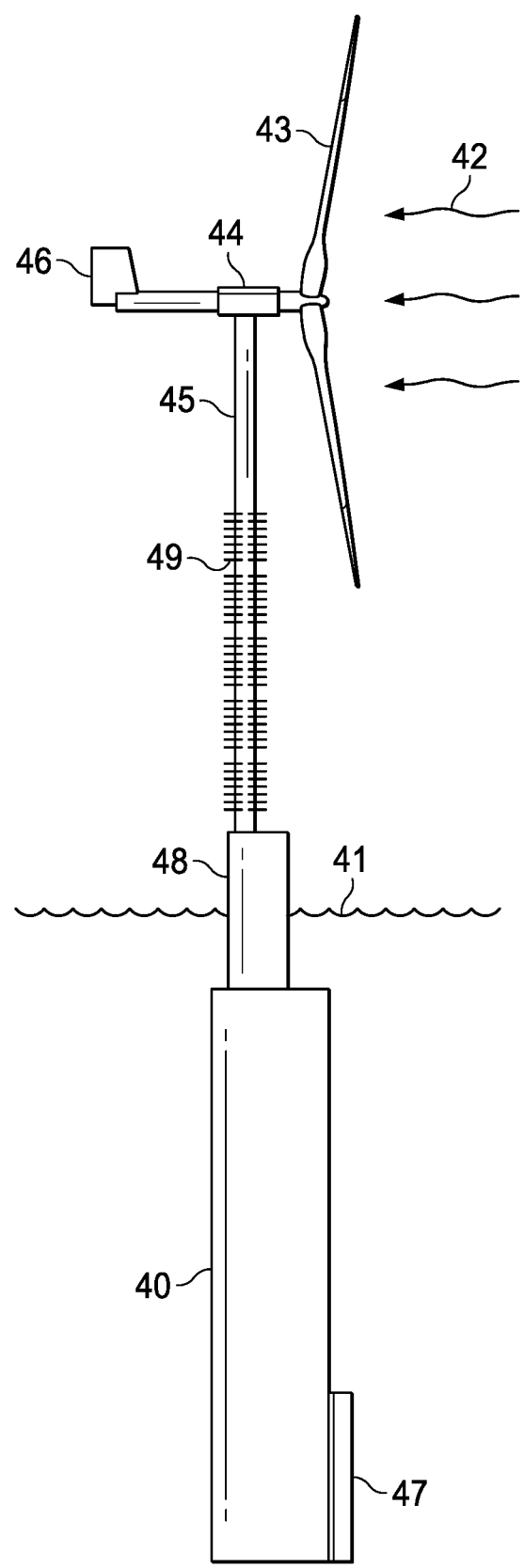
FIG. 11 is a side view of the embodiment of FIG. 10.

FIG. 11 shows a side view of the same embodiment illustrated and discussed in relation to FIG. 10.

Figure 12:
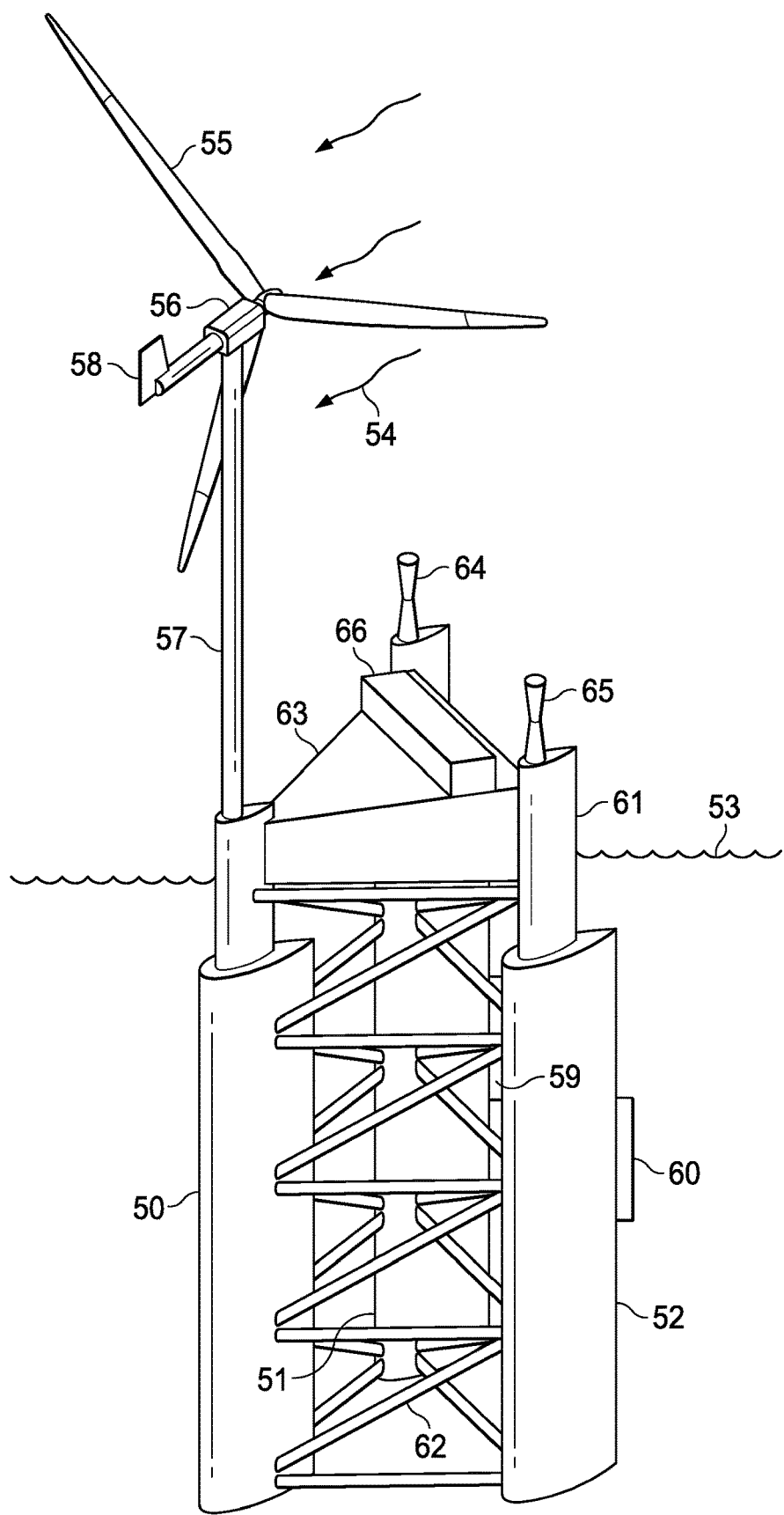
FIG. 12 is an elevated, perspective view of another embodiment of the present invention.

FIG. 12 shows a perspective view of an embodiment of the current disclosure. The illustrated embodiment extracts energy from the wind by means of a horizontal-axis wind turbine (HAWT) rotatably mounted to one of three airfoil-shaped spar buoys, and is propelled by the force of the wind impacting the blades of the wind turbine. Through the control of the orientation of a pair of rudders, the embodiment is able to adjust and/or control its angular orientation. Through the control of the angles of the turbine's blades, both the amount of energy extracted from the wind by the turbine, as well as the amount of drag-induced force imparted to it (and to the device), may be adjusted and/or controlled, which in turn also allows the device's speed to be controlled, to a degree.

Three "spar buoys" 50-52 float adjacent to an upper surface 53 of a body of water over which wind 54 passes. Wind 54 drives and turns the blades 55 of a wind turbine rotatably connected to a generator inside the turbine's nacelle 56. The turbine's nacelle 56 is rotatably connected to a pole 57 about which it can rotate (i.e., about the longitudinal axis of the pole 57). However, its rotation is limited to a relatively small angular range (e.g., +/−30 degrees) and/or deviation outside, and/or away from, a vertical plane passing through the center of pole 57 and equally centered between spar buoys 51 and 52, i.e., a vertical plane about which the device has greatest bilateral symmetry. This causes the wind-induced drag forces on the turbine to push the device forward, i.e., in a direction that would move the center of the device approximately toward spar buoy 50, allowing the three airfoil-shaped spar buoys to have minimal drag, and allowing the rudders 59 and 60 to be able to apply torques to the device (e.g., about its vertical longitudinal axis of symmetry) and thereby to steer the device.

The portion, e.g., 61, of each spar buoy, e.g., 52, that crosses the surface 53 of the water is of a smaller cross-sectional area (with respect to the horizontal plane at the surface of the water 53) than the lower portion of each buoy so that each spar buoy's responsivity to heave wave motion is reduced.

The three spar buoys 50-52 are rigidly connected together by a truss structure, e.g., 62.

Between the upper portions, e.g., 61, of the three spar buoys 50-52 is an air-filled shroud 63 that extends beneath the level of the water 53, trapping a volume of air beneath the shroud and above the water. The shroud 63 creates an "oscillating water column" (OWC) within.

Venturi-shaped nozzles 64 and 65 amplify the speed of the air exiting and entering the OWC in response to changes in water height created by heave wave motion. Turbines positioned in the narrowest portions (i.e., the throats) of nozzles 64 and 65 extract energy from the air flowing over and/or through them causing rotatably connected generators to produce electrical power, a portion of which is used to energize computational circuits, hardware, electronics, systems, and/or modules, positioned within an enclosure 66 attached to an upper surface of the OWC shroud 63.

Positioned within enclosure 66 is a plurality, plethora, network, assembly, collection, and/or array, of computational devices, circuits, devices, machines, and/or modules. At least a portion and/or subset of those computational circuits are energized by at least a portion of the electrical power generated by either, and/or both, the generator positioned in nacelle 56 whose rotor is rotated by the shaft of wind turbine 55 in response to wind 54 blowing through its blades, and the generators positioned in the OWC Venturi nozzles 64 and 65.

Heat generated by the computational circuits within module 66 is dissipated, at least in part, conductively through the walls of the enclosure 66 and thereafter convectively into the air outside the enclosure.

Figure 13:
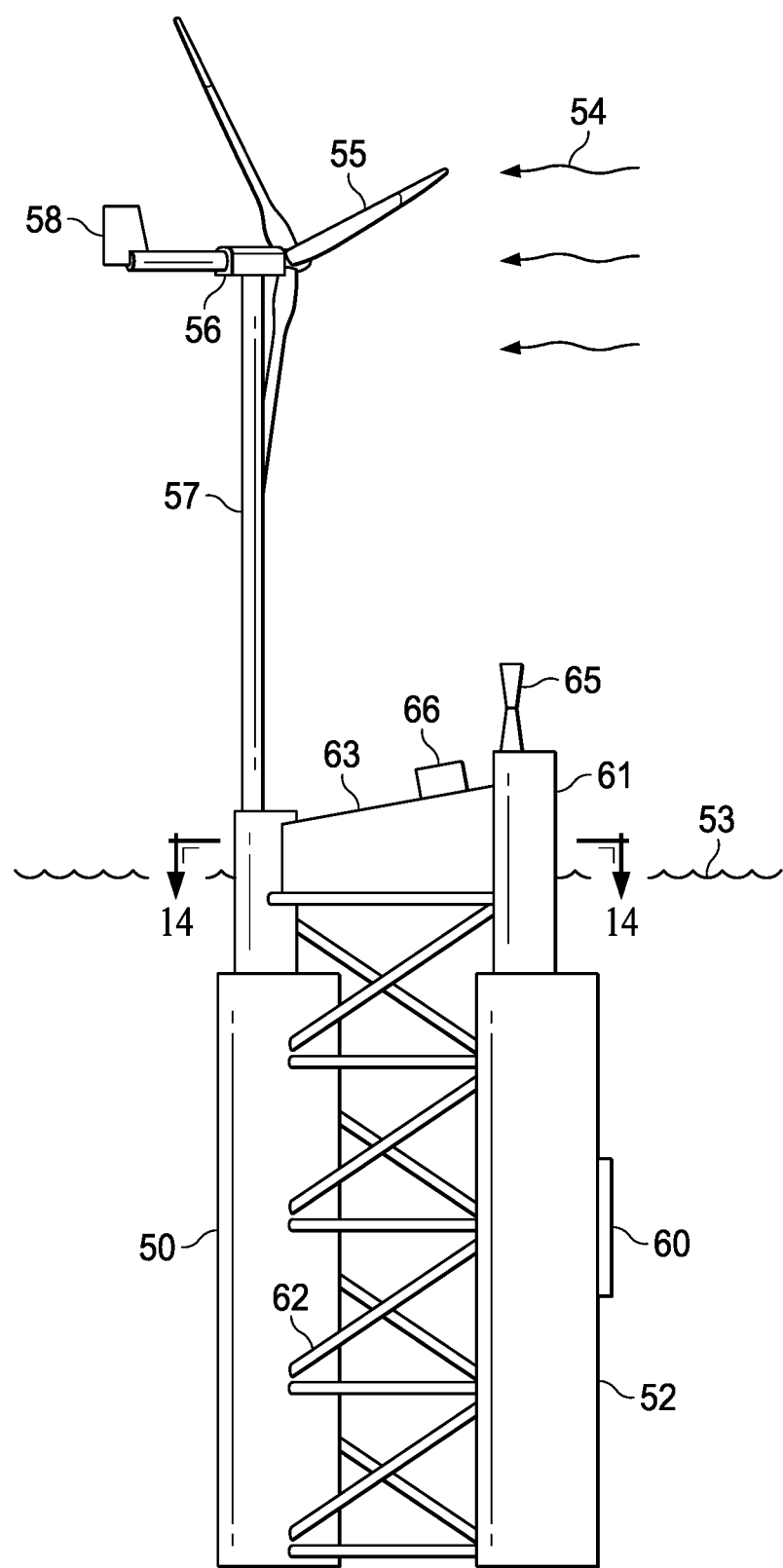
FIG. 13 is a side view of the embodiment of FIG. 12.

FIG. 13 shows a side view of the same embodiment illustrated and discussed in relation to FIG. 12.

Figure 14:
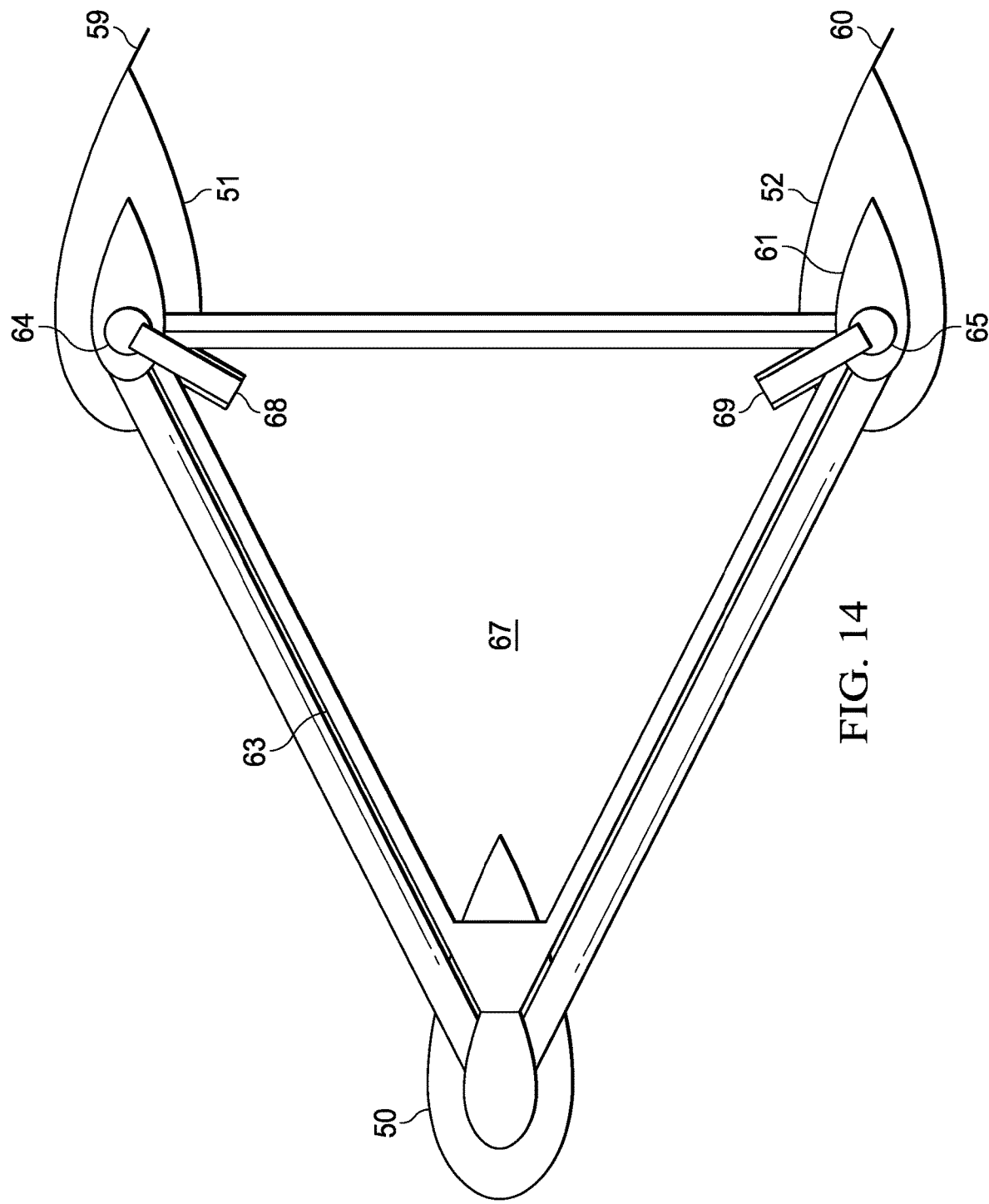
FIG. 14 is an elevated, perspective sectional view of the embodiment of FIG. 12.

FIG. 14 shows a top-down sectional view of the same embodiment illustrated and discussed in relation to FIGS. 12 and 13, wherein the horizontal section plane is specified in FIG. 13 and the section is taken across line 14-14.

OWC shroud 63 is a hollow 67 air-filled chamber in which the rising and falling of waves inside the shroud, alternately compresses and depressurizes the air inside the chamber causing at least a portion of that air to flow through tubes 68 and 69 into respective Venturi-shaped nozzles (i.e., 64 and 65 in FIG. 12) where they drive respective turbines positioned inside the throats of those nozzles (said turbines being positioned above the section plane and outside of the sectional view).

Rudders 59 and 60 help to steer the embodiment when drag-induced forces are imparted to the wind turbine in response and/or as a consequence of the turbine's, at least partial, obstruction of the wind's flow, thereby pushing the device forward in the water approximately in the direction of spar buoy 50, and/or to the left with respect to the illustration in FIG. 14.

Figure 15:
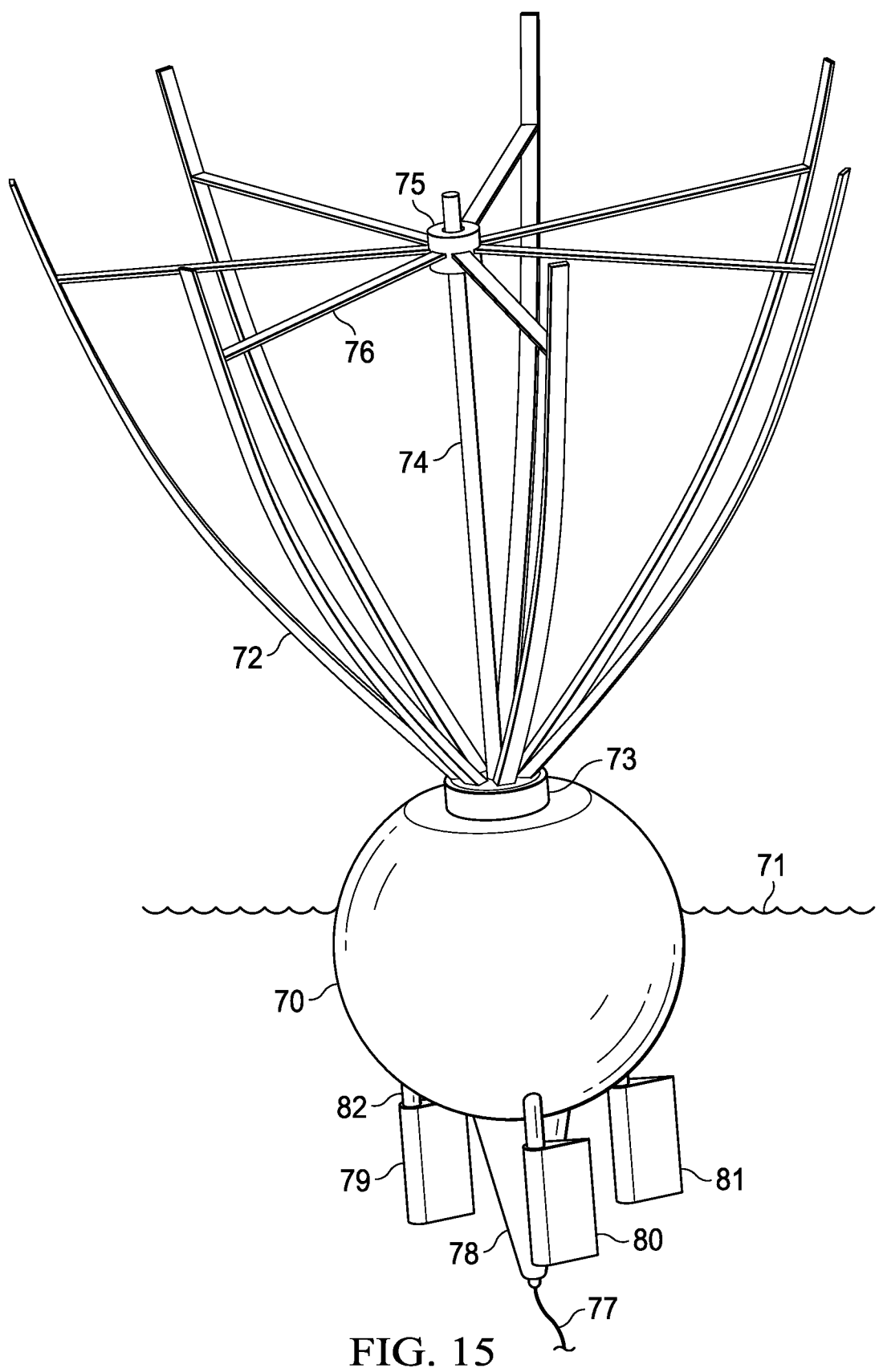
FIG. 15 is an elevated, perspective view of another embodiment of the present invention.

FIG. 15 shows a perspective view of an embodiment of the current disclosure. The illustrated embodiment 70 floats adjacent to an upper surface 71 of a body of water over which wind blows, and extracts energy from at least a portion of that wind by means of a "floating-axis wind turbine (FAWT)" 72 rotatably mounted to an approximately spherical buoy 70.

A rotatable hub 73 is connected to the shaft of an alternator (now shown) positioned below the hub and within the buoy 70. A pole 74 or shaft projects upward from the hub and is coaxial with the longitudinal axis of approximate radial symmetry of the embodiment. Attached to a connector 75, which is connected an upper portion of pole 74 are a plurality of radial spokes, e.g., 76. And, attached to a distal end of each spoke, e.g., 76, is a turbine blade, e.g., 72. The turbine blades rotate about the longitudinal axis of pole 74 and about the approximate radial symmetry of the embodiment, thereby rotating hub 73 and the rotor of a connected alternator rotor, thereby generating electrical power in response to the rotations of the turbine blades. By altering the amount of current flowing through the field coils of the alternator, the amount of torque that resists the wind-driven turning of the turbine blades, as well as the amount of power that is generated as a result, may be, to a degree, controlled and/or optimized. One potential utility of such a turbine-driven alternator is that it provides the ability to reduce the torque imparted to the embodiment by the turbine by reducing the degree to which the alternator resists the rotation of the turbine and/or the hub to which it is connected.

The embodiment 70 is propelled, at least in part, by the force of the wind impacting the blades. e.g., 72, of the wind turbine. It is also propelled, at least in part, by a submerged flexible water-filled enclosure (not shown), envelope, bag, and/or vessel, flexibly connected to the buoy by a rope, cable, chain, linkage, and/or other flexible connector 77, said bag serving as an "inertial mass" which is moved in response to the flow of subsurface currents and tends to pull the embodiment along with itself and the current that pulls it. The flexible connector 77 is connected to a portion 78 of the buoy 70 that projects down from the bottom so as to prevent the connector 77 from tangling with, and/or damaging, any of the rudders 79-81.

Three rudders 79-81 allow the embodiment to be "steered" by means of rotating the shafts, e.g., 82, by which they are rotatably connected to the buoy 70, and the rotations of which are controlled, at least in part, through the controlled excitation of respective electrical motors (not shown).

At least a portion of the electrical power generated by the alternator connected to hub 73 and turbine 72 is communicated to, and/or consumed by, a plurality, plethora, network, assembly, collection, and/or array, of computational devices, circuits, devices, machines, and/or modules, positioned within buoy 70, so as to provide at least a portion of those computational devices with the electrical power required to enable them to execute, process, complete, and/or compute, various computational tasks communicated to them from an external source, network, computer, customer, client, application, and/or system.

An embodiment similar to the one illustrated in FIG. 15 interacts with subsurface currents utilizing a submerged "kite" in order to generate propulsion.

An embodiment similar to the one illustrated in FIG. 15 lacks a submerged inertial mass, and flexible connector thereto connecting it.

Figure 16:
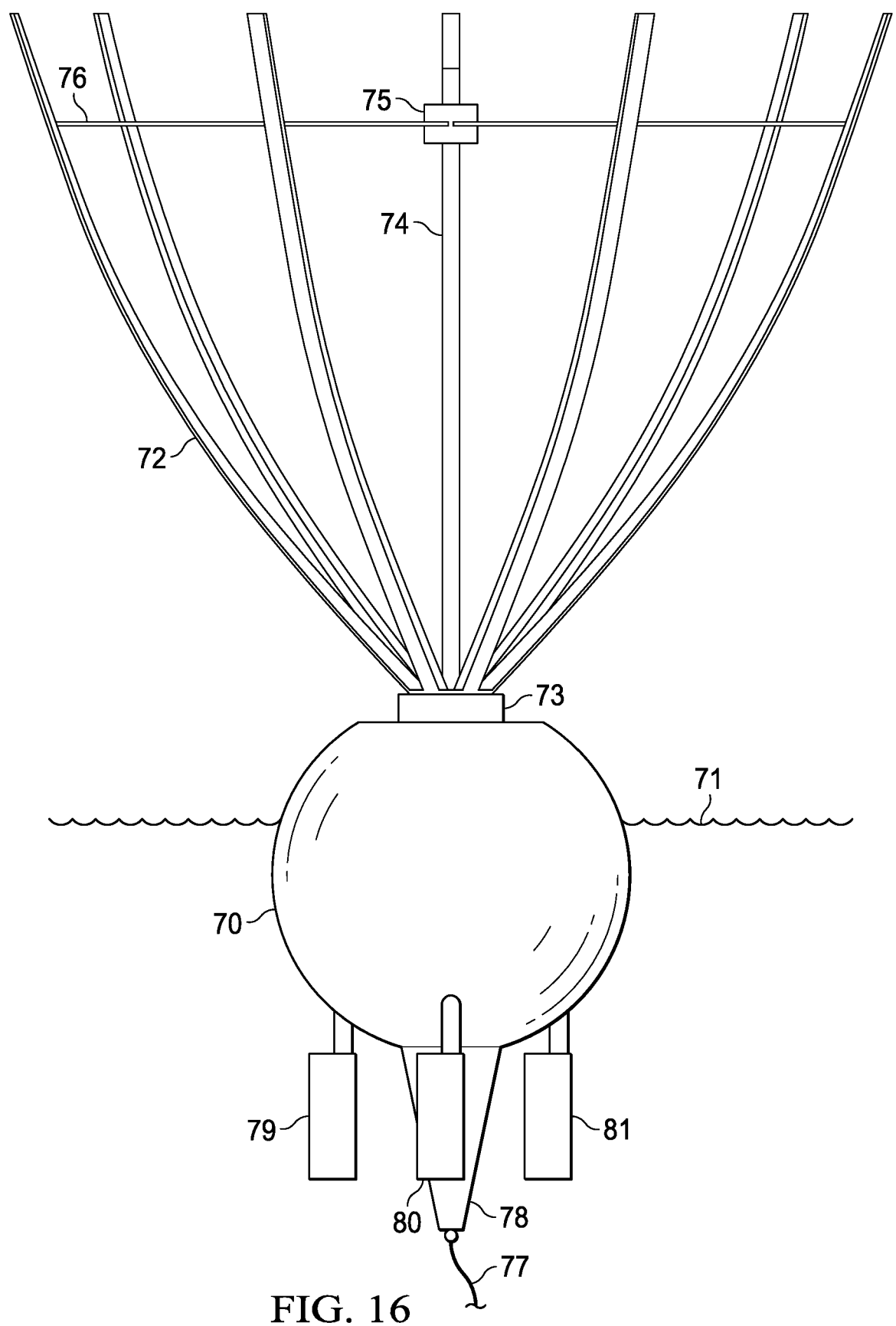
FIG. 16 is a side view of the embodiment of FIG. 15.

FIG. 16 shows a side view of the same embodiment illustrated and discussed in relation to FIG. 15.

Figure 17:
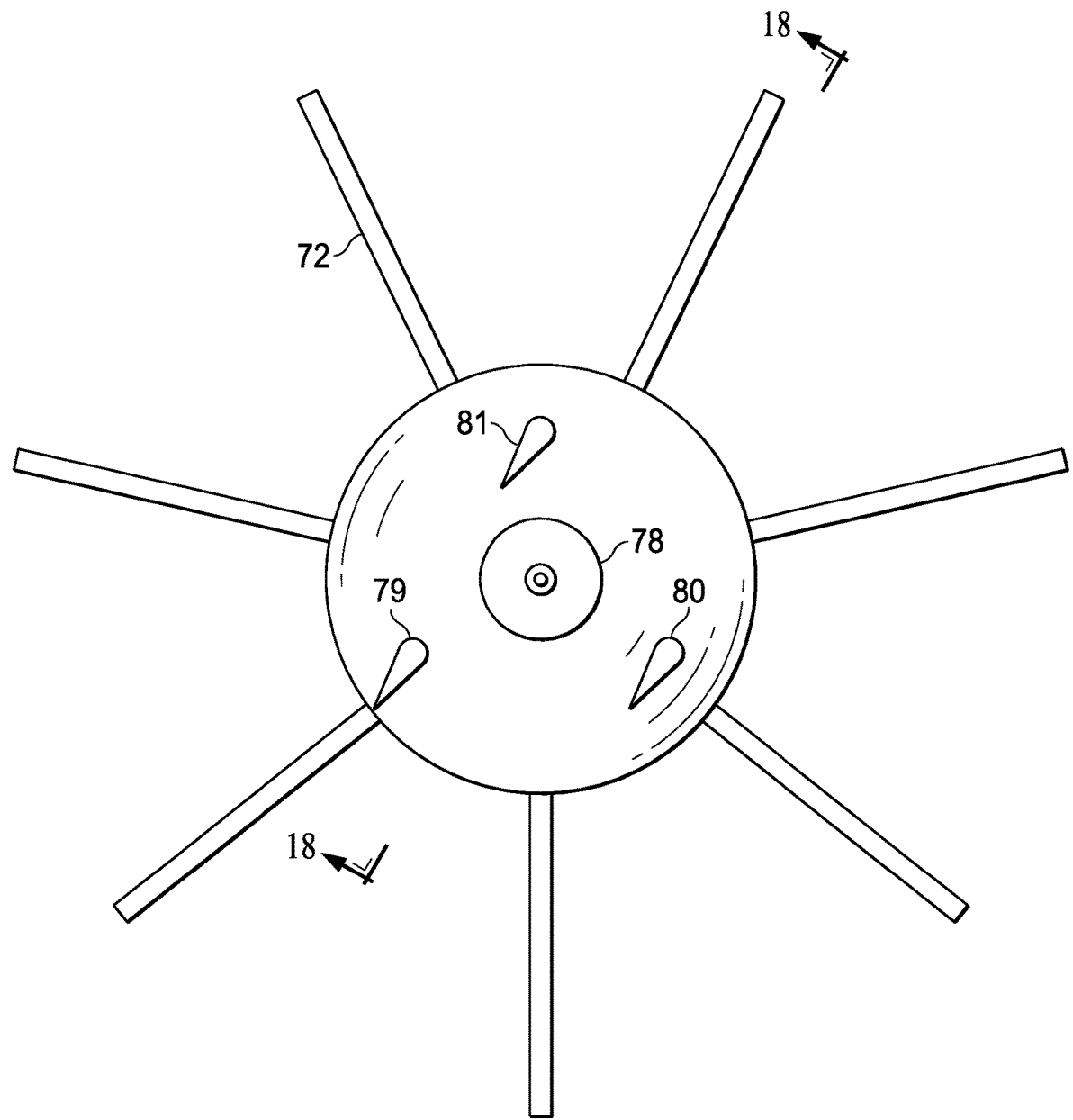
FIG. 17 is a bottom view of the embodiment of FIG. 15.

FIG. 17 shows a bottom-up view of the same embodiment illustrated and discussed in relation to FIGS. 15 and 16.

Figure 18:
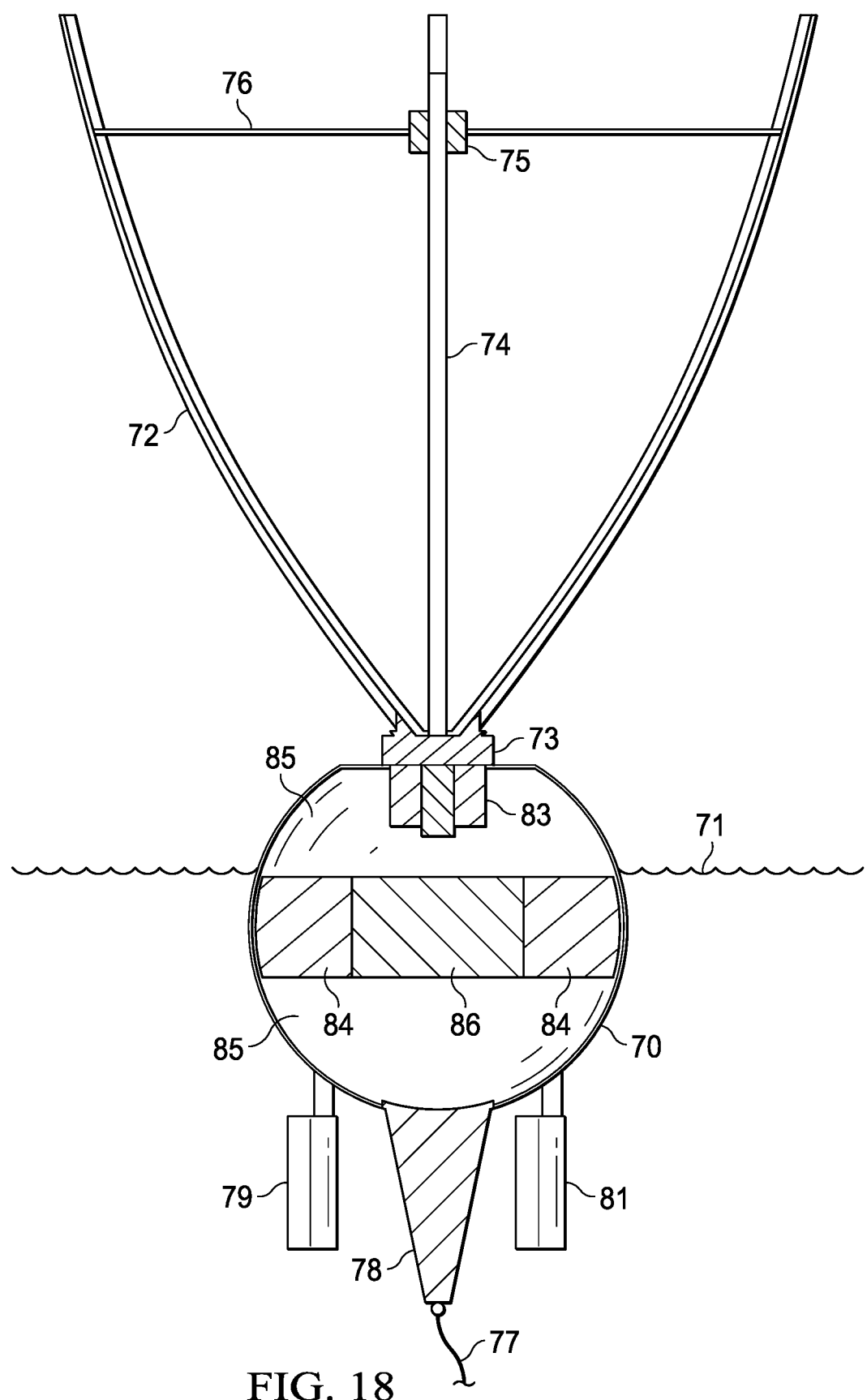
FIG. 18 is a cross sectional view taken along lines 18-18.

FIG. 18 shows a side sectional view of the same embodiment illustrated and discussed in relation to FIGS. 15-17, wherein the vertical section plane is specified in FIG. 17 and the section is taken across line 18-18.

Alternator 83 is connected to hub 73 and turbine 72, and electrical power is generated by the alternator in response to wind-driven rotations of the turbine.

Inside the at least partially hollow 85 buoy 70 is a circumferentially positioned plurality and/or assembly 84 of computational circuits and/or devices (e.g., having a central aperture 86 which allows the upper hollow 85 to communicate with the lower hollow 85). An outer surface of the assembly 84 of computational circuits is adjacent to, contiguous with, and/or shared with, an outer wall 70, panel, skin, panel, surface, and/or envelope, of the buoy.

Computational modules 84 are mounted against an interior wall of the hollow buoy 70. At least a portion of the heat generated by the computational circuits 84 is conductively communicated through the adjacent and/or common surfaces of the circuits 84 and the buoy 70, and thereafter transferred, at least in part, into the surrounding water 71, thereby passively cooling those circuits and avoiding the need to expend additional energy to achieve that cooling.

A portion of the heat generated by the computational circuits 84 is conductively communicated through an upper surface of the buoy 70 (e.g., adjacent to the hub) and thereafter transferred, at least in part, into the surrounding air.

At least a portion of the electrical power generated by the embodiment's alternator 83 in response to the wind-driven turning of the FAWT is communicated to, and/or consumed by, a plurality, plethora, network, assembly 84, collection, and/or array, of computational devices, circuits, devices, machines, and/or modules, positioned within the buoy 70, so as to provide at least a portion of those computational devices with the electrical power required to enable them to execute, process, complete, and/or compute, various computational tasks communicated to them from an external source, network, computer, customer, client, application, and/or system.

Figure 19:
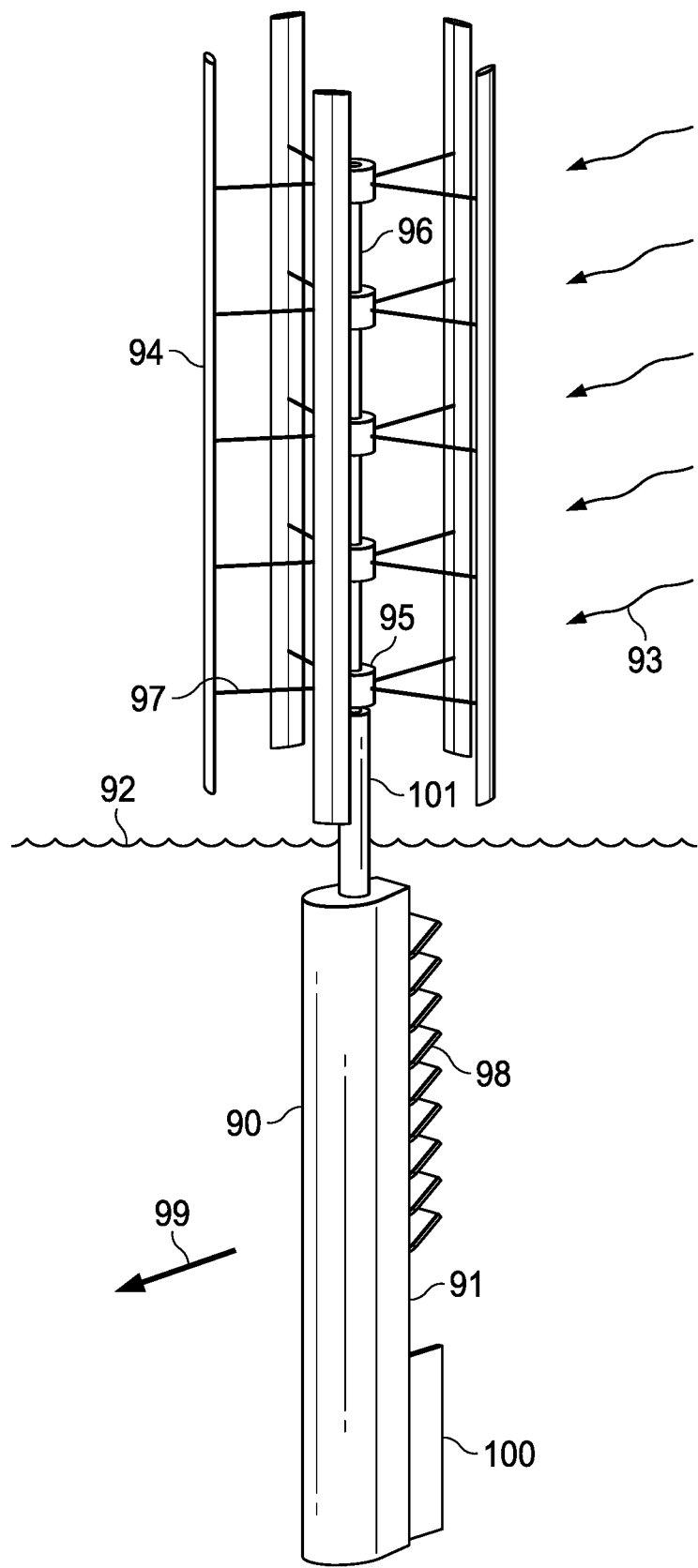
FIG. 19 is an elevated, perspective view of another embodiment of the present invention.

FIG. 19 shows a perspective view of an embodiment of the current disclosure. The illustrated embodiment extracts energy from the wind by means of a vertical-axis wind turbine (VAWT), and propels itself by means of a set of "resistive flaps" that respond to the heave of ambient waves by generating thrust toward the center and/or longitudinal axis of the buoy. Through the control of the orientation of a rudder and the degree of resistance manifested by the flaps, the embodiment is able to adjust and/or control its course, e.g., its angular orientation, and its speed.

A "spar buoy" 90 characterized by a rounded and/or airfoil-shaped leading side 90, and a flat trailing side 91, floats adjacent to an upper surface 92 of a body of water over which wind 93 passes, flows, and/or blows. Wind 93 drives and turns the blades, e.g., 94, of a vertical-axis wind turbine rotatably connected to a generator (not shown) positioned inside the spar buoy 90. The blades, e.g., 94, of the wind turbine are fixedly attached to couplers, e.g., 95, which are, in turn, attached a central shaft 96 by spokes, e.g., 97.

Hingably connected to the flat back side 91 of the spar buoy 90 is a plurality of flaps, e.g., 98. Because of its vertical distribution of its buoyancy, the responsivity (e.g., the magnitude of its vertical oscillations) of spar buoy 90 is minimal. And, because of its relative immobility with respect to the heave of passing waves, flaps 98 interact, at least to a degree, with that heave. The angular range above and below horizontal through which the flaps can rotate and/or reorient is limited (e.g., to a range of +/−30 degrees away from horizontal). Additionally, the flaps resist deflections and/or deviations away from horizontal, and to a degree that is correlated to the magnitudes of the deflections (e.g., increasing exponentially with the angle of the deflection away from horizontal). Thus, the flaps tend to deflect at least a portion of the wave heave which creates forward thrust 99 (i.e., force imparted by the flaps against the hinges, shafts, and/or other hingable connectors, by which they are connected to the buoy).

A rudder 100 whose rotation about a vertical axis (e.g., via an electrical motor controlled hinge or gear) helps to guide the angular orientation, e.g., the course, of the device when thrust is generated by the flaps 98, and/or by the drag force imparted to the turbine 94 by the wind 93 that it obstructs.

The portion 101 of the spar buoy 90 that crosses the surface 92 of the water is of a smaller diameter than the lower portion of the buoy so that the responsivity of the buoy to heave wave motion is reduced.

At least a portion of the electrical power generated by the embodiment's generator in response to the wind-driven turning of the VAWT is communicated to, and/or consumed by, a plurality, plethora, network, assembly, collection, and/or array, of computational devices, circuits, devices, machines, and/or modules, positioned within the spar buoy 90, so as to provide at least a portion of those computational devices with the electrical power required to enable them to execute, process, complete, and/or compute, various computational tasks communicated to them from an external source, network, computer, customer, client, application, and/or system.

Figure 20:
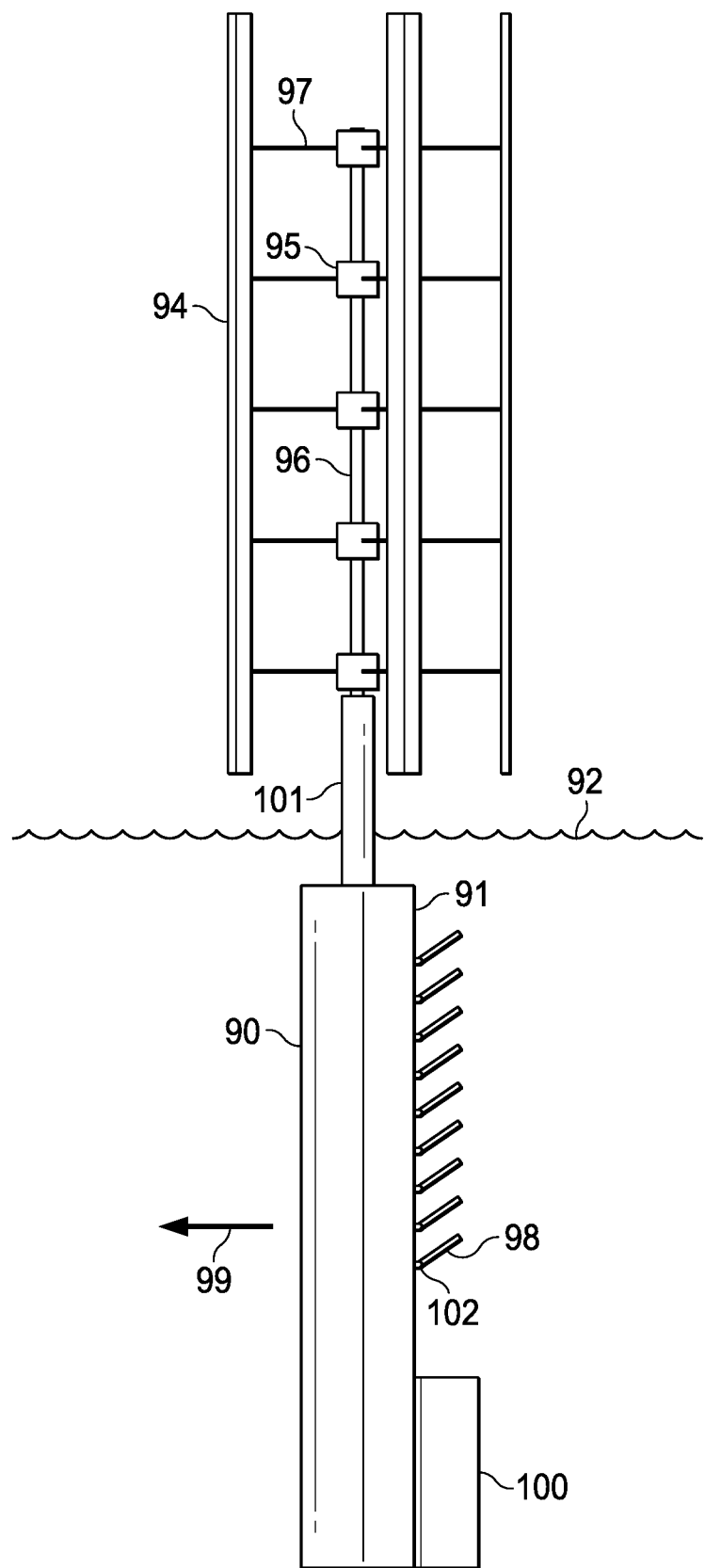
FIG. 20 is a side view of the embodiment of FIG. 19.

FIG. 20 shows a side view of the same embodiment illustrated and discussed in relation to FIG. 19.

Note that each flap, e.g., 98, rotates hingably about a hinge 102 and/or axis of rotation that is substantially horizontal and normal to the vertical longitudinal axis of the device.

Figure 21:
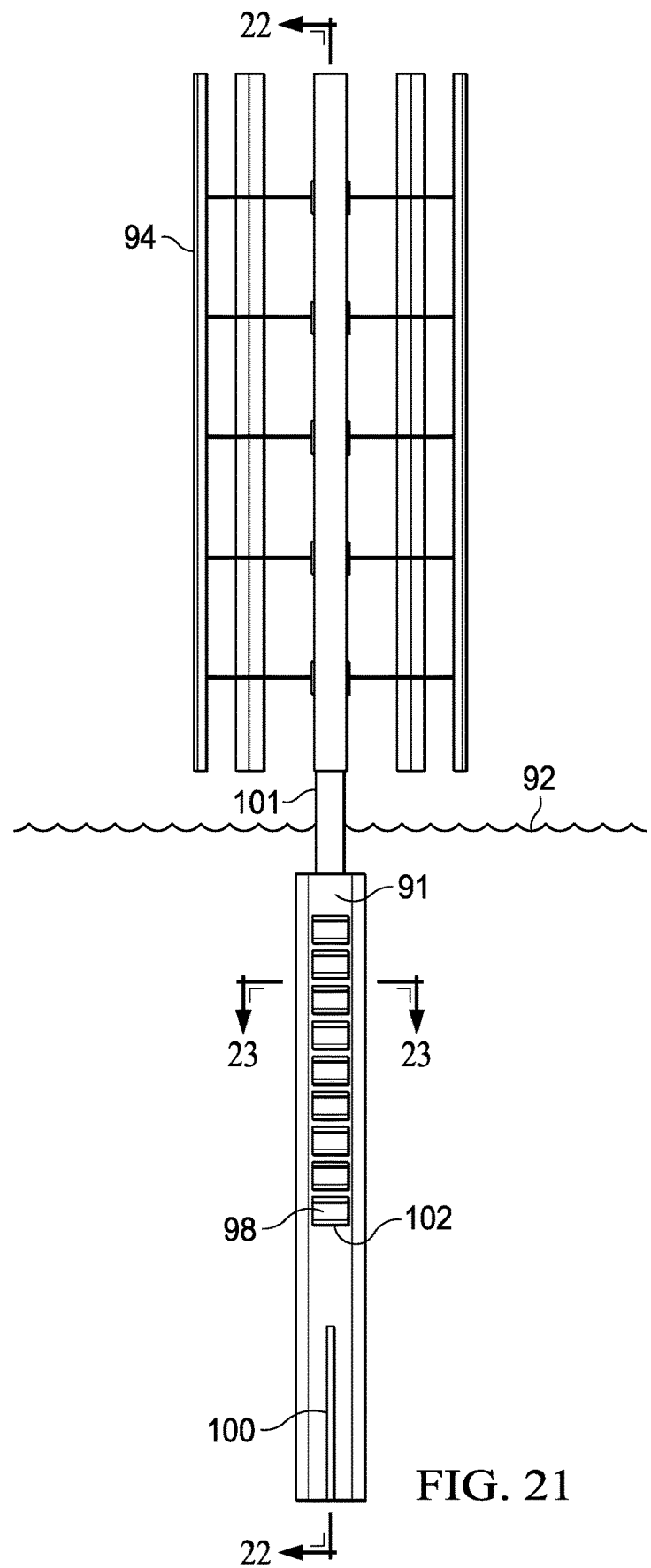
FIG. 21 is a back view of the embodiment of FIG. 19.

FIG. 21 shows a back view of the same embodiment illustrated and discussed in relation to FIGS. 19 and 20.

Figure 22:
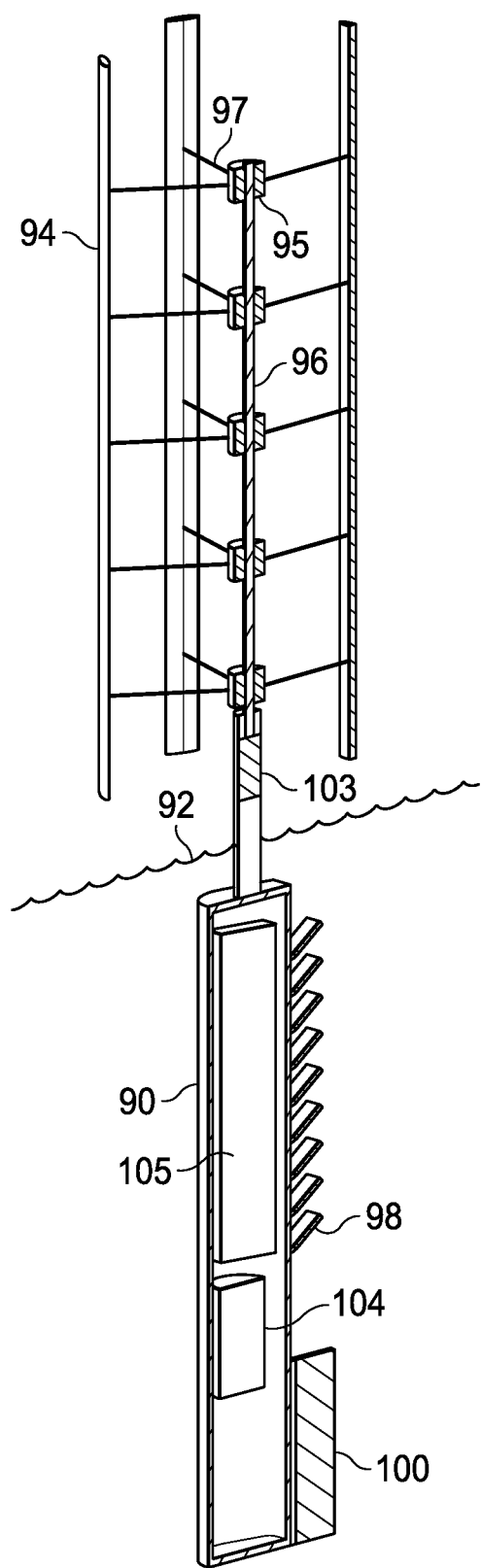
FIG. 22 is an elevated, perspective view of the embodiment of FIG. 19.

FIG. 22 shows a vertical sectional view of the same embodiment illustrated and discussed in relation to FIGS. 19-21, wherein the vertical section plane is specified in FIG. 21 and the section is taken across line 22-22.

Turbine shaft 96 is rotatably connected to alternator 103 positioned inside the narrow upper portion 101 of spar buoy 90. Through adjustments in the rate of current flow (and/or through the use of accessory electronics and/or circuits) the amount of resistive torque imparted to turbine 94, and correspondingly the amount of electrical power generated, may be adjusted and/or controlled.

Inside the at least partially hollow spar buoy 90 is an energy storage module 104 (e.g., a battery) which is charged and/or recharged, at least in part, with electrical energy generated by the alternator 103.

At least a portion of the electrical energy from the energy storage module 104 energizes, at least in part, a plurality, plethora, network, assembly, e.g., 105, collection, and/or array, of computational devices, circuits, devices, machines, and/or modules, positioned within the spar buoy 90, so as to provide at least a portion of those computational devices with the electrical power required to enable them to execute, process, complete, and/or compute, various computational tasks communicated to them from an external source, network, computer, customer, client, application, and/or system.

Computational modules, e.g., 105, are mounted against an interior wall of the hollow buoy 790. At least a portion of the heat generated by the computational circuits therein is conductively communicated through the adjacent and/or common surfaces of the circuits, e.g., 105, and the buoy 90, and thereafter transferred, at least in part, into the surrounding water 92, thereby passively cooling those circuits and avoiding the need to expend additional energy to achieve that cooling.

An embodiment similar to the one illustrated and discussed in relation to FIGS. 19-22 utilizes an energy storage module that comprises, at least in part, technologies including, but not limited to the following:

batteries,
hydrogen electrolysis and hydrogen storage,
fuel cells,
capacitors,
fly wheels, and
pressurized gases (e.g., air and/or nitrogen).

Figure 23:
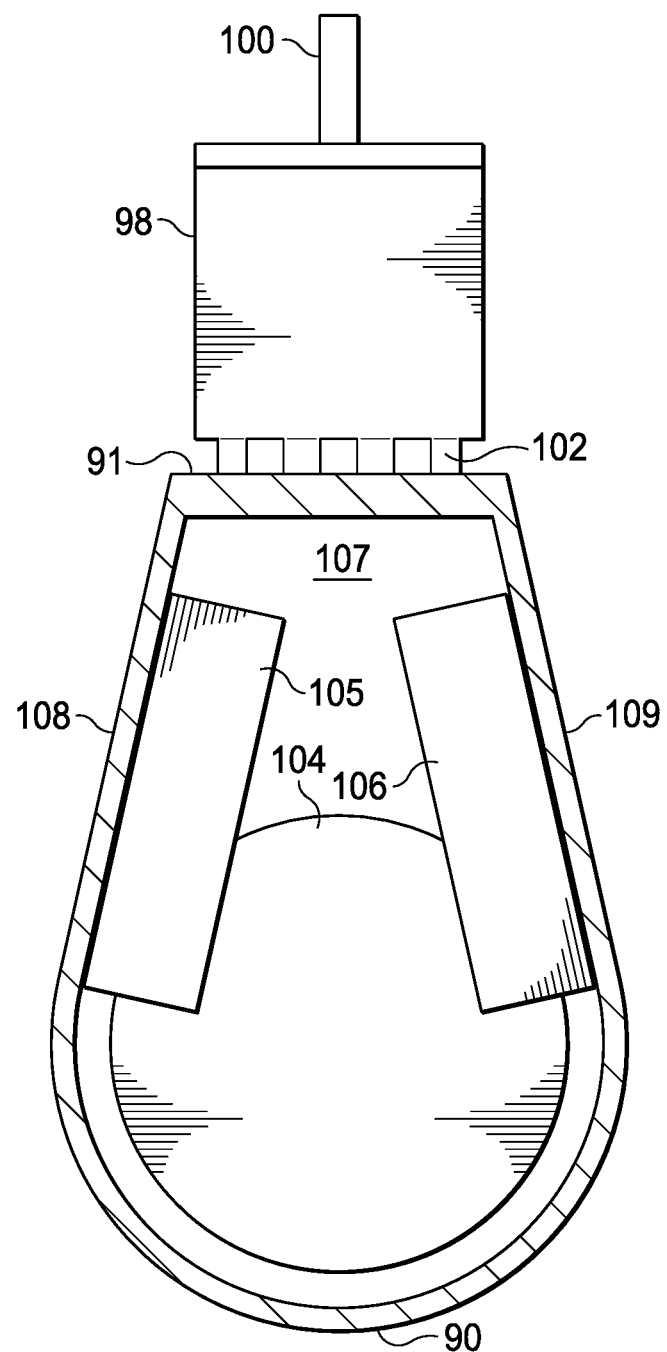
FIG. 23 is a sectional view of the embodiment of FIG. 19.

FIG. 23 shows a horizontal sectional view of the same embodiment illustrated and discussed in relation to FIGS. 19-22, wherein the vertical section plane is specified in FIG. 21 and the section is taken across line 23-23.

Inside spar buoy 90, and positioned adjacent to the walls that interface with the ambient water, are two computational modules 105 and 106. At least a portion of the heat generated by the computational circuits in each computational module 105 and 106 passes through the spar buoy's walls (e.g., at 108 and 109, respectively) and into the seawater, thereby passively cooling those circuits. Likewise, energy storage module 104 is, at least to a degree, passively cooled due to its adjacency to the spar buoy's walls.

Figure 24:
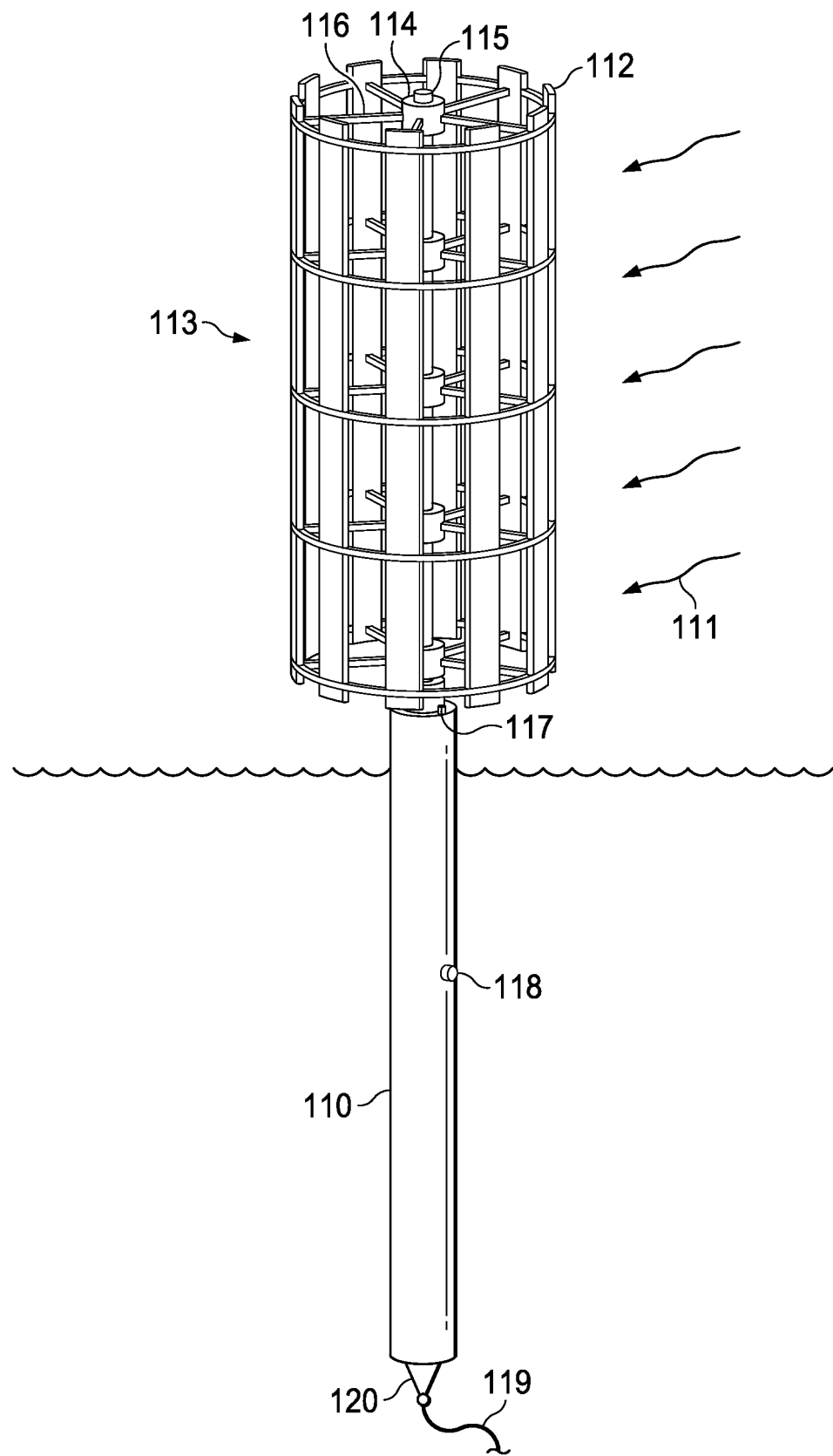
FIG. 24 is an elevated, perspective view of another embodiment of the present invention.

FIG. 24 shows a perspective view of an embodiment of the current disclosure. The illustrated embodiment extracts energy from the wind by means of a vertical-axis wind turbine (VAWT).

An approximately cylindrical "spar buoy" 110 floats adjacent to an upper surface of a body of water over which wind 111 passes, flows, and/or blows. Wind 111 drives and turns the blades, e.g., 112, of a vertical-axis wind turbine 113 rotatably connected to a generator (not shown) positioned inside the spar buoy 110. The blades, e.g., 112, of the wind turbine are fixedly attached to couplers, e.g., 114, which are, in turn, attached a central shaft 115 by spokes, e.g., 116.

The embodiment 110 lacks any "active" propulsion, and instead best approximates a desired course and speed by raising and lowering itself (i.e., its waterline) relative to the surface of the body of water on which it floats. At an upper surface of the spar buoy 110 is an electrically controlled and/or actuated check valve 117 that when activated opens a channel and/or aperture between a "ballast chamber" in an upper portion of the spar buoy 110 and the outside air above the water. At a lower point along the spar buoy is a channel 118 that connects the bottom of the ballast chamber to the sea.

When the check valve 117 is activated, air is able to enter the ballast chamber, but is not able to escape. Thus each time the spar buoy rises in response to an approaching wave crest, and the water level inside the ballast chamber falls, air is sucked into the chamber. Conversely, when the spar buoy falls in response to an approaching wave trough, any increase of the water level inside the ballast chamber is inhibited by the trapped air and its increase in pressure. In response to a succession of waves, the mass of the spar buoy is decreased through the replacement of water in the ballast chamber with equivalent volumes of air. As the mass of the spar buoy is reduced it rises in the water, and each successive wave tends to the further lower the level of water in the ballast chamber.

By contrast, when the check valve 117 is deactivated (and opened), air is able to leave the ballast chamber and the water level therein rises until the intrinsic buoyancy of the spar buoy 110 is balanced by its displaced volume in the body of water.

By controlling the activation and deactivation of the check valve 117, any desired depth of the spar buoy, within a range of achievable depths, can be achieved.

Raising the spar buoy 110, e.g., to its minimum depth, exposes more of its cylindrical surface to any prevailing winds which would tend to impart wind-drag-related forces and/or thrust to the buoy. Likewise, raising the spar buoy will tend to expose less of its cylindrical surface to any prevailing surface currents, thereby tending to reduce the current-drag-related forces and/or thrust imparted to the buoy.

Conversely, lowering the spar buoy 110, e.g., to its maximum depth, exposes less of its cylindrical surface to any prevailing winds which would tend to reduce any wind-drag-related forces and/or thrust imparted to the buoy. Likewise, lowering the spar buoy will tend to expose more of its cylindrical surface to any prevailing surface currents, thereby tending to increase the current-drag-related forces and/or thrust imparted to the buoy.

Raising and lowering the spar buoy in order to change the relative degrees to which the buoy is driven to drift in response to prevailing winds and prevailing surface currents provides some measure of directional control.

The embodiment 110 is propelled, at least in part, by a submerged flexible water-filled enclosure (not shown), envelope, bag, and/or vessel, flexibly connected to the buoy by a rope, cable, chain, linkage, and/or other flexible connector 119, said bag serving as an "inertial mass" which is moved in response to the flow of subsurface currents and tends to pull the embodiment along with itself and the current that pulls it. The flexible connector 119 is connected to a portion 120 of the buoy 110 that projects down from the bottom.

At least a portion of the electrical power generated by the embodiment's generator in response to the wind-driven turning of the VAWT is communicated to, and/or consumed by, a plurality, plethora, network, assembly, collection, and/or array, of computational devices, circuits, devices, machines, and/or modules, positioned within the spar buoy 90, so as to provide at least a portion of those computational devices with the electrical power required to enable them to execute, process, complete, and/or compute, various computational tasks communicated to them from an external source, network, computer, customer, client, application, and/or system.

An embodiment similar to the one illustrated in FIG. 24 interacts with subsurface currents utilizing a submerged "kite" in order to generate propulsion.

An embodiment similar to the one illustrated in FIG. 24 lacks a submerged inertial mass, and flexible connector thereto connecting it.

Figure 25:
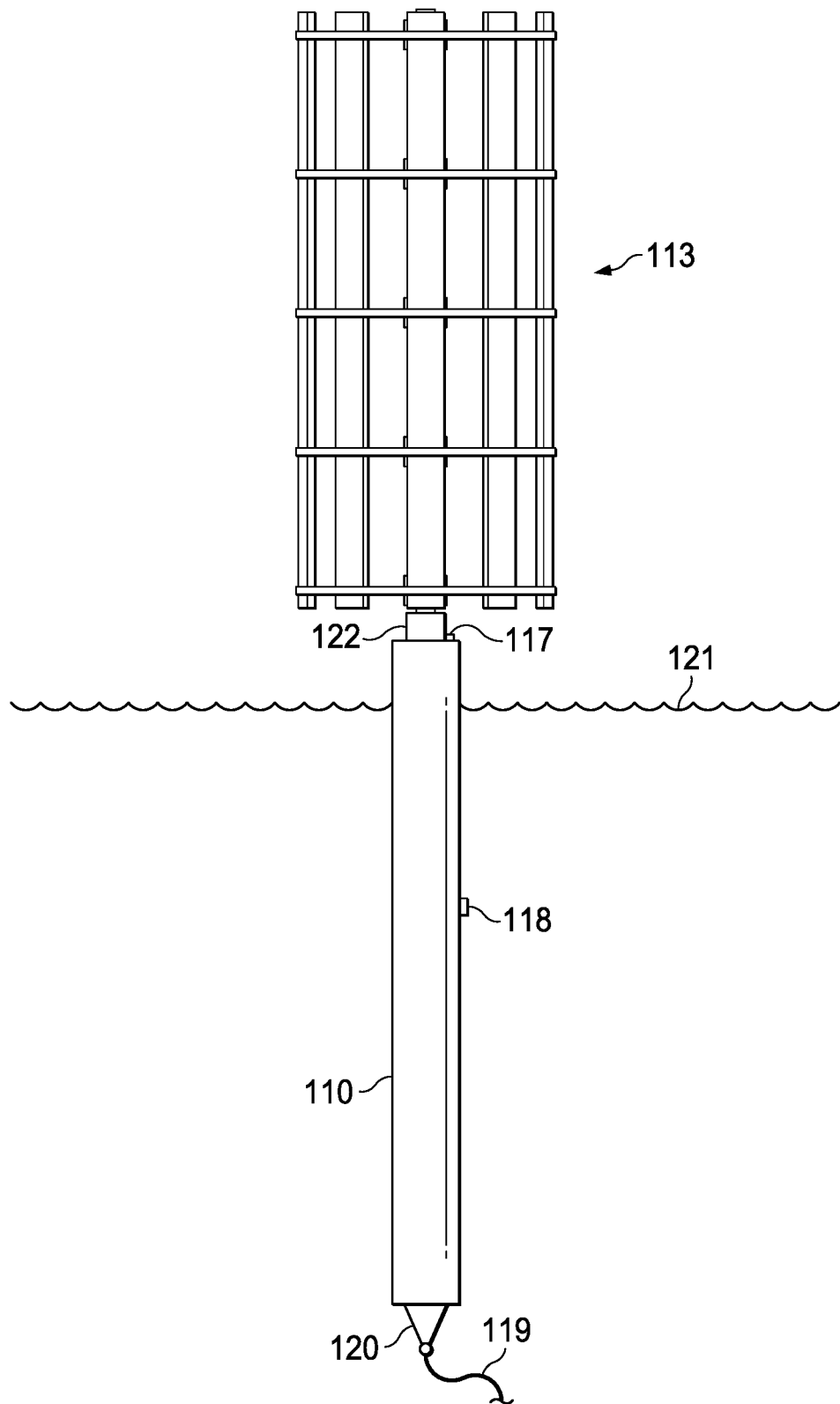
FIG. 25 is a side view of the embodiment of FIG. 24.

FIG. 25 shows a side view of the same embodiment illustrated and discussed in relation to FIG. 24. The embodiment floats adjacent to an upper surface 121 of a body of water over which wind blows.

Turbine 113 is rotatably connected to, and energizes, a generator 122.

Figure 26:
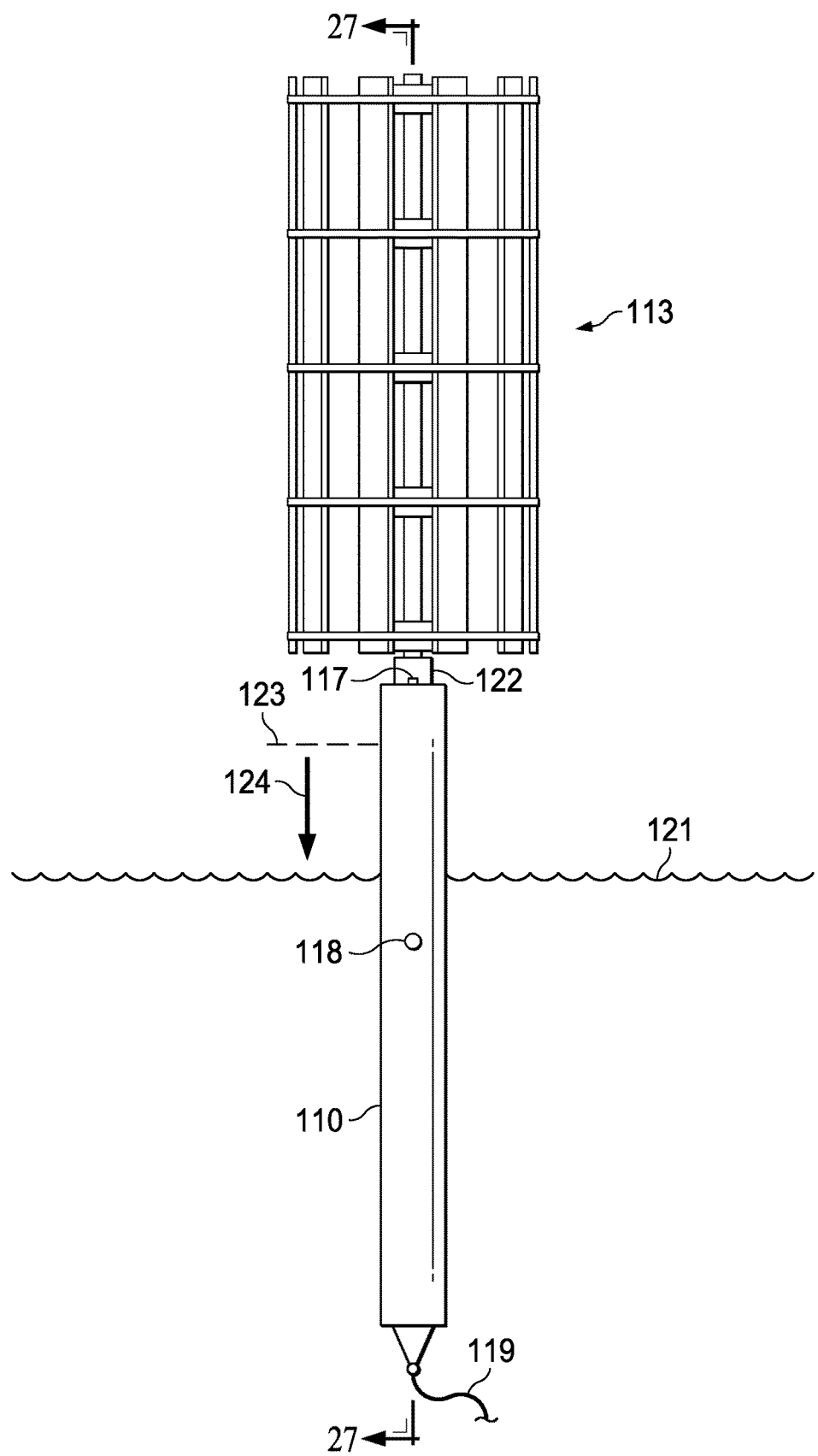
FIG. 26 is another side view of the embodiment of FIG. 24.

FIG. 26 shows a different side view of the same embodiment illustrated and discussed in relation to FIGS. 24 and 25. Note that the configuration of the embodiment illustrated in FIG. 26 differs from the one illustrated in FIG. 25 with the result that the embodiment's mean waterline 121 in FIG. 26 is lower, and therefore the average depth of the device in FIG. 26 is less, than the corresponding waterline 123 and depth of the device as configured in FIG. 25. The device illustrated in FIG. 26 is raised relative to the device illustrated in FIG. 25 because the device in FIG. 26 has an activated check valve 117 that has caused air to have been taken in to the device's ballast chamber, and water to have been expelled, thus decreasing the mass of the device, and causing it to float higher above the surface of the water, and causing its mean waterline to move 124 downward.

Figure 27:
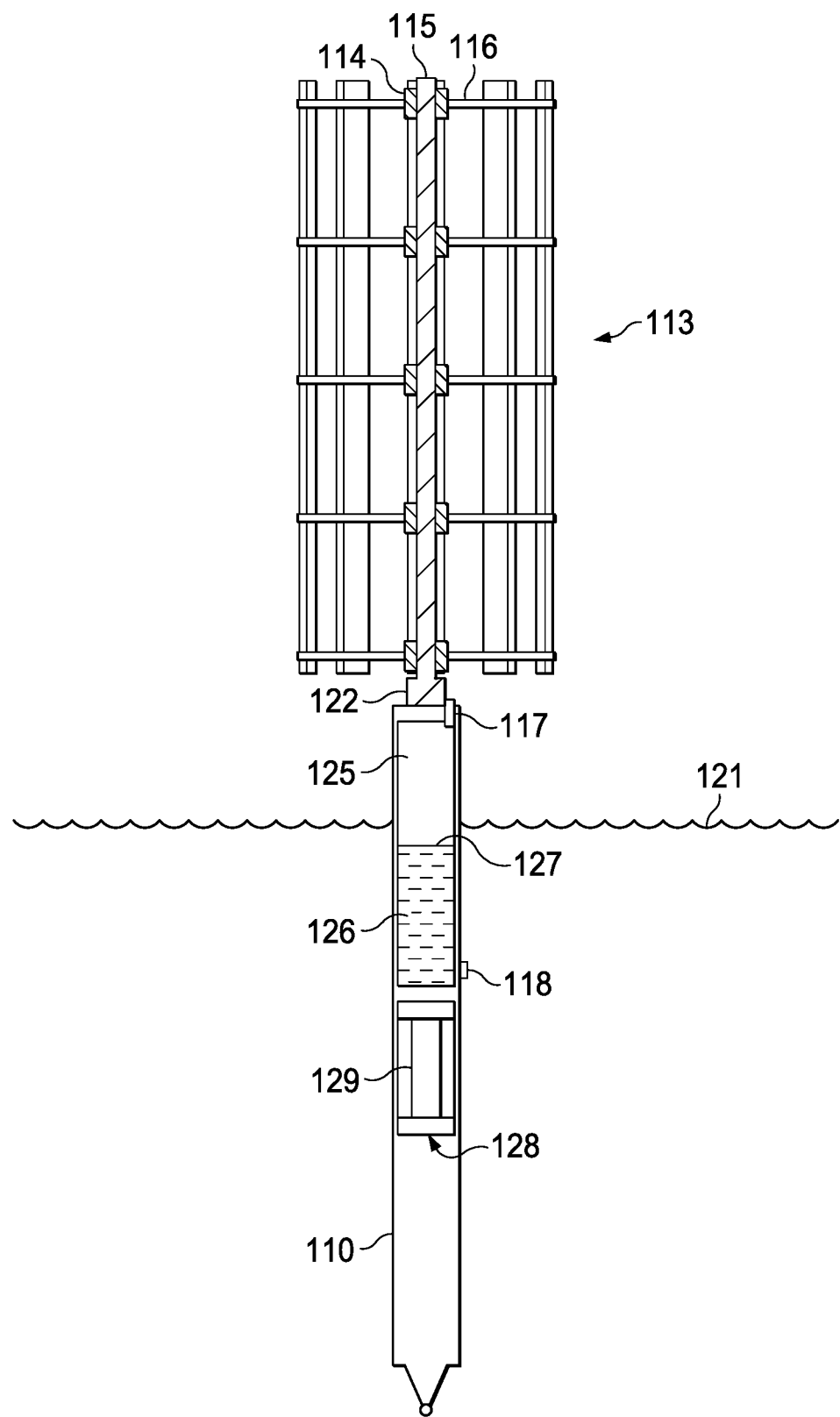
FIG. 27 is a sectional view of the embodiment of FIG. 24.

FIG. 27 shows a vertical sectional view of the same embodiment illustrated and discussed in relation to FIGS. 24-26, wherein the vertical section plane is specified in FIG. 26 and the section is taken across line 27-27.

Inside spar buoy 110 is a ballast chamber 125/126 in which an upper portion 125 is filled with air, and a lower portion 126 is filled with water, with the upper and lower portions being divided at a ballast-chamber waterline 127. When check valve 117 is activated and/or engaged, air is allowed to flow in (e.g., when the pressure of the air in the chamber is lower than that of the air outside the buoy), but it is not allowed to flow out (e.g., when the device is falling in response to an approaching wave trough and the pressure of the water outside aperture 118 is increasing).

Inside a chamber 128 within spar buoy 110 is a cylindrically-shaped and/or annular computational module 129, an outer surface of which is adjacent to the wall of the spar buoy thereby facilitating the passive conduction of heat from the computational module 129 into the seawater outside the buoy.

Figure 28:
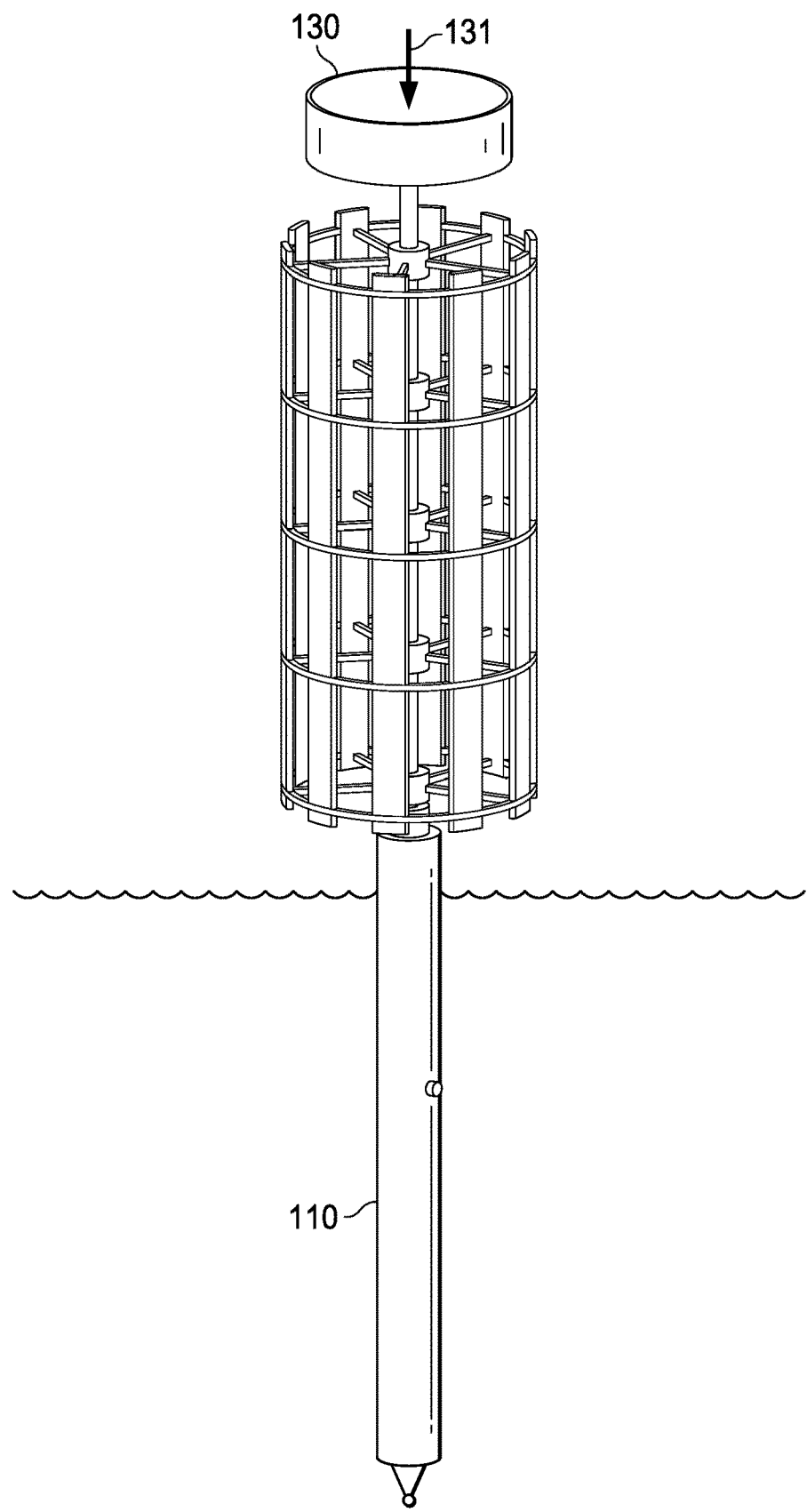
FIG. 28 is an elevated, perspective view of the embodiment of FIG. 28.

FIG. 28 shows a perspective side view of an embodiment similar to the one illustrated and discussed in relation to FIGS. 24-27. The embodiment illustrated in FIG. 28 incorporates a "crow's nest" 130 mounted atop the turbine shaft (but rotatably separated from the turbine shaft such that it tends to not spin in concert with the turbine) into which an aerial drone may descend 131 and dock with the embodiment. This embodiment has an interface and/or API within the crow's nest such that a properly configured aerial drone can land within the crow's nest and dock with, and/or connect to, the API.

The API allows a drone to receive electrical power in order to recharge its own batteries (and/or to receive another energy such as, but not limited to, hydrogen so as to refill its pressurized hydrogen canisters for use with onboard fuel cells). The API allows a drone to exchange data with the computational module 129. For example, a properly configured drone can download to the computational module programs and/or data to be processed therein. A properly configured drone can also upload from the computational module results generated by the module as a consequence of its execution of programs and/or data, e.g., such as might have been downloaded by a same, or a different, drone.

Figure 29:
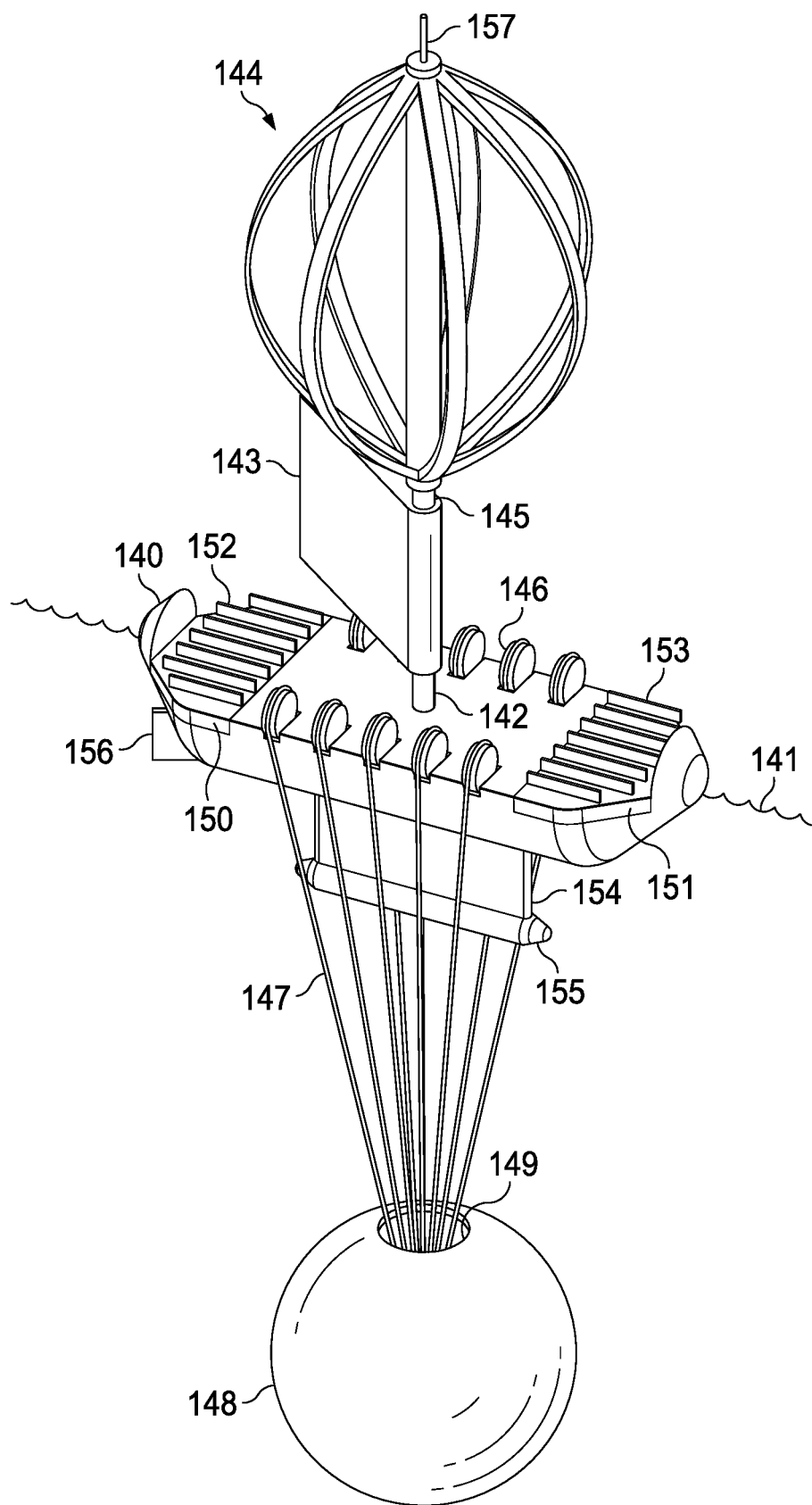
FIG. 29 is an elevated, perspective view of another embodiment of the present invention'

FIG. 29 shows a perspective view of an embodiment of the current disclosure. A buoy 140, flotation module, floating platform, vessel, raft, and/or buoyant object, floats adjacent to the surface 141 of a body of water over which waves and winds pass.

The embodiment illustrated in FIG. 29 extracts energy from both winds and waves.

Rotatably mounted atop a cylindrical pole 142 to which a rigid sail 143 is attached, is a "Darrieus" wind turbine 144. When buffeted by wind, the turbine 144 causes the shaft 145 to which it is attached to rotate, thereby causing the rotation of an extension of that shaft 145 through the hollow cylindrical outer pole 142. The shaft 145 passes out of a lower end of pole 142 and rotatably engages a generator (not shown, and positioned within the buoy 140), thereby causing rotations of the turbine to result in the generation of electrical power.

Attached to, mounted on, and/or incorporated within, the buoy 140 is a plurality of pulleys, e.g. 146, and rotatably connected wave-driven power take-offs (PTOs) and/or electrical power-generation assemblies. PTO-specific cables, e.g. 147, chains, ropes, linkages, and/or flexible connectors, connect each respective PTO to the approximate center of a submerged inertial mass 148. The cables pass through a hole 149 and/or aperture in a top surface of the inertial mass 148.

Mounted on and/or in, attached and/or affixed to, and/or incorporated within, the buoy 140 are two "computing chambers and/or modules" 150 and 151. These are sealed, waterproof chambers inside of which are mounted and/or affixed computing circuits, computing devices, and/or computing resources and/or networks. The computing circuits are energized directly and/or indirectly by electrical power generated by the embodiment's wind- and wave-driven PTOs in response to wave action. Thermally-conductive fins, e.g. 152 and 153, are affixed to top surfaces of the respective computing chambers 150 and 151. These fins expedite the transfer of heat, generated by computers within the computing chambers, to the air above and/or around the embodiment.

The illustrated embodiment 140 contains and/or incorporates a keel 154, with a weighted end 155, that enhances and/or promotes the stability of the device. The embodiment 140 also incorporates a rigid sail 143 that is able to impart thrust to the device when driven by wind. The amount of thrust being adjustable and/or able to be optimized through the rotation of the sail to an optimal angle with respect to the wind direction. A rudder 156 allows the device's control system (e.g. one or more computers that control the behavior of the device) to steer the embodiment when it is moved in response to wind passing over its rigid sail 143.

An antenna 157 mounted on, and/or affixed to, the top of the rigid sail 143 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 30:
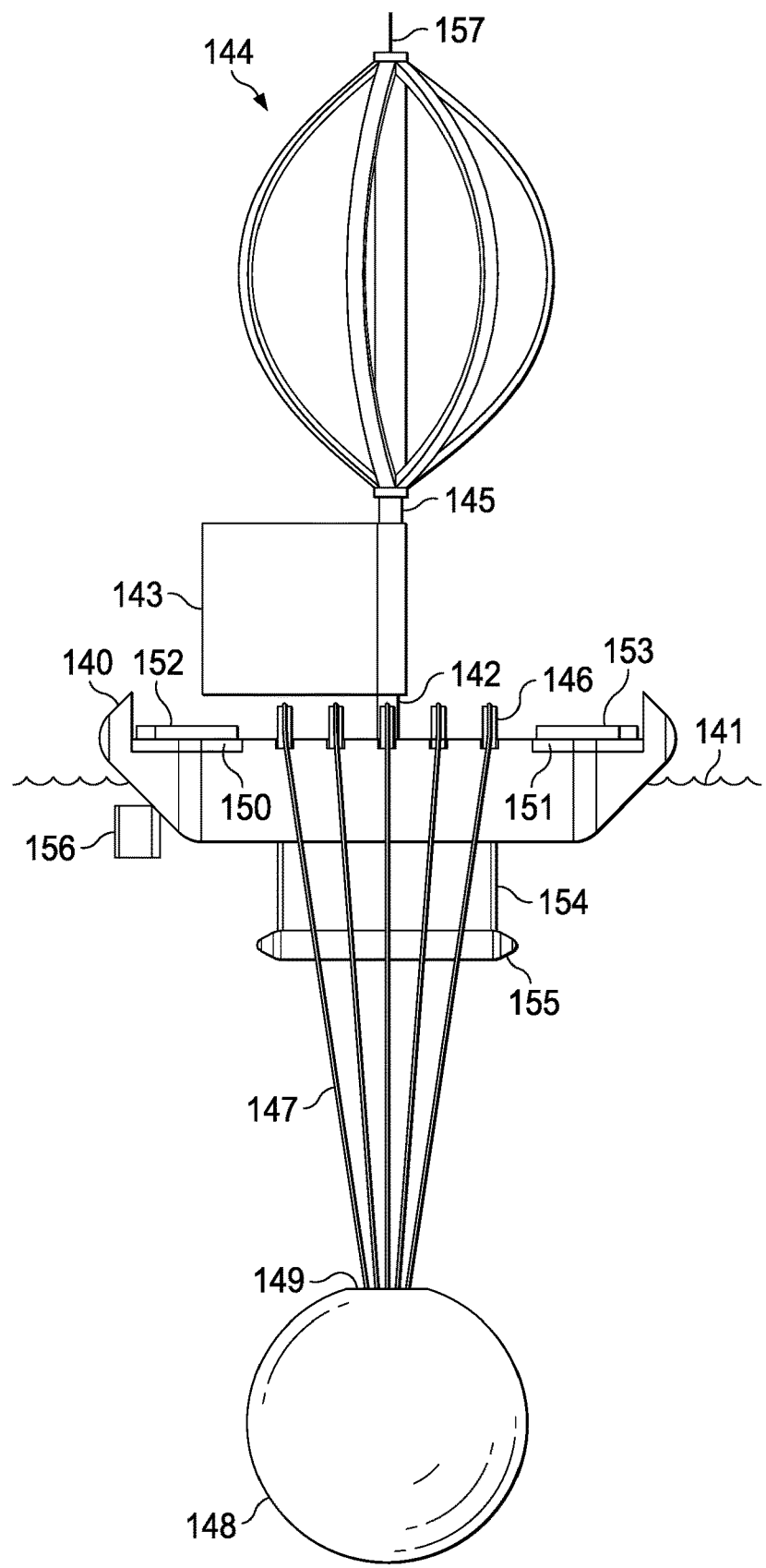
FIG. 30 is a side view of the embodiment of FIG. 29.

FIG. 30 shows a side view of the same embodiment illustrated and discussed in relation to FIG. 29.

Figure 31:
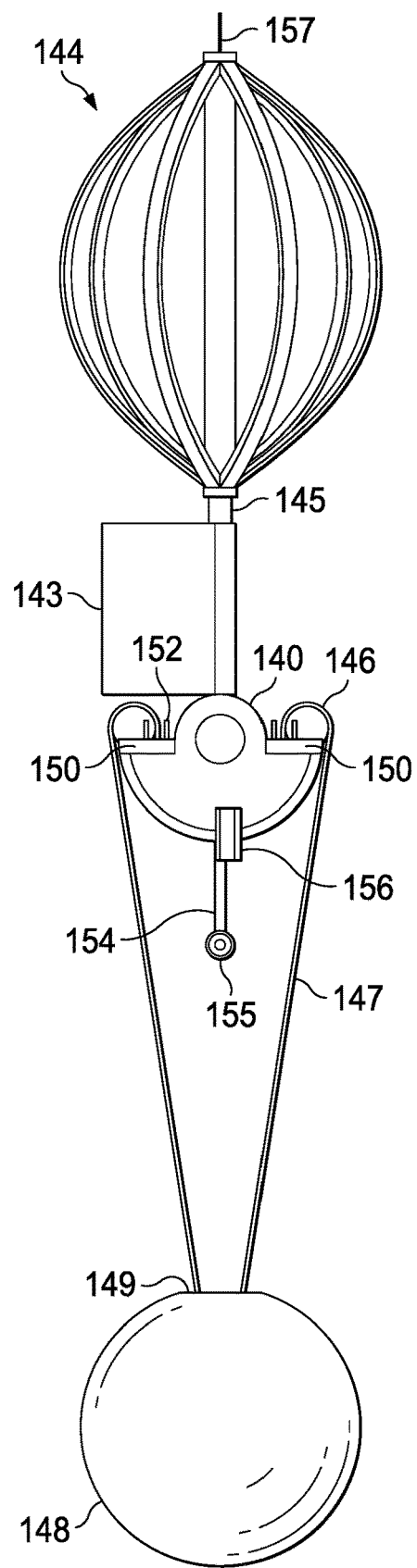
FIG. 31 is a back view of the embodiment of FIG. 29.

FIG. 31 shows a back-side view of the same embodiment illustrated and discussed in relation to FIGS. 29 and 30.

Figure 32:
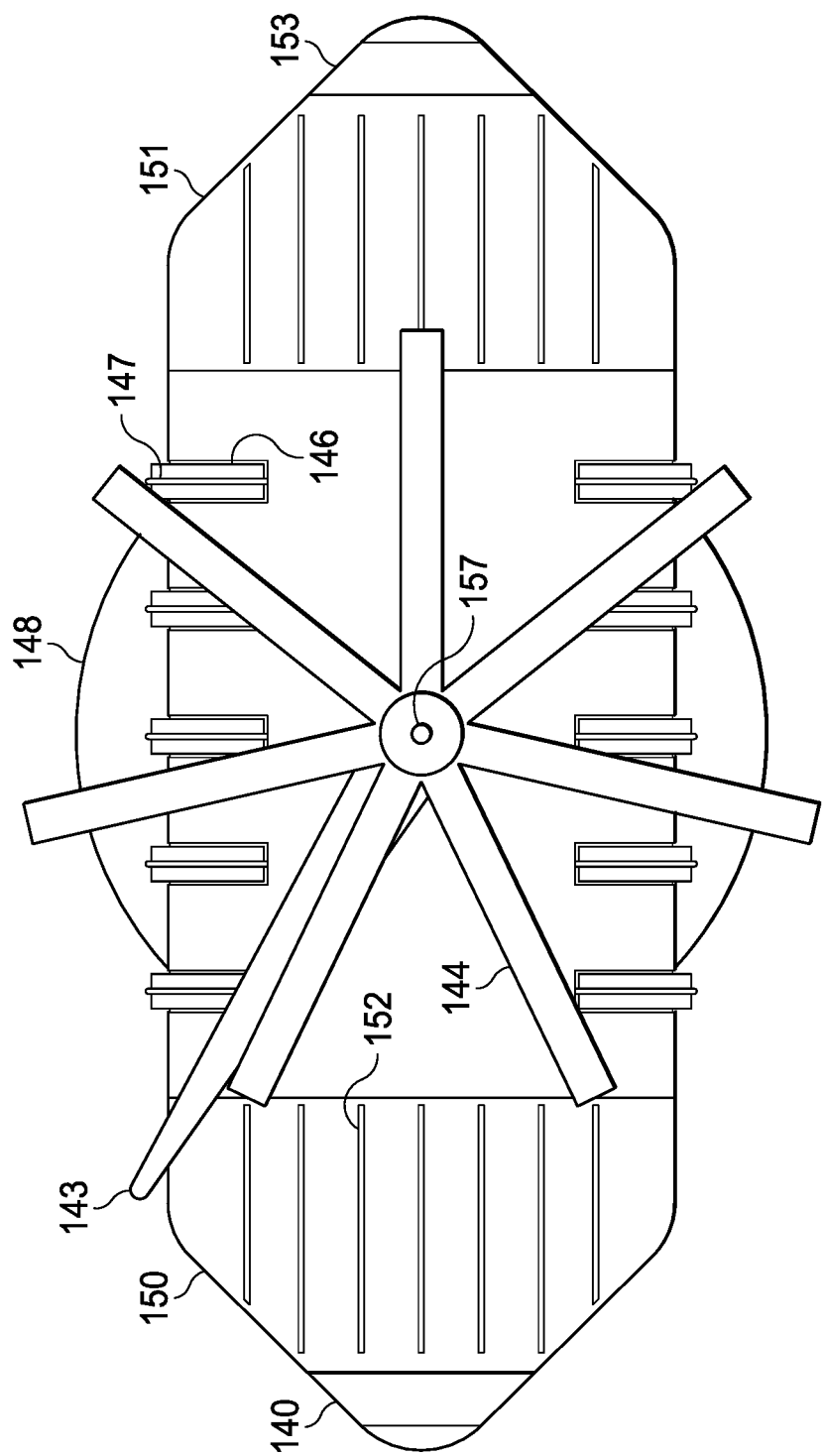
FIG. 32 is a top view of the embodiment of FIG. 29.

FIG. 32 shows a top-down view of the same embodiment illustrated and discussed in relation to FIGS. 29-31.

Figure 33:
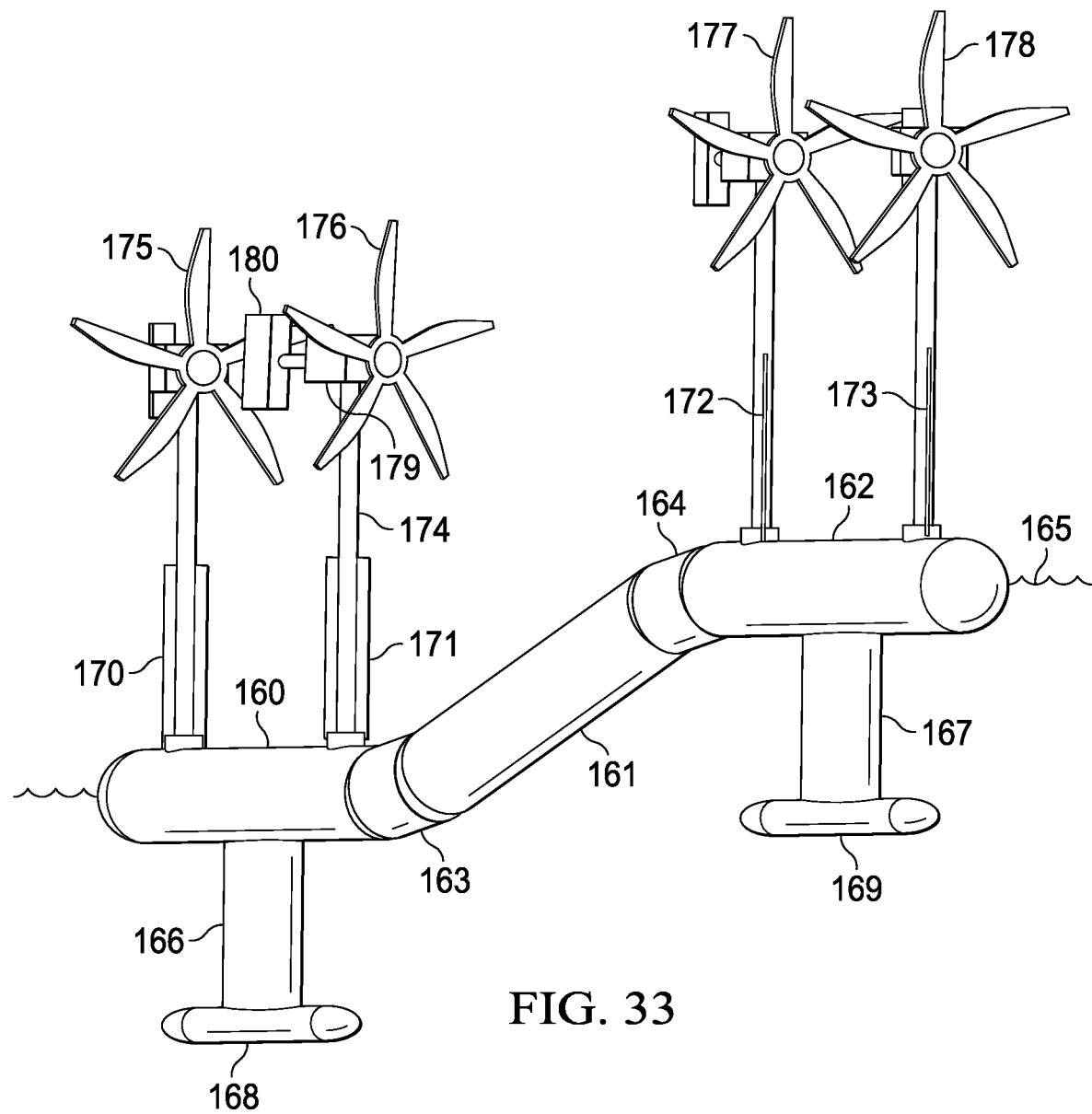
FIG. 33 is an elevated, perspective view of another embodiment of the present invention.

FIG. 33 shows a side perspective view of an embodiment of the current disclosure.

The illustrated embodiment floats adjacent to an upper surface 165 of a body of water over which waves and winds pass. The embodiment is comprised of hinged tubular sections 160-164, three 160-162 of which are relatively long and contain computational equipment and circuits, and two 163-164 contain wave-driven power take-offs that utilize and/or incorporate hydraulic rams that convert the flexing between the adjacent tubular sections into pressurized hydraulic fluid, which then flows through at least one hydraulic generator, thereby generating electrical power. End segments 160 and 162 incorporate keels 166 and 167, respectively, each of which is connected to respective weights 168 and 169.

Atop the two end segments 160 and 162 are rigid vertical panels 170-173 that are rotatably connected to their respective tubular segments 160 and 162. By varying the angles of the panels with respect to the direction of the prevailing wind, lateral and forward thrusts may be applied to each respective segment. The application of dissimilar thrust vectors to each end segment allows the entire to move forward as well as execute turns.

Rotatably connected to the top of each of the poles, e.g., 174, or struts, that provide structural support for each respective rigid vertical panel, e.g., 171, are respective horizontal-axis wind turbines 175-178. Each turbine, e.g., 176, is connected to, and rotates, a shaft that is supported by a respective nacelle, e.g., 179, and rotatably connects to the rotor of a respective generator positioned inside the nacelle. Each nacelle, and thereby each turbine, is able to rotate about the longitudinal axis of its respective pole, and a wind vane, e.g., 180, attached to each nacelle, tends to cause each turbine to be turned into the prevailing wind such that the rotational axis of each turbine is parallel to the direction of the wind, thereby maximizing the cross-sectional (and/or "swept area") of each turbine and the resulting energy captured from the wind.

The blades of each turbine may be feathered in order to minimize and/or control the amount of energy captured from the wind.

At least a portion of the electrical power generated by the embodiment's wind turbines and wave-driven power take-offs is communicated to, and/or consumed by, a plurality, plethora, network, assembly, collection, and/or array, of computational devices, circuits, devices, machines, and/or modules, positioned within each of the relatively long tubular sections 160-162 of the embodiment, so as to provide at least a portion of those computational devices with the electrical power required to enable them to execute, process, complete, and/or compute, various computational tasks communicated to them from an external source, network, computer, customer, client, application, and/or system.

At least a portion of the heat generated by the computational modules sequestered within the long tubular sections 160-162 is convectively and/or conductively communicated through the walls of those tubular sections, and thereafter transferred, at least in part, into the surrounding water 165, thereby passively cooling those circuits and avoiding the need to expend additional energy to achieve that cooling.

Figure 34:
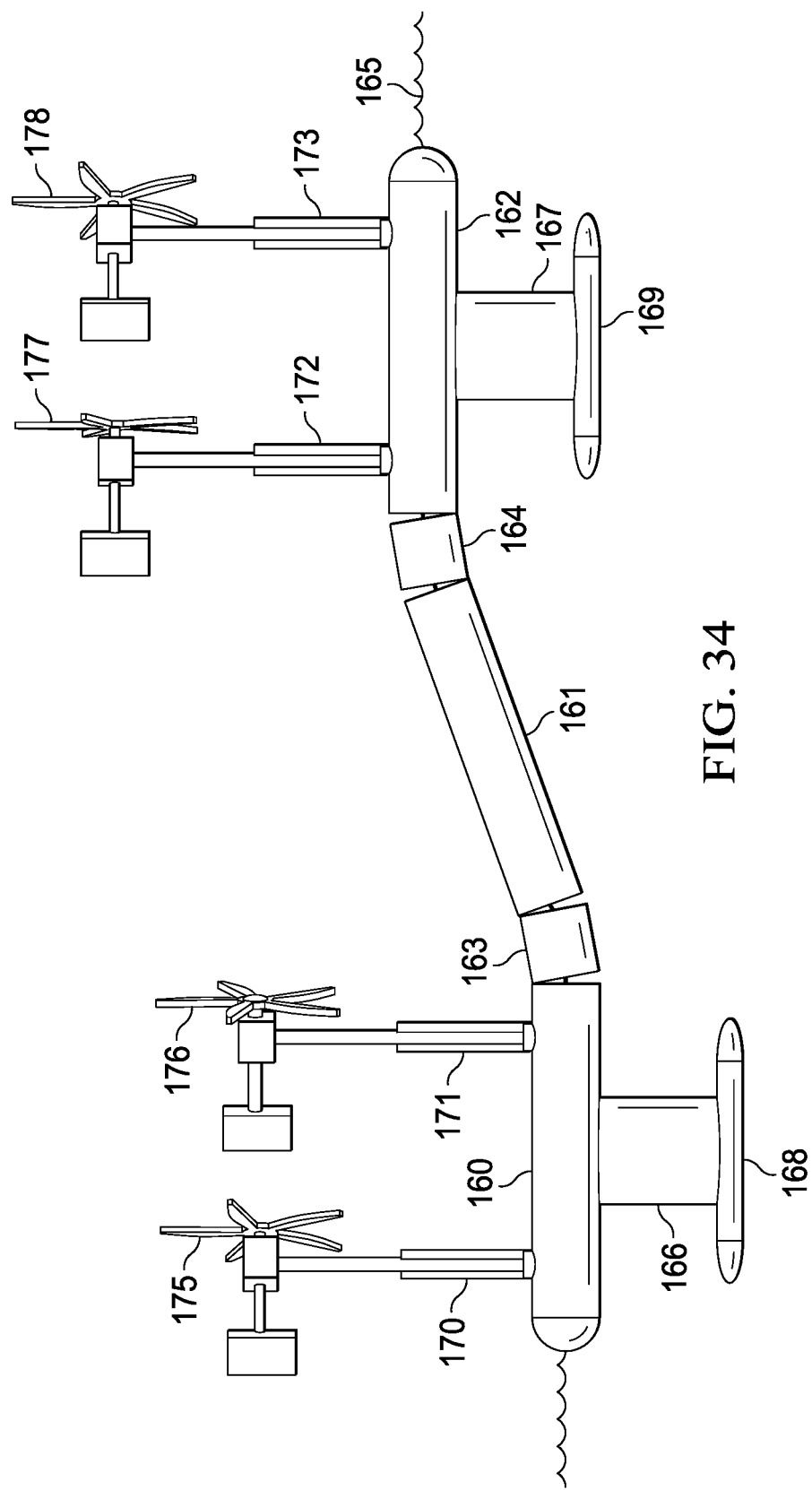
FIG. 34 is a side view of the embodiment of FIG. 33.

FIG. 34 shows a side view of the same embodiment illustrated in FIG. 33.

Figure 35:
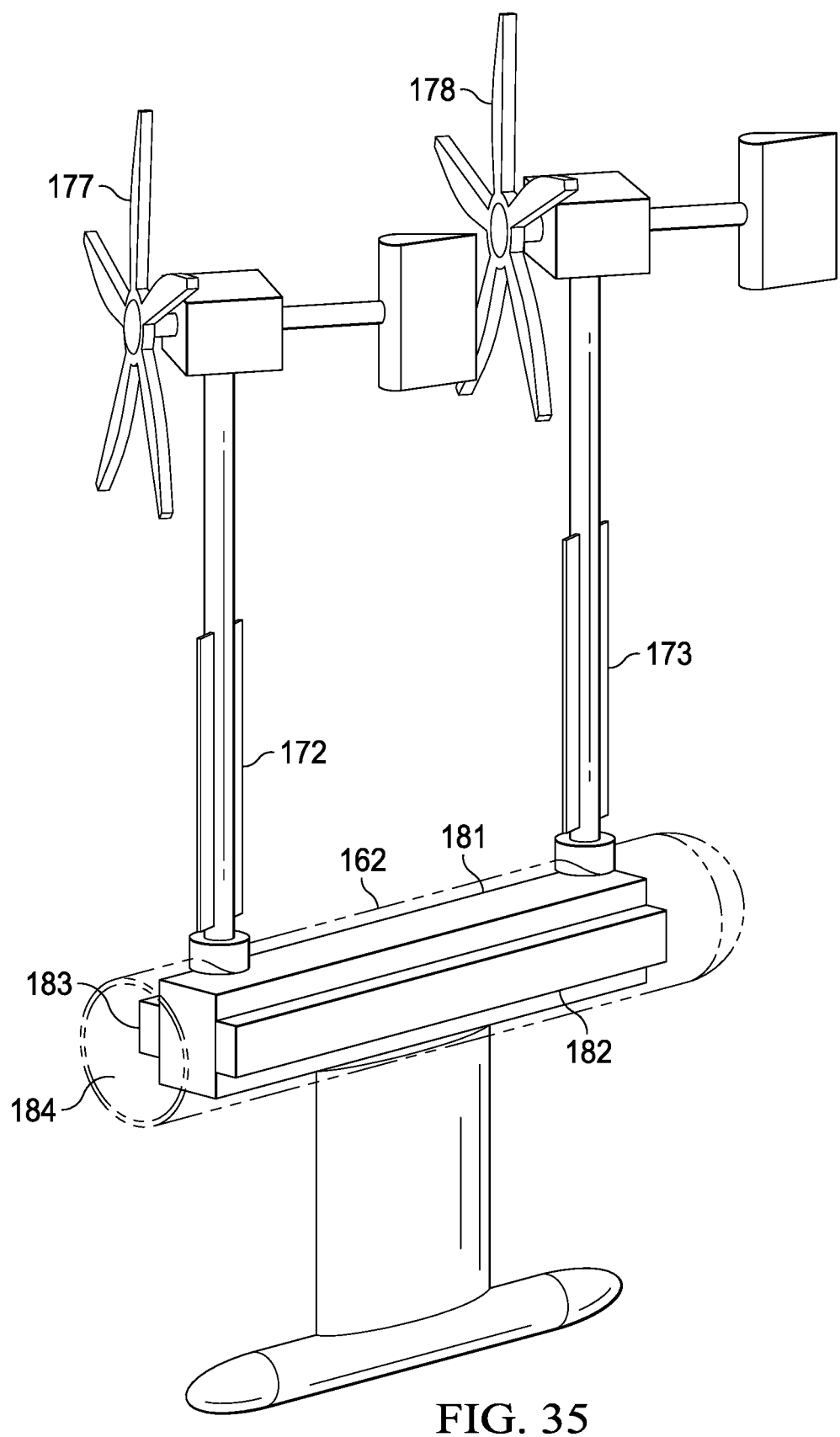
FIG. 35 is an enlarged, sectional view of the embodiment of FIG. 33.

FIG. 35 shows a side perspective view of one of the long tubular sections characterizing the same embodiment illustrated in FIGS. 33 and 34. The outer cylindrical wall of the illustrated tubular section is drawn as semi-transparent in order to better reveal the inside of the tube.

Tubular section 162 contains a computational module 181 comprising arrays, racks, and/or assemblies, of computing devices, computing circuits, computers, and/or computational equipment and/or resources, as well as energy-storage modules 182 and 183, units, and/or assemblies.

At least a portion of the electrical power generated in response to wind and/or wave action on the device is stored in energy-storage modules 182 and 183, units, and/or assemblies, positioned within the tubular section 162 and which may include, but is not limited to: batteries, capacitors, and/or chemical fuel (e.g. hydrogen) generators and storage mechanisms.

The computational module 181 comprising arrays, racks, and/or assemblies, of computing devices, computing circuits, computers, and/or computational equipment and/or resources mounted and/or positioned within tubular section 162 are energized, at least in part, by at least a portion of the electrical power generated by the wind turbines and the hydraulic PTOs in the shorter tubular sections (163 and 165 in FIGS. 33 and 34).

In some embodiments, the space within the tubular section 162 in which the computers are affixed and operate is filled with air. In other embodiments, it is filled with a heat-conductive fluid, and/or a phase-change material. The heat transferred from the computers, as they consume electrical power, to the air or liquid surrounding them, is thereafter transferred to the thermally-conductive walls, and/or a portion thereof, which transfers it to the water (165 in FIGS. 33 and 34) on which the device floats. This process of heat transfer efficiently and passively cools the computers and energy modules.

FIG. 36 shows a perspective view of an embodiment of the current disclosure. The illustrated embodiment extracts energy from both the heave of waves and the blowing of winds.

The embodiment 190 floats adjacent to an upper surface 191 of a body of water over which winds and waves pass. It 190 incorporates a Darrieus-type wind turbine 192 atop a rigid sail 193, with the turbine and the sail sharing coaxial concentric shafts. When air blows through the turbine causing it to rotate then a rotatably connected generator positioned within the buoy 190 is energized and produces electrical power.

The embodiment also extracts energy from heave of waves by means of two arrays of oscillating water columns (OWCs) embedded within opposing and parallel airfoil shaped keels 194 and 195. A rigid sail 193 rotatably connected to the top of the device provides wind-driven propulsion, and a rudder moveably connected to each keel permits the device to be steered.

Opposing pairs of airfoil-shaped keels 194 and 195 support a platform 190 at an upper portion of the device and typically above the water line 191. The keels are supported by a crossing assemblage of truss struts, e.g., 196.

A rigid sail 193 is attached to a shaft 197 which is rotated by a mechanism within the upper portion 190 of the device. Rudders 198 and 199 allow the thrust imparted to the device by the rigid sail 193 to be controlled and used to direct the motion of the device to desired angular orientations and/or geospatial coordinates.

Within each keel 194 and 195 are five OWC tubes whose lower mouths open to the sea at the bottoms 200 and 201 of their respective keels 194 and 195. And, whose respective upper mouths 202 and 203 are constricted, forming Venturi nozzles in the throats of which are turbines and rotatably-connected generators.

As a wave approaches, the pressure that would raise the level of water in each OWC tube increases. However, due to the significant length of each tube, and the significant volume and inertia of the water therein, the increase in the force pushing the water in each tube upwards results in only a relatively small acceleration of that water. However, in the same way that the inertia of the water in the OWC tubes resists its rise, it also resists its descent. And, by the time the wave has passed, and the device has begun to descend, in concert with the falling water level outside the device, the inertia of the water in the tube delays that water's reversal of its prior rising, with the result that the water continues rising, albeit while decelerating. The continued rise of the level of the water in the OWC tubes, coupled with the downward acceleration of the nozzles through which the compressed air must exit, causes the air at the top of each tube to be compressed, causing compressed air to flow out of each Venturi nozzle, and through each nozzle turbine, and to energize the generator rotatably coupled to each nozzle turbine.

Each OWC tube behaves in a manner, and by physics, similar to those that characterize "water hammers" and "hydraulic rams."

One-way valves (e.g., check valves) allow air to freely enter an OWC when the pressure in that tube falls, and is reduced to a pressure less than that of the air outside the OWC tube. However, when the pressure of the air in an OWC tube exceeds that of the outside pressure, then the air in that tube is forced to exit the tube through the tube's respective Venturi nozzle and intra-throat turbine, energizing the turbine's coupled generator, and generating electrical power in the process.

A portion of the electrical power generated by the generators energized by the turbines inside the OWC Venturi nozzles is used to energize and/or power computational circuits positioned within the upper portion 190 of the device.

At least a portion of the electrical power generated by the embodiment's wind turbine and OWCs in response to the blowing of winds and the passage of waves, respectively, is communicated to, and/or consumed by, a plurality, plethora, network, assembly, collection, and/or array, of computational devices, circuits, devices, machines, and/or modules, positioned within the buoy 190, so as to provide at least a portion of those computational devices with the electrical power required to enable them to execute, process, complete, and/or compute, various computational tasks communicated to them from an external source, network, computer, customer, client, application, and/or system.

An antenna 204 mounted on, and/or affixed to, the top of the rigid sail 192, in conjunction with the antenna's associated communications devices, electronics, modules, and/or systems, allows the device to send and receive electronic, and/or electromagnetic, transmissions, preferably encrypted. This antenna exchanges digital data with a satellite through which the device can exchange data, programs, instructions, status information, and/or other digital values, with a remote computer and/or server. This antenna also provides the embodiment with the ability to exchange digital data with other similar embodiments, e.g. allowing them to be joined and/or connected within a virtual computing network that includes and/or extends to at least a portion of the computers on the so-linked devices. This antenna also provides the embodiment with the ability to exchange digital data with aerial drones, surface water drones (automated boats), underwater drones, and/or any other remote data relaying and/or daisy-chaining device, system, module, and/or circuit.

Using the antenna and its associated electronics, the embodiment receives programs, data, and/or computational tasks, from a remote server, computer, network, client, customer, command-and-control system, and/or ground station, which it sends to at least one of the embodiment's onboard computational devices, circuits, systems, networks, and/or modules. After receiving a program, data, and/or computational task, at least one of the embodiment's onboard computational devices, circuits, systems, networks, and/or modules, runs the program(s), processes the data, and/or executes, processes, and/or completes, the specified computational task(s).

After the program has been run, the data processed, and/or the computational task completed, the embodiment uses its antenna and its associated electronics, to transmit the results of the processing to a remote server, computer, network, client, customer, command-and-control system, and/or ground station.

FIG. 37 shows a front view of the same embodiment illustrated and discussed in relation to FIG. 36. Rigid sail 193 is rotatably connected to an upper surface 205 of the embodiment. Computational devices are positioned within the upper portion 190 of the device and are powered, at least in part, by electrical power generated by the wind turbine 192 and the OWC turbines positioned within the throats of the Venturi nozzles, e.g., 202 and 203, atop the OWC tubes.

Figure 38:
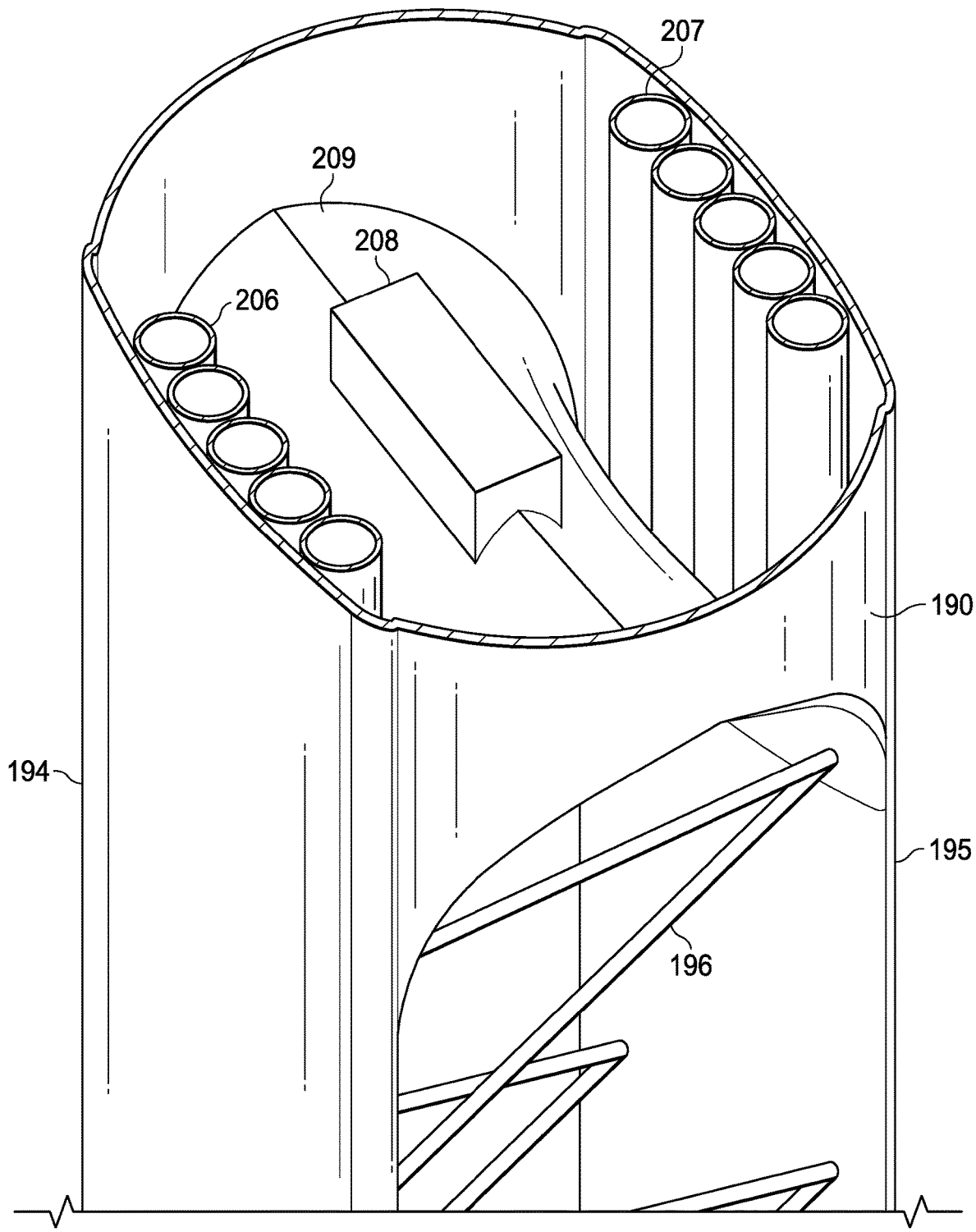
FIG. 38 is an elevated, enlarged sectional view of the embodiment of FIG. 36.

FIG. 38 shows a top-down sectional view of the same embodiment illustrated and discussed in relation to FIGS. 36 and 37, wherein the horizontal section plane is specified in FIG. 37 and the section is taken across line 38-38.

Each keel 194 and 195 contains five OWC tubes, e.g., 206 and 207, upper ends of which are constricted (not visible above the section plane) so as to form Venturi nozzles.

Inside the upper portion 190 of the device is a chamber containing computational equipment inside an enclosure 208 which is conductively cooled through the lower wall 209 of the chamber inside the upper portion 190 of the device.

Computational modules are mounted against an interior wall of the hollow buoy 190. At least a portion of the heat generated by the computational circuits 208 is conductively communicated through the adjacent and/or common surfaces of the circuits 208 and the buoy 209, and thereafter transferred, at least in part, into the surrounding air beneath the upper portion of the embodiment 190, thereby passively cooling those circuits and avoiding the need to expend additional energy to achieve that cooling.

In an embodiment similar to the one illustrated and discussed in relation to FIGS. 36-38, the module 208 generates a chemical (e.g., hydrogen) and stores at least a portion of the generated chemical inside tanks positioned within the upper portion 190 of the device.

Figure 39:
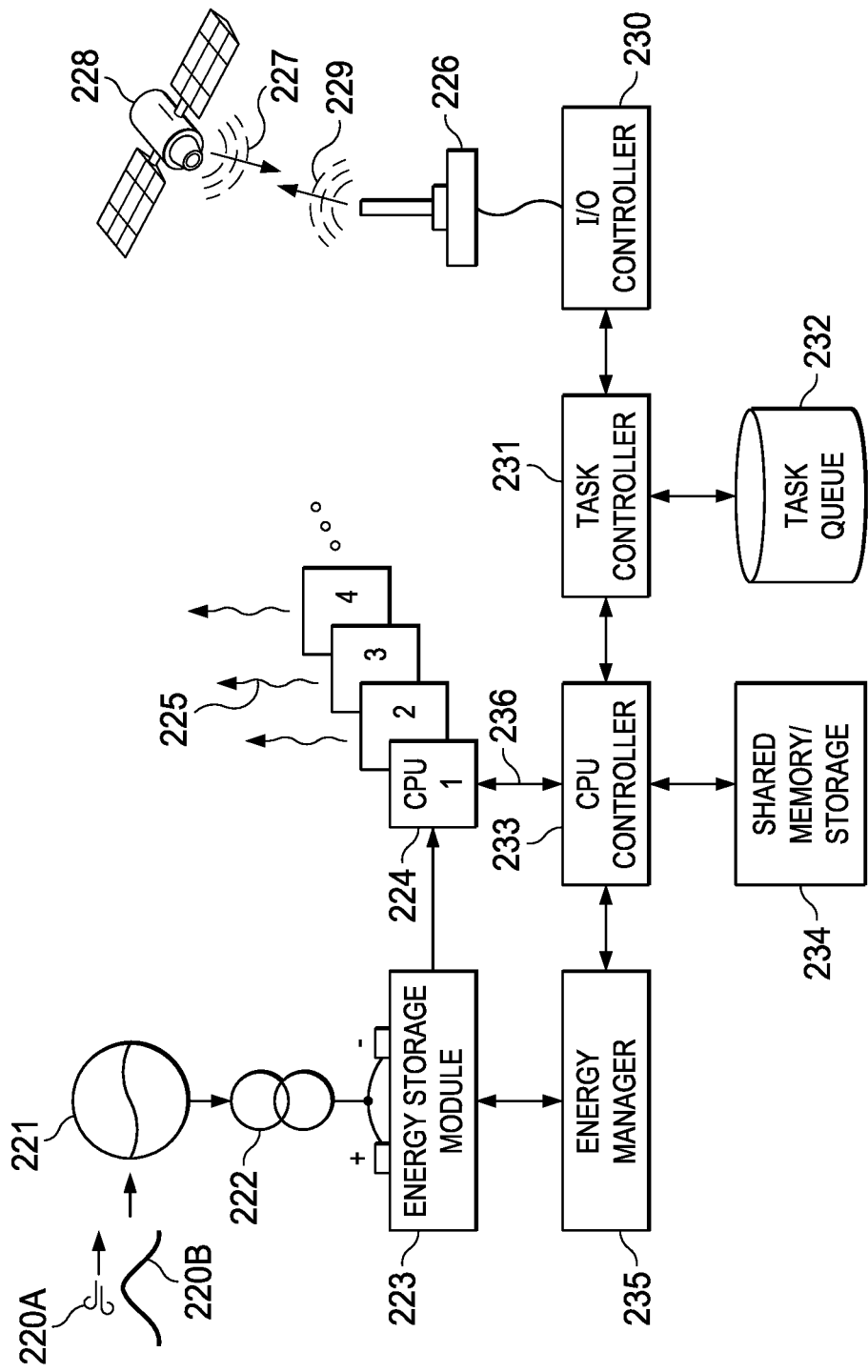
FIG. 39 is a schematic diagram of an embodiment of the computing system of the present invention.

FIG. 39 illustrates the processes, systems, and/or functional modules, that are characteristic of some embodiments of the current disclosure.

Wind 220A blows through an embodiment's wind turbine, and/or a wave 220B lifts and lets fall an embodiment, leading to a respective generator's 221 generation of an alternating electrical current (AC). That AC is then rectified 222 to convert at least a portion of that electrical power into a variable direct electrical current (DC) which is then used to impart energy to an energy-storage module 223, system, and/or mechanism, that may include, but is not limited to: batteries, capacitors, springs, components, features, circuits, devices, processes, and/or chemical fuel (e.g. hydrogen) generators and storage mechanisms.

At least a portion of the energy stored in energy storage module 223 is used to energize, power, and/or satisfy the electrical requirements of a plurality of computing devices 224, computing circuits, and/or computational resources. As a consequence of their operation, and consumption of electrical power, the computing devices 224 generate heat 225 that is passively, and/or convectively, transmitted to the environment (e.g., the air and/or water) around and/or adjacent to the embodiment.

An radio 226, and/or data transmission system, within the embodiment, receives programs, data (e.g. such as might be executed by new or existing programs), data, instructions, messages, signals, and/or computational tasks, originating from a remote computer and/or server, that have been transmitted 227 by a satellite 228. The data generated by a program, status information (e.g. related to pending programs, tasks, computers, energy storage, wind and/or wave conditions, weather, vessel sightings, etc.), geolocation data, and/or other data, is transmitted 229 by the embodiment's radio 226, and/or data transmission system, to the satellite, which then transmits it to a remote network, computer, and/or server.

The data received by, and/or transmitted to, the satellite 228 is cached, formatted, encrypted or decrypted, and/or managed and/or orchestrated, by an "I/O controller" 230. The I/O controller 230 communicates and/or exchanges data with a "task controller" 231.

The task controller 231 is responsible for, among other things:

storing new programs and/or tasks in a "task queue" 232;

determining which pending task and/or program is of highest priority, and/or which, for any other reason, including estimated resource requirements, will be next executed;

retrieving a task and/or program to be executed when a computer (and/or the requisite number of computers) becomes available (among the computers in 224);

submitting a task and/or program, along with any related data, to the "CPU controller" 233 in response to the CPU controller notifying the task controller 231 that one or more computers 224 and/or other computing resources are available and/or "free;"

receiving a notification that the execution of task and/or program has been completed, as well as receiving the data that resulted from the execution of the task and/or program;

receiving a notification that the execution of task and/or program was cancelled (e.g. in response to a reduction in the amount of available energy, and the consequent powering down of one or more computers 224);

reassessing the priority and/or updating the execution status of a task cancelled by the CPU controller 233; and deleting a task and/or program from the task queue 232 when the embodiment is informed (e.g. by a transmission from satellite 228) that the task is no longer in need of execution (e.g. when another device has already completed the task, or the task has been cancelled by its originator);

The CPU controller 233 is responsible for, among other things:

launching the execution of tasks and/or programs on the computers 224, and for collecting the data resulting from their execution and transmitting it to the task controller 231, which, in turn, transmits the data to the I/O controller 230 which transmits 229 it to the satellite 228;

notifying the task controller 231 that one or more computers 224 are free and/or available to begin the execution of one or more new tasks and/or programs, and/or updating the task controller 231 as to the number and kind of computational resources available for the execution of new tasks and/or programs;

cancelling one or more executing tasks and/or programs, and/or powering down their respective computers and/or computational resources, so as to reduce the amount of electrical power being consumed; and, powering up, and/or initializing, dormant computers and/or computational resources when the amount of available electrical power increases.

"Shared memory storage" 234 is comprised of a networked set of digital data memory devices which store, and from which may be retrieved, programs, program data, and/or other digital data. CPU controller 233 uses the shared memory storage in order to configure, initialize, and execute, programs and/or tasks, and to store data generated by programs and/or tasks during their execution.

The "energy manager" 235 monitors that rate at which electrical power is being generated, and the amount of electrical energy that is available from the energy storage module 223. When the amount of electrical energy and/or power changes, the energy manager 235 so notifies the CPU controller 233 which may respond to the change by, among other things, increasing or reducing the number operational computers and/or computing resources.

The task controller 231 may select a task from among the set of available pending tasks on the basis of many factors, and/or the likelihood that any particular pending task will be selected for execution can be influenced by many factors, including, but not limited to:

any relative priority specified at the time of the task's receipt by the embodiment (such priority may have been the result of many factors, including, but not limited to: the priority assigned by a remote computer and/or server on the basis of the degree to which the price offered for the task's execution by a client included a premium);

the amount and/or type of computational resources that will be required for the execution of the task, and the degree to which those computational resources are available, and/or the relative priority of other tasks in combination with the degree to which those other tasks require similar resources; and the likelihood that another device will complete the execution the task before its execution can be completed on the present device, for example, a task that has been pending for a relatively long time, i.e. a task that has suffered a long delay before its execution has even begun, may be less likely to be completed before a signal is received indicating the task has been completed elsewhere and should be cancelled before its execution is complete.

The I/O controller 230 is also able to communicate, receive programs, data, and/or computational tasks, transmit task results, and/or otherwise exchange data with, and/or through (or by means of), data exchanged between the embodiment's radio 226, and/or data transmission system, and aerial drones, surface water drones, underwater drones, ground-based relay stations, and/or any other remote vessel, station, and/or suitably equipped object, entity, and/or system.

Figure 40:
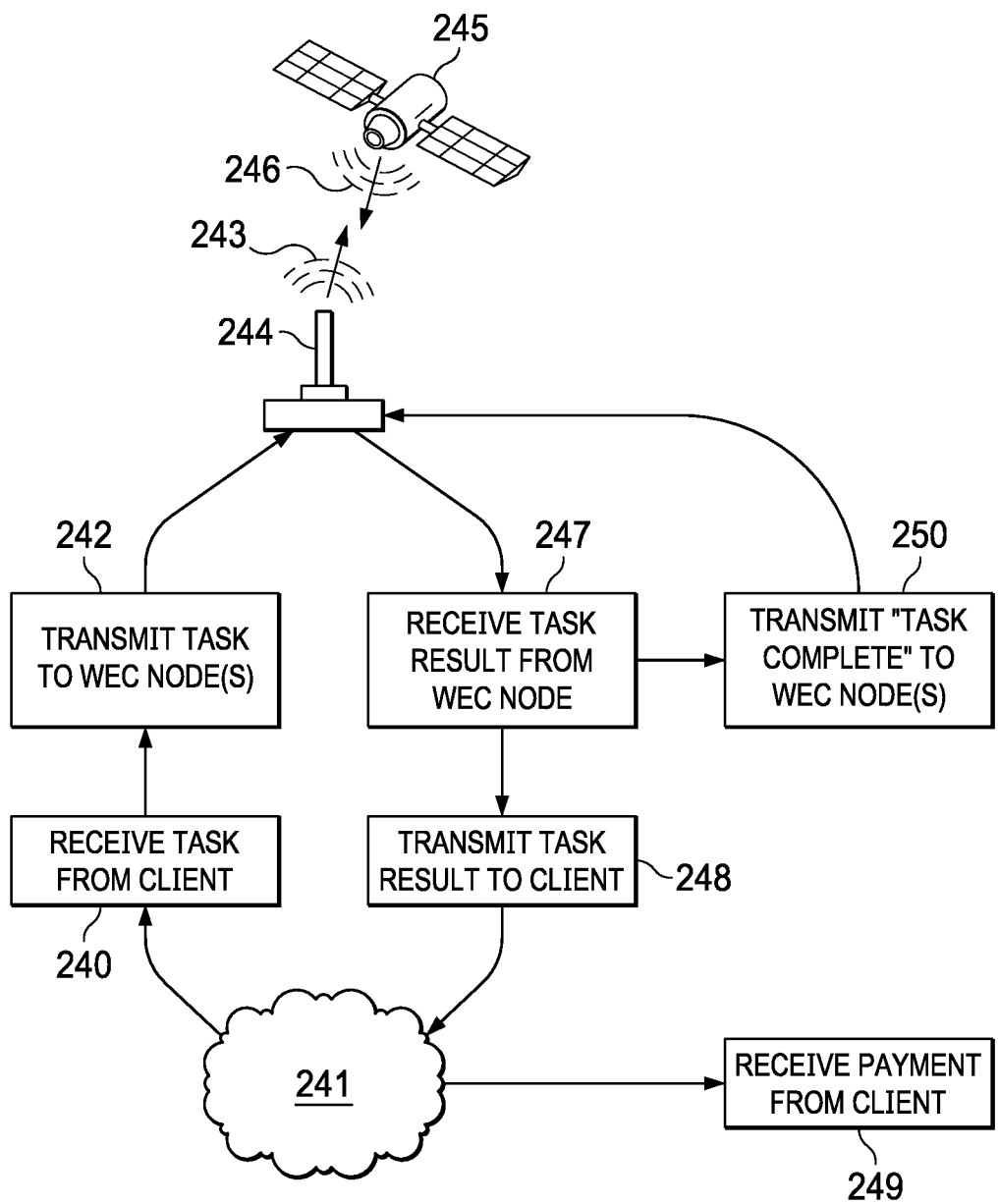
FIG. 40 is a flow chart of a data flow of the present invention.

FIG. 40 illustrates the processes and/or events that are characteristic of a "task administration system" and the issuance of programs, data, and/or computational tasks, to embodiments of the current disclosure, and the receipt and post-execution processing of the results of the executed programs, processed data, and/or completed computational tasks.

A task administration system receives 240 from a client (e.g. a person wishing to have a program and/or task executed) a program and/or task and any related data from a transmission communicated across and/or through a data-sharing network 241, such as the Internet. The task administration system 242 transmits 243 the program and/or task and any related data, preferably after encrypting it, via a transceiver 244, and/or data communication system, to a satellite 245 which then, directly and/or indirectly transmits it to one or more embodiments of the current disclosure.

After the "result data" related to, and/or created as a consequence of, the completion of the program and/or task's execution, is returned by an embodiment of the current disclosure directly and/or indirectly to satellite 245, the satellite 245 transmits 246 the result data to the transceiver 244, and/or data communication system. The result data 247 is received (and possibly decrypted) by the task administration system. The task administration system then 359 transmits the result data to the client, via the data communication system 241. And, hopefully, 249 payment is received from the client.

When the result data is received, and preferably validated, by the task administration system, the system transmits 243, via the transceiver 244, a signal to all of the embodiments of the current disclosure that received the program and/or task, which will prompt them to delete the program and/or task from their task queues.

Figure 41:
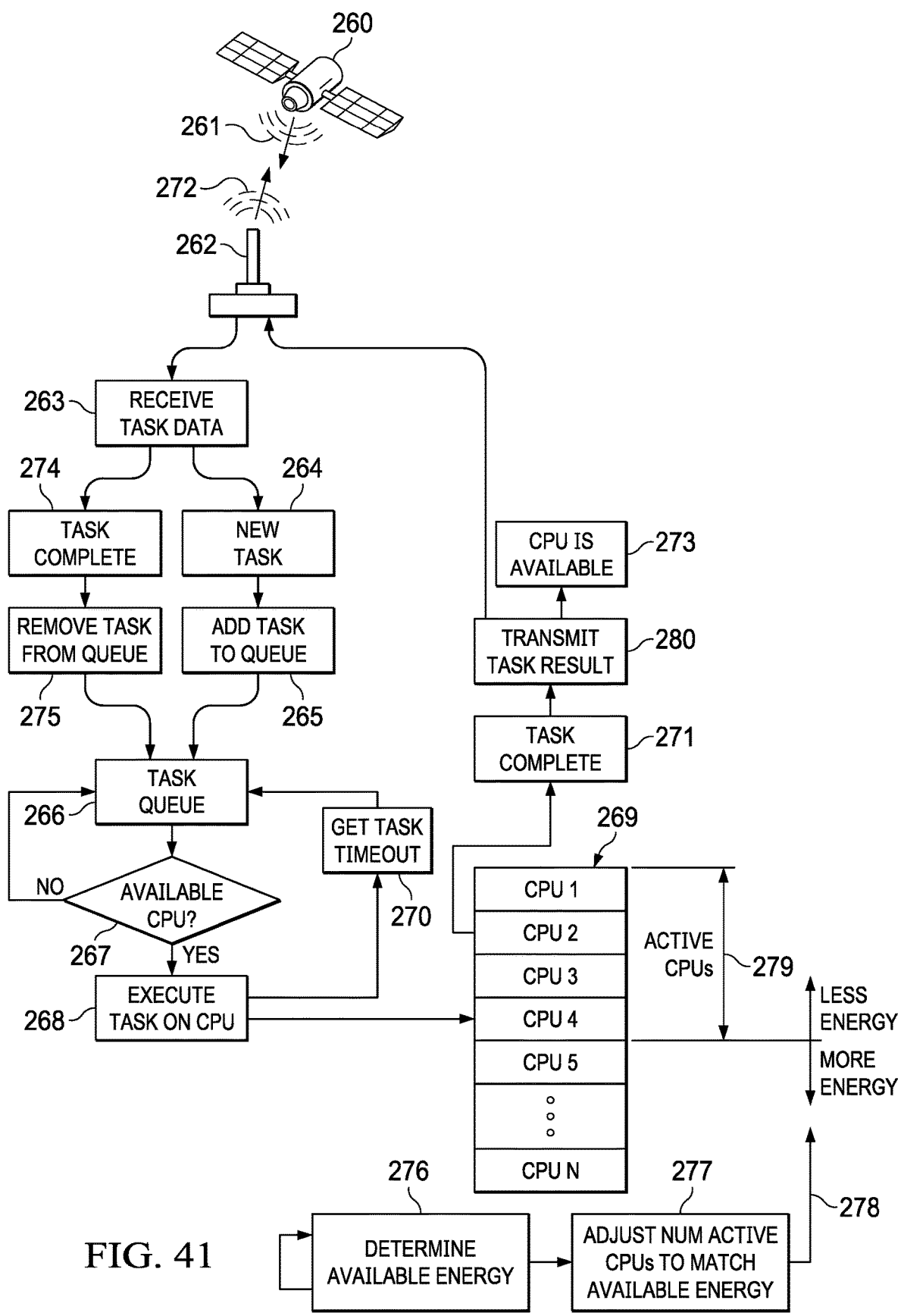
FIG. 41 is another flow chart of a data flow of the present invention.

FIG. 41 illustrates the processes and/or events that are characteristic of some embodiments of the current disclosure.

A satellite 260 transmits 261 a data packet to a transceiver 262, and/or data communication system, on an embodiment of the current disclosure. The embodiment 263 receives, validates, and possibly decrypts, the "task data" encoded within the data packet.

If the task data 264 specifies a new program and/or task, and any related data, then 264 the embodiment 265 adds the new task and its related data (if any) to its task queue 266.

When 267 there is an available CPU, computer, and/or sufficient available computing resources, then 268 a pending task is identified and/or selected, and its execution is started on the available CPU 269. A "timeout" value 270 is associated with the selected pending task in the task queue 266. This timeout value represents a future time after which it will be reasonable for the embodiment to assume that the task's execution has failed, and its, presumably frozen and/or failed execution, should be stopped and its respective CPU(s), and/or computer(s), should be re-initialized and used to execute a new (and/or the same failed) task.

When 271 the execution of a task is complete, then the data generated by the task during its execution 263 is transmitted 272, via the transceiver 262 to a satellite 260, where the task-generated data will be processed by a remote computer and/or server. Contemporaneously with the transmission of the task-generated data to the satellite, 273 the status of the CPU(s) and/or computer(s) that executed and/or completed the task are changed to "available" and ready for the execution of a new task [related to the 377 evaluation of the evaluation of the statuses of the CPUs and/or computers 269.

The remote computer and/or server that receives the task-generated data is responsible for transmitting a signal to this embodiment, and any other embodiments to which the same task was transmitted, that the task is now complete. When the satellite 260 transmits 261 to the embodiment's transceiver 262, and/or data communication system, the embodiment 263 receives, validates, and possibly decrypts, the "task data" encoded within the data packet.

If the task data specifies 274 that a task is complete, then 275 the task is removed from the embodiment's task queue 266.

The amount of electrical energy available on the embodiment is 276 continually and/or periodically determined. When the amount of available electrical energy changes (e.g. by a threshold amount) then 277 the number of CPUs and/or computer(s) whose operation can be powered is determined. If the amount of available electrical energy has increased then 278 an appropriate number of dormant and/or unpowered CPUs and/or computer(s) are started, initialized, and made ready for the execution of tasks. If the amount of available electrical energy has decreased then 278 an appropriate number of active and/or operational CPUs and/or computer(s) are stopped, and made dormant, in order to reduce the amount of energy being consumed by computational activities.

When a task is selected, from among the set of available pending tasks, to be executed on an available CPU and/or computer, the determination as to which task to select may be made on the basis of many factors, and/or the likelihood that any particular pending task will be selected for execution can be influenced by many factors, including, but not limited to:

any relative priority specified at the time of the task's receipt by the embodiment (such priority may have been the result of many factors, including, but not limited to: the priority assigned by a remote computer and/or server on the basis of the degree to which the price offered for the task's execution by a client included a premium);

the amount and/or type of computational resources that will be required for the execution of the task, and the degree to which those computational resources are available, and/or the relative priority of other tasks in combination with the degree to which those other tasks require similar resources; and the likelihood that another device will complete the execution the task before its execution can be completed on the present device, for example, a task that has been pending for a relatively long time, i.e. a task that has suffered a long delay before its execution has even begun, may be less likely to be completed before a signal is received indicating the task has been completed elsewhere and should be cancelled before its execution is complete.

Figure 42:
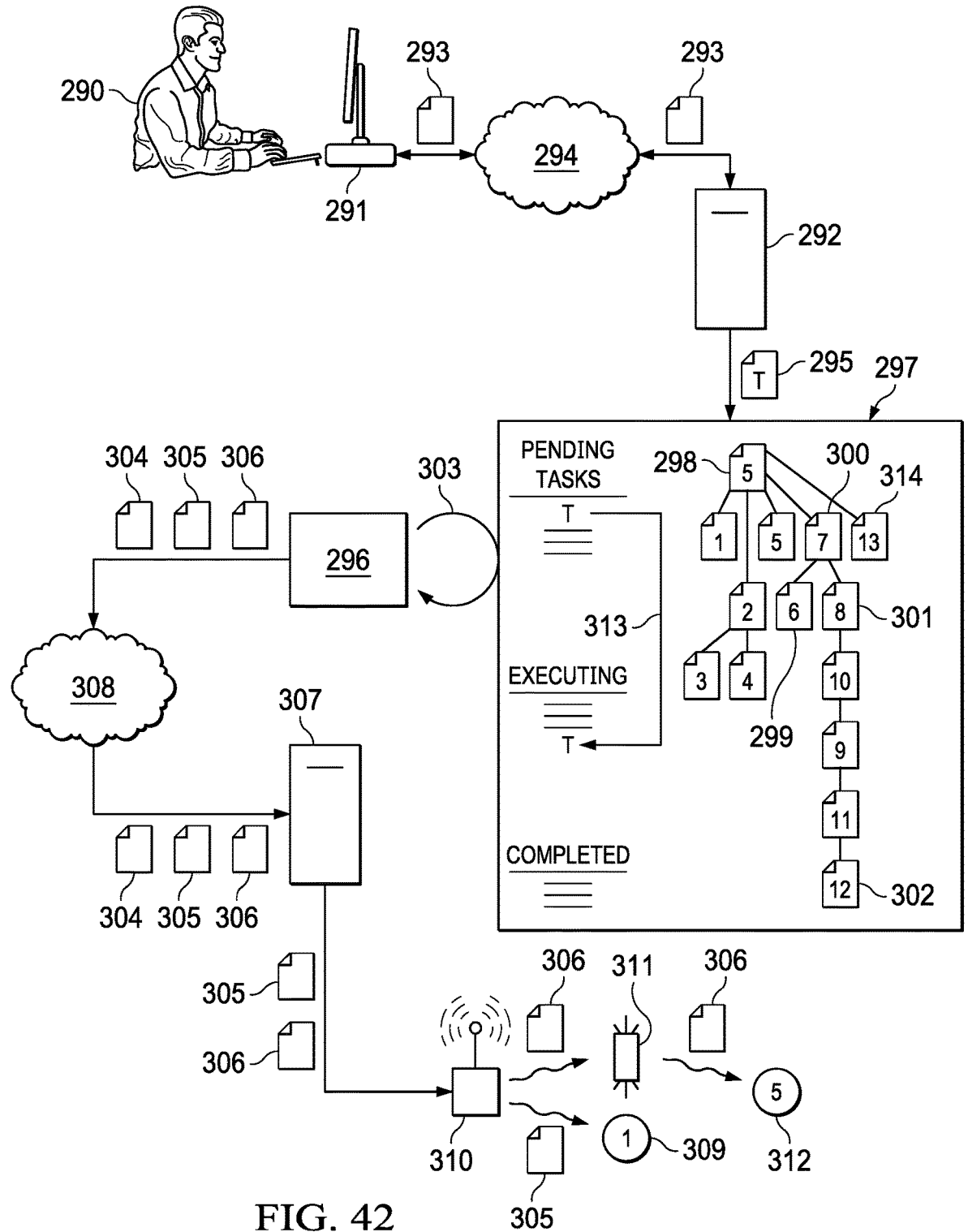
FIG. 42 is a schematic of an embodiment of the computing system of the present invention.

FIG. 42 illustrates a simplified representative flow chart that describes in approximate terms one process by which one or more embodiments of the present disclosure might be used to execute a customer-specified, arbitrary computational task. A company, corporation, and/or organization, uses an embodiment of the present disclosure to provide "computation as a service" for which its customers pay a fee.

A customer 290 of the company uses a proprietary computational device 291 to interact with a company server 292 by exchanging data, files, and/or messages 293 through a data network 294 (e.g., the Internet). Server 292 sends a program or formatted block of data (e.g., HTML) 293 to the customer's computer 291 which renders a user interface within a browser running on the customer's computer. The customer interacts with that user interface so as to formulate a structured data set 293 that is transmitted to the server 292, and which may contain including, but not limited to: the program (or an identifier or URL through which the program to be executed on behalf of the customer may be found and obtained by the server), the data (if any) which will initialize the program, the number of times the program is to be executed, the maximum amount of time which the customer is willing to wait for the results (e.g., the "deadline"), the "resolution" of the analysis and/or the results (e.g., how many vertices to use in a finite-element analysis of a structure), the format of the result data (e.g., JPEG for a result comprising images), etc.

The server 292 packages the "task specification (T)" 295 which it transmits to a "task manager" 296/297. The task manager 296 maintains a database (and/or other data structure) that may include, but is not limited to: which tasks are "completed," which tasks are currently "executing," and which tasks are currently "pending tasks" (i.e., tasks waiting to be executed). The task manager 296 also maintains a "device configuration graph" 298 which specifies which embodiments are within communications range of a particular communications node (e.g., of a land-based station "S").

The link between each pair of embodiments (i.e., devices) and/or intermediate communications nodes (e.g., ground stations, satellites, aerial drones, surface water drones, underwater drones, etc.) may also specify attributes of the channel by and/or through which those two nodes are connected, which may include, but are not limited to: the characteristic latency of the channel, the bandwidth (e.g., bits per second), the cost (e.g., satellites tend to be more expensive channels than radio), etc.

In the illustrated task manager's 297 device configuration graph 298 of FIG. 42, the exchange of data between the shore-based station "S" 298 and device "6" 299 is accomplished through the intermediary communications node provided by device "7" 300. The exchange of data between shore-based station "S" 298 and device "8" 301 is achieve by and/or through intermediary device "7" 300. And, the exchange of data between shore-based station "S" 298 and device "12" 302 is achieved by and/or through five intermediary device, e.g., device "8" 301.

The task manager's 296 database 297 and/or graph also maintains an updated record of which computational capabilities, components, elements, circuits, and/or modules are possessed by, and/or incorporated within, each of the embodiments, as well as which of each embodiment's computational components, elements, circuits, and/or modules, are currently executing tasks (and therefore unavailable to process new or "pending" tasks), and their estimated times of task completion.

Periodically, e.g., every 10 milliseconds, the task manager 296 checks 303 for new tasks, e.g., 295, and adds them to the queue of "pending tasks," as well as determining which "executing" tasks have completed, updating the availability of embodiment-specific computational modules at the same time.

Upon receiving a new task, e.g., task "T" 295, and periodically thereafter, task manager 296 checks to see if the required computational capabilities are available among those embodiments within communications range. It may also weigh the "urgency" of the task (in which it may elect to wait for more capable computational capabilities, and/or those with reduced communications latencies), and/or whether or not a "premium price" was paid for the task's completion. When a suitable embodiment, or combination of embodiments, are found (e.g., that possess suitable and available computational capabilities), then the task is partitioned into inter-related component tasks that may be executed with at least some degree of independence and the results of which may be combined (e.g., "map-reduced") when the component results are ready.

With respect to task "T," task manager 296 formulates and sends to the ground station three task specifications: 1) one 304 to be executed by computational equipment at the shore-based facility; 2) one 305 to be executed by device "1;" and one 306 to be executed by device "5." The task manager 296 transmits these three task specifications 304-306 to a computing device 307 through a network 308, and/or communications channel, that may include LAN cables, fiber optic cables, phone lines, radio channels, satellites, etc.

The receiving computer 307 at the ground station forwards task 305 to device "1" 309 via radio transmitter 310 (i.e., device "1" is within range of the shore-based station's radio transmitter, so it is used to transmit task 305 to that device).

The receiving computer 307 at the ground station forwards task 306 to satellite 311, which forwards that task to device "5" 312 (i.e., device "5" is not within range of the shore-based station's radio transmitter, so a satellite is used to relay that task to device "5").

After receiving tasks 305 and 306, devices "1" and "5," respectively, load them onto the computational resource(s) specified in the respective task descriptions and execute those tasks.

Tasks may be transmitted to, and/or relayed by, intermediate drones, devices, and/or other communication channels and/or nodes as circumstances permit.

After transmitting tasks 304-306, task manager 296 updates 313 the task lists within its database 297 to show that task "T" is now "executing."

Figure 43:
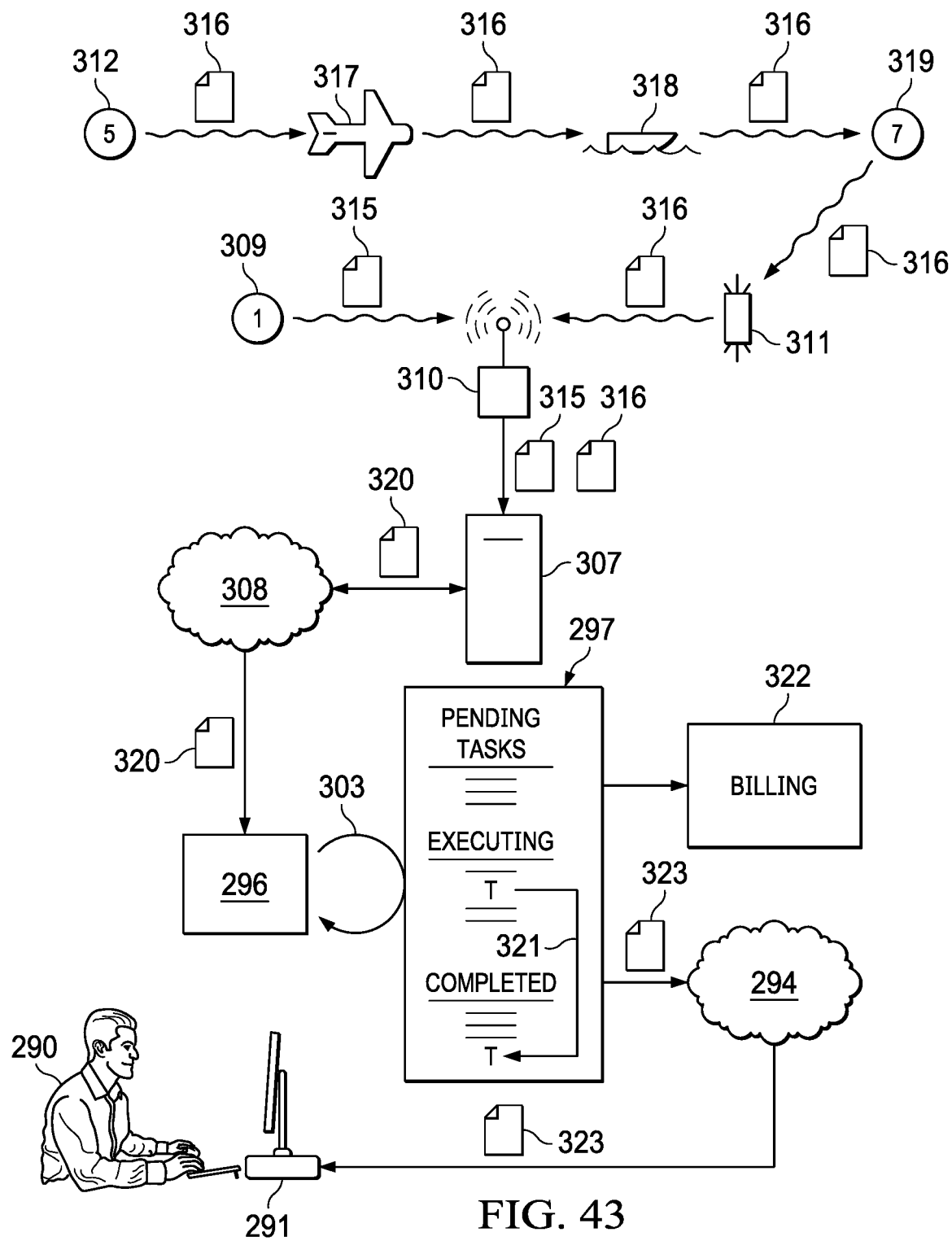
FIG. 43 is another schematic of an embodiment of the computing system of the present invention.

FIG. 43 illustrates a continuation of the same simplified representative flow chart that is illustrated and discussed in relation to FIG. 42.

Embodiments (i.e., devices) "1" 309 and "5" 312 complete the execution of their respective portions of the task "T" described in relation to FIG. 42.

Device "1" transmits the result 315 of its sub-task to the radio receiver 310 of the shore-based station. Device "5" transmits the result 316 of its sub-task to an aerial drone 317 that is close enough to be within range. That drone 317 stores the result 316 until it passes within range of a surface boat drone 318 after which it transmits the result 316 to that water-borne drone 318. The water-borne drone 318 stores the result 316 until it passes within range of another device (e.g., device "7") 319 at which time it transmits the result 316 to that device which immediately transmits it to a satellite 311 which forwards it to the radio receiver 310 of the ground station.

Radio receiver 310 transmits the sub-task results 315 and 316 to a computing device 307 of the ground station which then uses its own task specification (i.e., task 304 of FIG. 42) to guide its merging and/or processing of the sub-task results 315 and 316 so as to produce a final, comprehensive task result 320, which it transmits to task manager 296, via a network 308 (e.g., the Internet).

When task manager executes 303 an update of its task lists and associated graphs, it moves 321 task "T" from the "executing" list to the "completed" list. At the same time it updates its device nodes to show that the computational resources used to complete the task are once again available to contribute to the execution of one or more new tasks.

Figure 44:
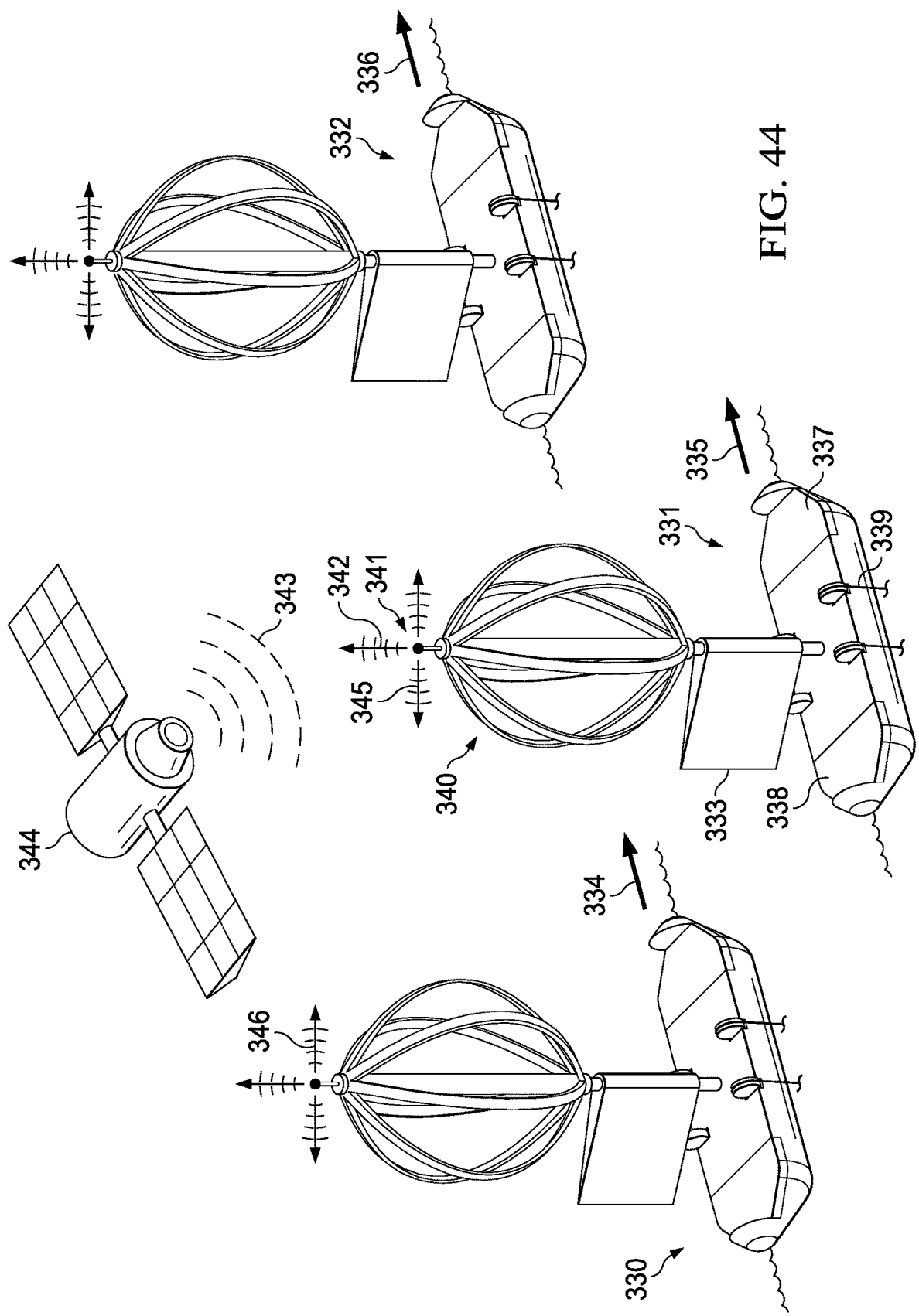
FIG. 44 is a schematic of a farm system of the present invention.

FIG. 44 shows a perspective view of three embodiments 330-332 of the current disclosure as their sail in formation across the surface of a body of water. These devices are similar to the one illustrated and discussed in relation to FIGS. 29-31.

Rigid sails, e.g. 333, allow the devices to generate thrust 334-336 when buffeted by winds of sufficient speed and stability. In sealed chambers and/or enclosures, e.g. 337 and 338, affixed to their upper surfaces are enclosed computing devices that are energized, at least in part, by electrical power generated by the wave-driven PTOs, e.g. 339, and/or the Darrieus wind turbines, e.g., 340, on each device. These computing devices perform calculations, at least some of which provided by, and/or coordinated with, a remote source and/or server. Each device has an antenna, e.g. 341, with and/or through which it exchanges, e.g. 342 and 343, data with a satellite 344, and/or with each other, e.g. 345 and 346.

In some embodiments, a single device, e.g. 331, transmits 342 data to, and/or receives 242 data from, the satellite 344. This single "interface device" 331 then communicates data received from the satellite 344 to, e.g. 345, each of the other devices, e.g. 330. This interface device 331 also receives, e.g. 346, the data from each other device, e.g. 330, and may transmit some or all of that data, perhaps after synthesis with data supplied by other devices, to the satellite from where it is forwarded to a remote source and/or server.

Task manager 296/297 evaluates the task result 320 to determine the resources consumed, which might include, but is not limited to: the amount of energy (e.g., kWh) consumed during the execution of the task, the amount of data transmitted by satellite, and, the numbers, types, capabilities, etc., of the computational resources used onboard the devices involved in completing the task. Based on its determination and/or evaluation of the resources consumed, task manager 296 formulates a cost that will be charged to the customer 290 and sends it to a "billing" module 322. And, (perhaps after receiving payment from the customer) the task manager transmits via a network 294 (e.g., the Internet) the subset of the task results 323 that contain the data requested by the customer 290 (e.g., omitting resource consumption data) to the customer's computing device 291.

Although not shown, or discussed, the task processing process and infrastructure specified in FIGS. 42 and 43 include the systems, subsystems, modules, capabilities, functionalities, etc., that will be obvious to those skilled in the art. For example, in the event that a device fails to complete the execution of a subtask (e.g., because it runs out of available energy and must shut down some or all of the computational resources involved in its execution), a computing device at the ground station may notify the task manager, which may then either allocate the computational resources of one or more other devices to complete (perhaps cooperatively) the uncompleted subtask, or it may cancel the execution of the task entirely and move it back to the "pending tasks" list and attempt its re-execution at a later time.

Figure 45:
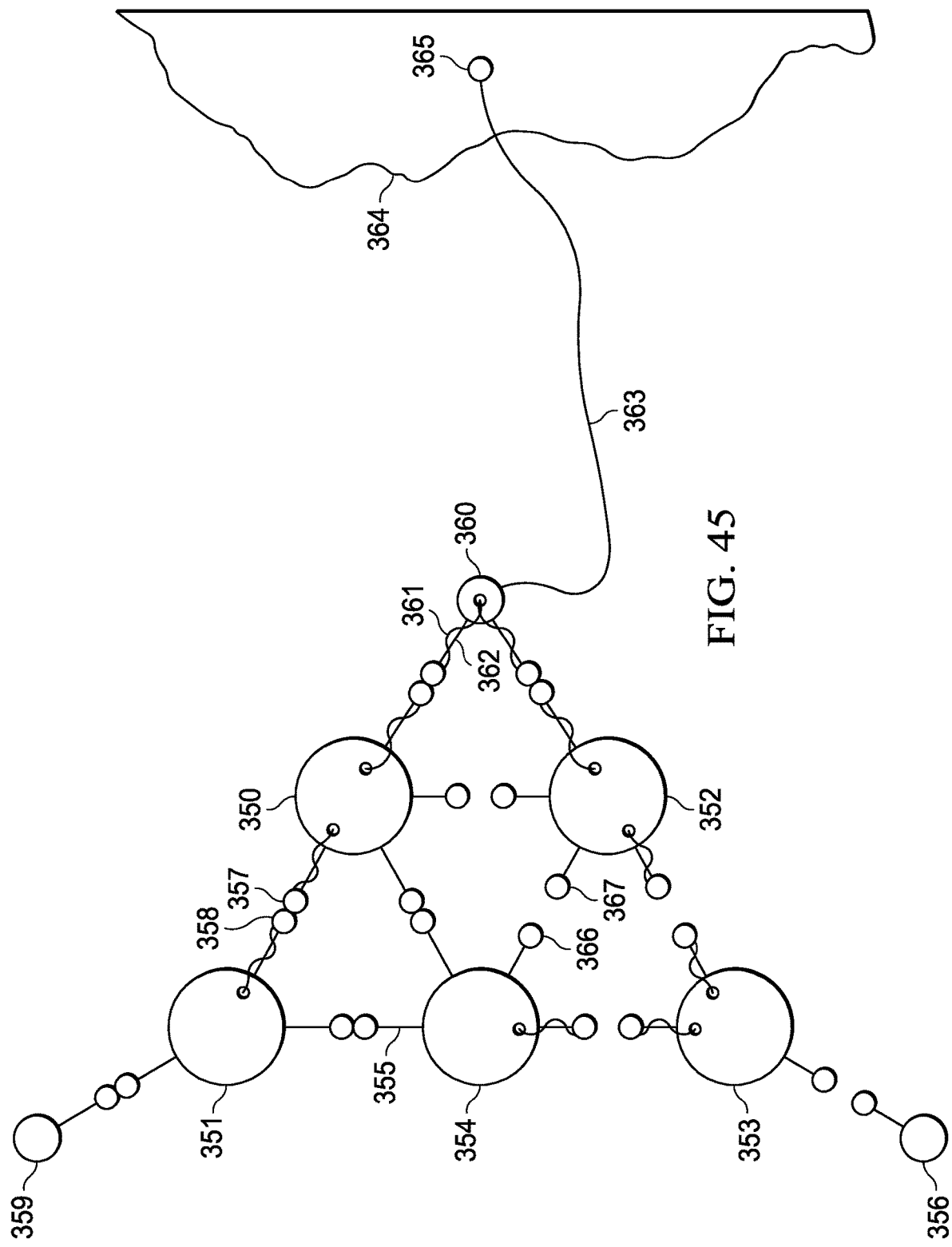
FIG. 45 is a schematic of a farm system power management of the present invention.

FIG. 45 shows a perspective view of five embodiments 350-354 of the current disclosure that are tethered and/or moored, e.g. 355, to one another, thereby comprising a "farm," and four of those devices are tethered and/or moored to three anchored mooring buoys, e.g. 356.

Device 350 is both moored, and electrically connected, to device 351. A mooring cable is connected to device 350 and to float 357. A mooring cable is likewise connected to device 351 and float 358. The two floats are together supported a weight suspended beneath them be a cable to each. This assembly provides a single mooring connector and/or tether connecting devices 350 and 351. It also provides elasticity to the connection, because if or when devices 350 and 351 move apart the two floats 357 and 358 are pulled apart, thereby lifting the weight suspended beneath them. This lifting of the weight provides a restoring force that will eventually pull the devices back together again. Each pair of devices in the illustrated farm are connected together by such elastic mooring connectors.

Four of the devices 350-353 are elastically connected to floats 359 and 360 which are in turn attached and/or connected to anchors resting on, and/or other anchoring means (e.g. screws) embedded in, the seafloor.

At least some of the devices 350-354 contain and/or incorporate computing devices, computing circuits, computers, and/or computational resources, that enable them to execute programs, e.g. arbitrary programs provided by a remote source and/or server, sometimes executed relative to specific bodies and/or collections of data.

Electrical cables, e.g. 361, are connected to, and/or supported by, some of the elastic mooring tethers, e.g. 362, comprise, create, and/or constitute, an electrical grid within and/or across the farm. In various embodiments, these electrical cables include, but are not limited to: fiber-optic cables, LAN cables, Ethernet cables, and electrical power cables. Likewise, a subsea electrical cable 363 connects the farm's electrical and/or data grid to terrestrial, e.g., 364, electrical power grids, e.g., 365, and/or terrestrial data networks, e.g. the Internet.

Because of their interconnection by such electrical and/or data-transmission cables, the devices 350-354 may operate within a shared "virtual" computing network, and therefore and/or thereby may share data, parallelize programs, shard parameter ranges, etc. Also, by means of subsea electrical and/or data cable 363, the farm, and/or the devices therein, may obtain programs, and/or other computational tasks, from a remote source and/or server, by means of a terrestrial data network, such as the Internet. Likewise, the results and/or data resulting from the completed execution of a program may be returned to the remote source and/or server by means of the subsea cable 363 and an attached data network, such as the Internet.

The illustrated configuration is consistent with any of the individual device embodiments, and/or embodiments similar to those, illustrated and discussed in relation to this disclosure. The use of device-specific propulsion can reduce mooring and/or anchoring requirements thereby reducing the cost of such a farm and/or its deployment.

Figure 46:
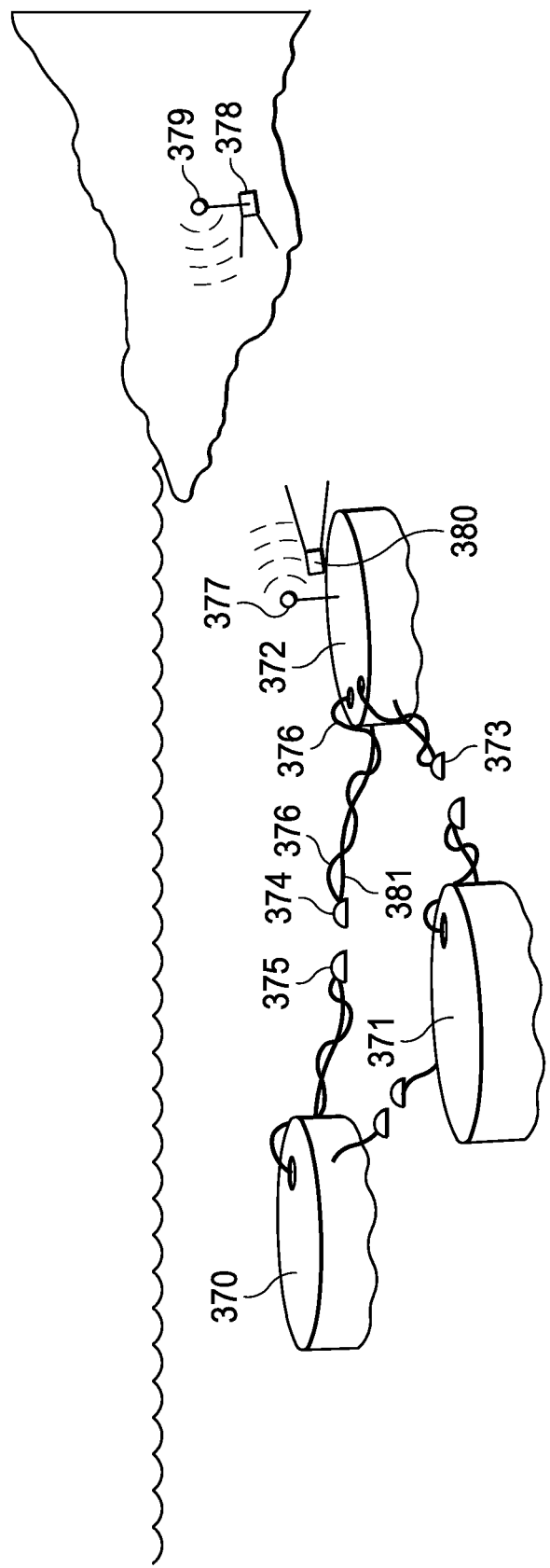
FIG. 46 is another schematic of a farm system power management of the present invention.

FIG. 46 shows a perspective view of three embodiments 370-372 of the current disclosure that are tethered together, e.g. 373, but otherwise free-floating and self-propelled, thereby comprising a self-propelled "farm."

Each device is both physically tethered, e.g., 381, and directly (e.g., by electrical power and/or network data cables) or indirectly (e.g., by radio, Wi-Fi, modulated light, etc.) interconnected, to every other device. The devices are physically interconnected by means of "elastic" mooring connectors and/or cables, e.g., in which a weight is suspended by and between a pair of floats, e.g., 374 and 375. Each suspended weight creating a restoring force pulling together its respective floats when they are separated. In other words, the separation of a weight's connected floats generates, and the weight stores, gravitational potential energy that both resists the separation of the floats, and tends to pull separated floats back together when a separating force wanes and/or dissipates.

Devices 370 and 372, as well as devices 371 and 372, are interconnected electrically and/or are able to share data, by means of electrical cables, e.g. 376, that are connected to, and/or supported by, their respective mooring cables.

These electrical cables comprise, create, and/or constitute, an electrical grid within and/or across the farm. In various embodiments, these electrical cables include, but are not limited to: fiber-optic cables, LAN cables, Ethernet cables, and electrical power cables. Devices that share, and/or are interconnected with respect to, electrical power are able to share and/or distribute electrical power generated by their respective generators in response to wave action. Devices that share, and/or are interconnected with respect to, electrical power are also able to share electrical energy stored within batteries, capacitors, springs, components, features, circuits, devices, processes, and/or chemical fuel (e.g. hydrogen) generators and storage mechanisms.

At least some of the devices 370-372 contain and/or incorporate computing devices, computing circuits, computers, and/or computational resources, that enable them to execute programs, e.g. arbitrary programs provided by a remote source and/or server, sometimes executed relative to specific bodies and/or collections of data.

Because of their interconnection by such electrical and/or data-transmission cables, the devices 370-372 may operate within a shared "virtual" computing network, and therefore and/or thereby may share data, parallelize programs, shard parameter ranges, etc.

The farm illustrated in FIG. 46 is not connected to land by a subsea electrical cable. However, the farm, and/or the devices therein, share data with a terrestrial data network, such as the Internet, by means of a light-modulated data exchange system. Via the radio communications equipment on device 372, any device in the tethered farm also communicates, and/or exchanges data (e.g. computational tasks to be performed by the farm, and the results of completed tasks) with terrestrial data networks via intermediary relays of data performed by satellites, aerial drones, surface water drones, underwater drones, intermediate ground-based stations, etc.

Device 372 has a light 377 that emits modulated light, preferably of a specific wavelength, in which the modulations encode data, and in which that data is preferably encrypted. A receiving camera 378 on land detects the modulated light transmissions and decodes them and transmits them over a data network, such as the Internet, with a remote computer and/or server.

Likewise, a light 379 on shore emits modulated light, preferably of a specific wavelength, in which the modulations encode data received from a remote computer and/or server, and in which that data is preferably encrypted. A receiving camera 380 on device 372 detects the modulated light transmissions from land and decodes them and, when and where appropriate, transmits them over the farm's data grid to one or both other devices 370 and/or 371.

In some embodiments, device 372 has an antenna 377, and uses it to exchange data via radio transmissions with a station on land possessing a complementary antenna 379.

The illustrated configuration is consistent with any of the individual device embodiments illustrated and discussed in this disclosure. Farms such as the one illustrated in FIG. 46 utilize their propulsive systems and/or capabilities in order to retain one or more advantageous geospatial positions in a body of water, both relative to one another and relative to a particular point on an adjacent land mass.

Figure 47:
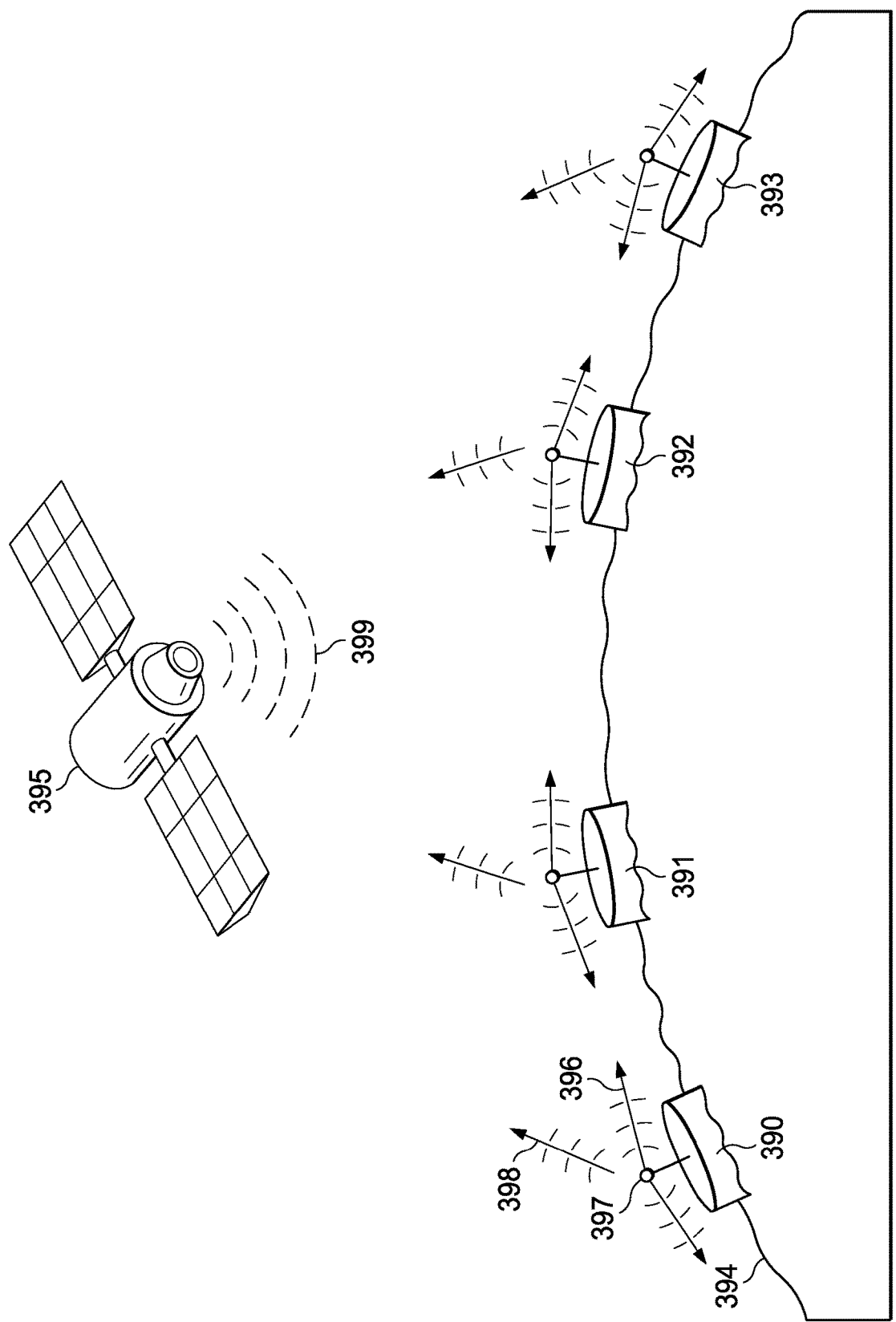
FIG. 47 is a schematic diagram of a data management system of the present invention.

FIG. 47 shows a perspective view of four embodiments 390-393 of the current disclosure floating adjacent to the surface 394 of a body of water (e.g. a sea) wherein the devices are distributed across the surface of the body of water at such distances that only adjacent (though widely separated) devices are within range of one another's data exchange and/or communication systems. However, in addition to directly communicating with each of its neighboring devices, each device is able to communicate with a satellite 395.

Device 390 is able to transmit 396 and receive electromagnetic transmissions, with neighboring device 391. However, device 390 is not able to directly communicate and/or share data with devices 392 and 393. Device 390 is able to indirectly transmit data to, and receive data from, devices 392 and 393 by using at least device 391 to daisy-chain, and/or pass along, those transmissions.

With respect to some embodiments, and/or some deployments, devices 390-393 are only able to communicate via direct communications and/or indirect, daisy-chained communications.

With respect to some embodiments, and/or some deployments, devices 390-393 are only able to communicate with satellite 395. For example, device 390 has an antenna 397 with which it can transmit 398 data to satellite 395, and from which it can receive data transmitted 399 from the satellite. Communication between devices is moderated by the intermediate satellite 395 link, and/or by a remote computer and/or server with which satellite 395 is able to communicate.

And, with respect to some embodiments, and/or some deployments, devices 390-393 are able to communicate with other devices by either direct and/or daisy-chained, and/or satellite-mediated, communication pathways.

The illustrated configuration is consistent with any and all of the individual device embodiments illustrated and discussed in relation to this disclosure.

Figure 48:
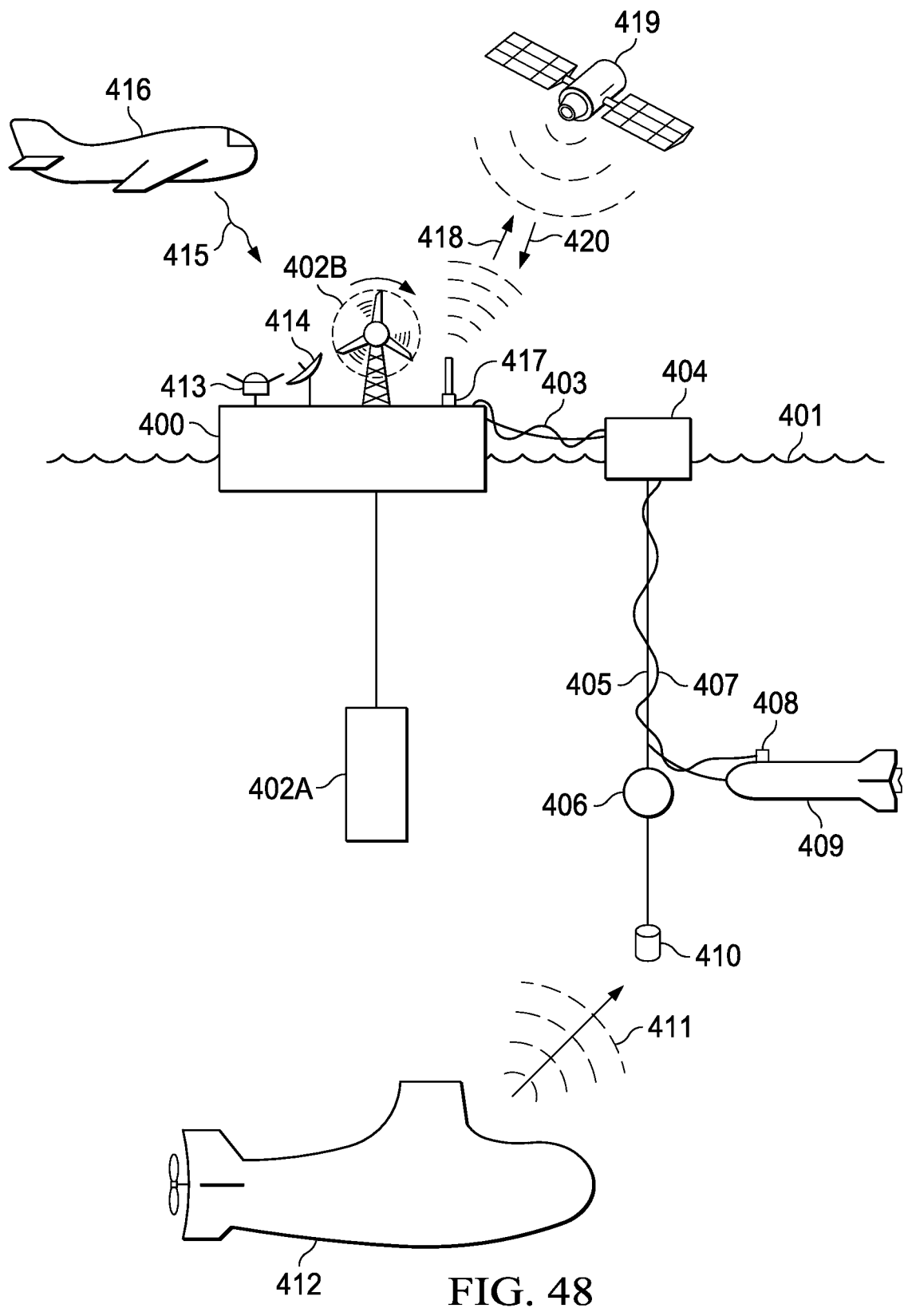
FIG. 48 is another schematic diagram of a data management system of the present invention.

FIG. 48 shows an illustration of an embodiment of the current disclosure.

An embodiment 400 of the current disclosure generates electrical power when wave motion at the surface 401 of the body of water on which the buoy floats, moves the embodiment and its connected submerged power-generation mechanism 402A, and also when wind blows over the surface 401 and energizes the embodiment's horizontal-axis wind turbine 402B.

The embodiment stores at least a portion of the electrical power that it generates within internal energy storage devices, e.g. batteries, capacitors, springs, components, features, circuits, devices, processes, and/or chemical fuel (e.g. hydrogen) generators and storage mechanisms.

At least a portion of the electrical power generated and/or stored by the embodiment is communicated to, and/or consumed by, a plurality, plethora, network, assembly, collection, and/or array, of computational devices, circuits, devices, machines, and/or modules, positioned within the buoy 400, so as to provide at least a portion of those computational devices with the electrical power required to enable them to execute, process, complete, and/or compute, various computational tasks communicated to them from an external source, network, computer, customer, client, application, and/or system.

The embodiment uses at least a portion of that stored electrical energy, and/or of its dynamically-generated electrical power, to energize a camera 413 that monitors the sky in order to detect, and characterize, overflying aircraft, e.g. 416. When it detects an aircraft, it reports 418 to a satellite 419, via transceiver 417, the detection and any characterizing data (e.g. altitude, direction and speed) to a remote computer and/or server. The embodiment utilizes its onboard computational circuits to analyze, prioritize, integrate, fuse, interpret, generate reports about, encrypt, and/or otherwise process, data received from its camera 413.

The embodiment uses at least a portion of that stored electrical energy, and/or of its dynamically-generated electrical power, to energize a radar system 414 that monitors the sky in order to detect, and characterize, radar signals reflected 415 from overflying aircraft, e.g. 416. When it detects an aircraft, it reports 418 to a satellite 419, via transceiver 417, the detection and any characterizing data (e.g. altitude, direction and speed) to a remote computer and/or server. The embodiment utilizes its onboard computational circuits to analyze, prioritize, integrate, fuse, interpret, generate reports about, encrypt, and/or otherwise process, data received from its radar system 414.

The embodiment 400 is connected by a mooring cable, in combination with an electrical and data cable 403, to a secondary buoy 404 from which depends a mooring cable 405 at the deep end of which is attached a weight 406 and a hydrophone 410. The hydrophone detects ambient noises from within the body of water 401, which might include sounds 411 from submarines 412. The embodiment utilizes its onboard computational circuits to analyze, prioritize, integrate, fuse, interpret, generate reports about, encrypt, and/or otherwise process, data received from its hydrophone 410.

When the embodiment's hydrophone detects a submarine, or other submerged vessel, it reports 418 to a satellite 419, via transceiver 417, the detection and any characterizing data (e.g. audio signature, depth, direction and speed) to a remote computer and/or server.

The embodiment 400 is able to receive encrypted data transmitted 420 from a satellite, and originating from a remote computer and/or server, which it can cache and/or store in digital memory components (e.g. static RAM), devices, and/or systems.

From the secondary buoy 404 depends both a mooring cable 405 and an electrical power and data communication (e.g. network) cable 407, i.e. an "umbilical cable." Submerged vessels, e.g. 409, are able to connect to the submerged mooring cable 405, as well as connect (at 408) to the submerged electrical power and data transmission (e.g. network) cable 407. When a submerged vessel 409, e.g. an autonomous underwater vessel, connects to the umbilical cable it is able to recharge its energy storage devices. It is also able to download any and all encrypted data stored in the onboard memory of the embodiment 400.

Following its connection to the umbilical cable, a submerged and/or autonomous vessel 409 is able to exchange data with a remote computer and/or server, e.g. to receive commands, geospatial locations and/or maps, situational awareness data, etc.

Some embodiments of the device 400 use at least a portion of their stored electrical energy, and/or of its dynamically-generated electrical power, to energize an "electro-magnetic listening device" 414 that listens for electromagnetic transmissions, such as those that might be emitted 415 by overflying aircraft 416. When the listening device detects an aircraft, it reports 418 to a satellite 419, via transceiver 417, the detection and any characterizing data (e.g. altitude, direction and speed) to a remote computer and/or server. The embodiment utilizes its onboard computational circuits to analyze, prioritize, integrate, fuse, interpret, generate reports about, encrypt, and/or otherwise process, data received from its electro-magnetic listening device 414.

Some embodiments of the device 400 will not have, nor need, a weight 406 at the end of the mooring cable 405. For instance, if mooring cable 405 is a chain, its own weight will be sufficient to stabilize its orientation, i.e. vertically beneath secondary buoy 404.

Figure 49:
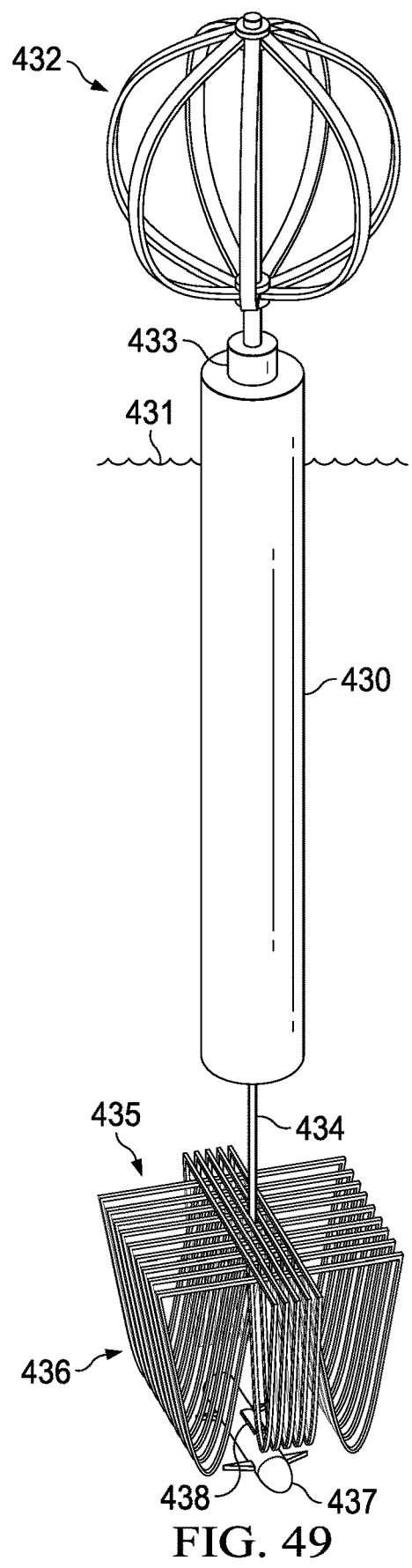
FIG. 49 is an elevated, perspective view of another embodiment of the present invention.

FIG. 49 shows an illustration of an embodiment of the current disclosure.

A spar buoy 430 floats adjacent to an upper surface 431 of a body of water. At a top of the buoy 430 is a Darrieus wind turbine 432 whose shaft is coupled to the rotor of a generator 433 such that the generator generates electrical power when wind causes the turbine to rotate.

Suspended from a tether 434 is a lattice frame 435 from which are suspended a plurality of chains 436, cables, linkages, and/or other negatively buoyant flexible connectors. Under the influence of gravity the chains 436 hang in approximately parabolic arcs beneath and/or below the lattice frame. When an underwater autonomous vehicle (i.e., an AUV or underwater drone) positions itself beneath the lattice and then increases its buoyancy so as to rise, the chains guide it to dock with a coupler (not visible through the chains) attached to an underside of the lattice where the AUV connects so as to receive energy from the embodiment, and to exchange data with the computational modules, circuits, networks, and/or systems, within the buoy 430.

Programs, data, and/or computational tasks, can be delivered to embodiments of this disclosure by AUVs. And, the results of executed programs, processed data, and/or produce of completed tasks, can be returned to a remote site by those same AUVs.

Figure 50:
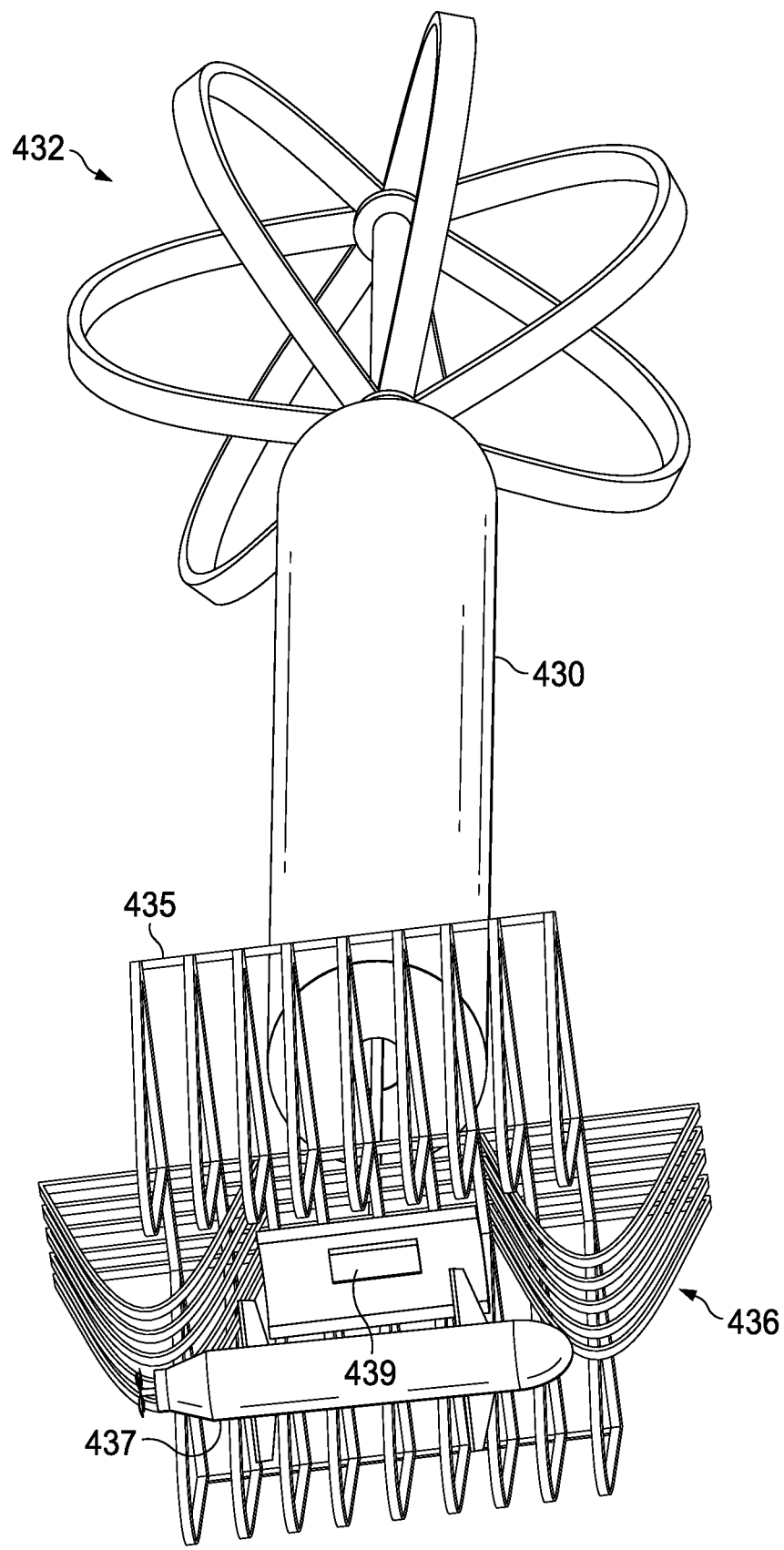
FIG. 50 is bottom perspective view of the embodiment of FIG. 49.

FIG. 50 shows a bottom-up view of the same embodiment illustrated and discussed in relation to FIG. 49.

After rising to a sufficient degree, the AUV 437 in FIG. 49 will encounter and couple to and/or with connector and/or API 439 on the embodiment, therethrough receiving energy and exchanging data.

Figure 51:
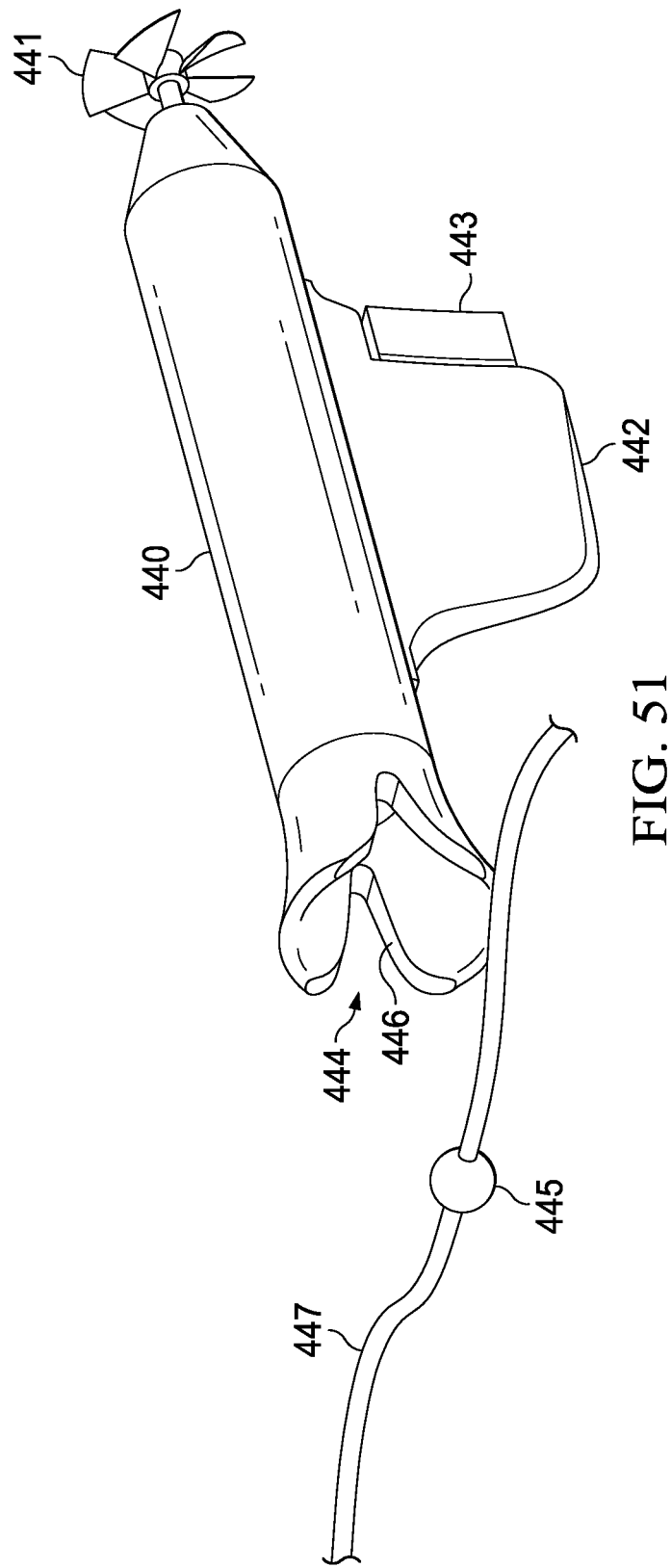
FIG. 51 is an elevated, perspective view of a drone of the present invention.

FIG. 51 shows an illustration of an embodiment of an data transfer device, i.e., "a surface-water data ferry," of the current disclosure.

A surface-water data ferry is an autonomous surface vessel (ASV) 440. The illustrated example ASV is propelled by a motor-driven propeller 441 and is stabilized (e.g., in a vertical orientation) and steered by means of a keel 442 and rudder 443. The front of the ASV has a "scoop-shaped mouth 444 into which a "data node" 445 fits. A side cutout 446 facilitates the entry of a data node by allowing its data cable 447 to pass through the mouth, trapping only or primarily the data node 445.

Any self-powered computational device (SPCD) embodiment of the present disclosure, including those that have been illustrated and discussed, can have attached to it a tether suspended by a plurality of floats 445. Each float can be a data node. Inside the tether can be transmitted electrical power and data.

The data node 445 contains coils of wire and/or other electromagnetic appliances, components, circuits, modules, and/or systems, that allow it to share power (e.g., to transmit power) to an ASV by which it has been captured, and/or to which it is coupled, thereby allowing an ASV to recharge (e.g., for its return trip to a shore-based location).

Such electromagnetic appliances, and/or other data communication APIs, including, but not limited to: electrical contacts, pulse-modulated light sources, radio antennas, etc., allow data nodes to transmit programs, data, and/or computational tasks, as well as other instructions, messages, signals, and/or information, to an SPCD, and to receive from it the results of executed programs, processed data, and/or the product of completed computational tasks.

An ASV can locate an SPCD utilizing geospatial coordinates provided to it by satellite, by homing on specific acoustic signatures emitted by an SPCD, and/or by other methods and means that will be obvious to those skilled in the art.

An ASV can locate a data node, and/or a string of data nodes, by homing on specific acoustic signatures emitted by those data nodes, by specific wavelengths and/or patterns of modulated light emissions, and/or by other methods and means that will be obvious to those skilled in the art.

After completing a receipt of electrical energy, and/or an exchange of data, an ASV releases a captured data node from the pins, latches, inflatable barriers, etc., that have held it in place at the back of the ASV's mouth, and then runs its propeller in reverse and disengages from the data node—which is then available to couple with another ASV.

Figure 52:
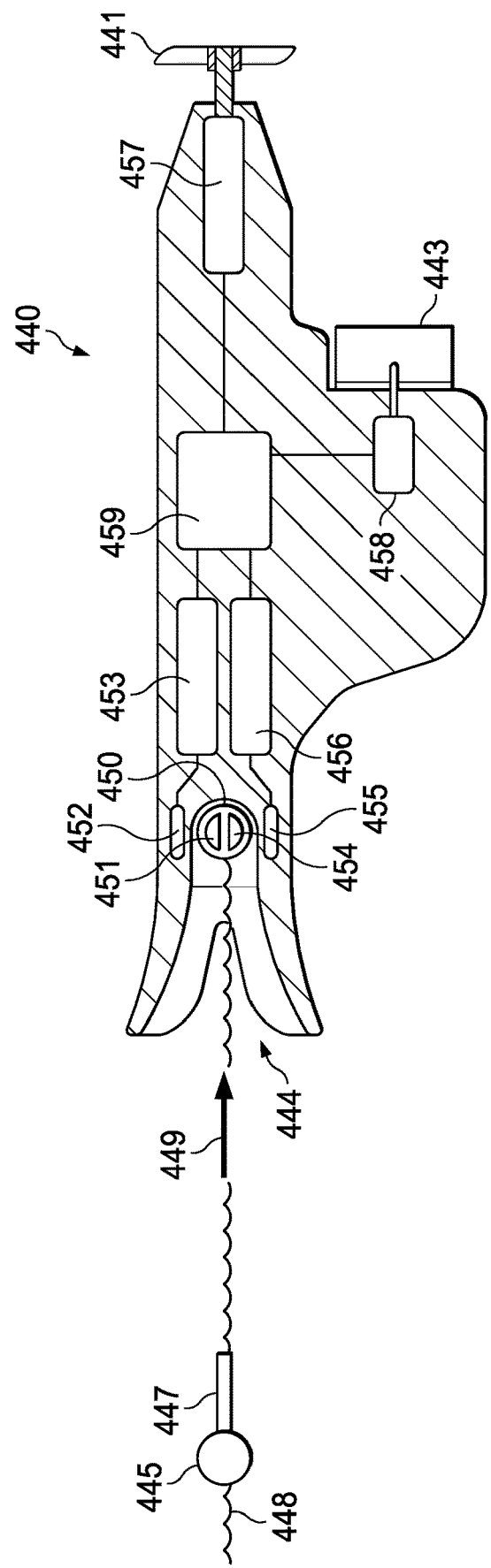
FIG. 52 is a cross sectional view of the drone of FIG. 51.

FIG. 52 shows a vertical sectional view of the same embodiment illustrated and discussed in relation to FIG. 51, where the sectional plane passes through the longitudinal axis of the surface-water data ferry (or "ASV") and is vertical, oriented normal to the mean surface 448 of the body of water on which it floats and moves.

As the ASV approaches a data node 445 the data node moves 449 into the mouth and throat 444 of the ASV where the data node 450 comes to rest, and couples with the ASV at a position at a back end of that throat 444.

An upper module 451, sensor, antenna, circuit, and/or appliance, within coupled data node 450 exchanges data with a complementary sensor, antenna, module 452, circuit, and/or appliance, within the ASV, that transmits from, and receives data that is communicated to, a data storage module 453, comprised of data memory and storage circuits, devices, modules, electronics, and/or systems.

A lower module 454, sensor, antenna, circuit, and/or appliance, within coupled data node 450 exchanges transmits electrical power that is received by a complementary sensor, antenna, module 455, circuit, and/or appliance, within the ASV, that transmits at least a portion of that electrical power to an energy storage module 456 comprised of batteries, capacitors, and/or other energy storing, releasing, and/or buffering circuits, electronics, modules, systems, and/or components.

An electrically powered motor 457 rotates the ASV's propeller 441 generating thrust. And, a motor 458 controls the angular orientation of the ASV's rudder 443 allowing the course of the ASV through the water to be adjusted and/or controlled.

A central "command and control" computer 459 and/or computational module, circuit, and/or system controls the ASV's reading and transmitting of data through transceiver 452, it controls and regulates the ASV's acquisition of electrical power from transceiver, antenna, and/or coil 455, it controls the ASV's search for, detection, tracking, approach, contact, and coupling with data nodes, e.g., 445 and 454, it controls the exchange of data, signals, and/or other messages, with a remote station, server, network, computer, and/or system, by means of transmissions with and/or between itself (through a radio system not shown) and satellites, aerial drones, self-powered computational device embodiments of the present disclosure, etc., and it controls the propeller's 441 speed (rate of rotation) and the course steered by the rudder 443.

DETAILED DESCRIPTION OF THE PREFERRED EMBODIMENTS

The device disclosed herein is a wind energy device that floats adjacent to an upper surface of a body of water, e.g. the sea, and which incorporates a plurality of computing devices that are powered, at least in part, by the electrical power generated by the device in response to the passage of winds over, through, and/or around, it.

Types of Wind Energy Devices

Some embodiments of the present disclosure conform to the characteristics considered typical of "horizontal-axis wind turbines (HAWTs)." These devices typically utilize multi-bladed propellers, fans, and/or turbines, in which the blades rotate about a rotational axis that is substantially, typically, and/or nominally, horizontal (e.g., parallel to the resting surface of the body of water on which an embodiment floats). Some HAWTs comprise blades radially projected from, and/or attached to, shafts that rotate from, and/or are rotatably connected to, "nacelles" which may contain bearings to facilitate turbine shaft rotation, gearboxes to produce rotations of secondary shafts at higher rates of rotation (e.g., RPMs) than those that characterize the rotations of the turbine shafts, respectively, generators to convert the rotations of turbine shafts into electrical power, etc. In some embodiments, the nacelles may rotate about a shaft, pole, and/or strut, to which they are connected. In other embodiments, the nacelles may be fixed to the shaft, pole, and/or strut, to which they are attached, and through which they are elevated above the surface to which a lower end of the shaft, pole, and/or strut, is attached.

Some embodiments of the present disclosure conform to the characteristics considered typical of "vertical-axis wind turbines (VAWTs)." These devices typically utilize one or more blades and/or surfaces that rotate about a rotational axis that is substantially, typically, and/or nominally, vertical (e.g., normal to the resting surface of the body of water on which an embodiment floats). Many types, designs, and/or categories, of VAWTs are known to those skilled in the art, and include, but are not limited to: "Darrieus" VAWTs (e.g., curved-rotor types, vertical-rotor and/or "Giromill" types, helical-rotor types), "Savonius" VAWTs, and "free-wing" types (e.g., in which vertical flaps rotate about vertical axes as they rotate about the turbine's central vertical shaft, and "flip" open to catch the wind when rotating away from the wind, and "flip" closed to avoid the drag that might inhibit its rotation into the wind).

The scope of the present disclosure includes embodiments that utilize any, every, and/or all, varieties, types, designs, and/or categories, of wind turbines, nacelles, mountings, bearings, materials, sizes, "swept areas," configurations, numbers of blades, numbers of surfaces, rotational axis orientations, etc.

Types of CPUs/Computing Devices

Some embodiments of the present disclosure incorporate, utilize, energize, and/or operate, computers incorporating CPUs, CPU-cores, inter-connected logic gates, ASICs, RAM, flash drives, SSDs, hard disks, GPUs, quantum chips, optoelectronic circuits, analog computing circuits, encryption circuits, and/or decryption circuits.

Some embodiments of the present disclosure incorporate, utilize, energize, and/or operate, computers specialized and/or optimized with respect to the computation, and/or types of computation, characteristic of, but not limited to: machine learning, neural networks, cryptocurrency mining, graphics processing, image object recognition and/or classification, image rendering, quantum computing, financial analysis and/or prediction, and/or artificial intelligence.

Some embodiments of the present disclosure incorporate, utilize, energize, and/or operate, computers that, at least approximately, conform to the characteristics typically ascribed to, but not limited to: "blade servers," "rack-mounted computers and/or servers," and/or supercomputers.

Types of Computational Circuits

Some embodiments of the present disclosure incorporate, utilize, energize, and/or operate, at least 100 computing circuits and/or CPUs. Some incorporate, utilize, energize, and/or operate, at least 1,000 computing circuits and/or CPUs. Some incorporate, utilize, energize, and/or operate, at least 10,000 computing circuits and/or CPUs. Some incorporate, utilize, energize, and/or operate, at least 100,000 computing circuits and/or CPUs. Some incorporate, utilize, energize, and/or operate, at least 1,000,000 computing circuits and/or CPUs.

Some embodiments of the present disclosure utilize computing chips and/or circuits that contain two or more CPUs and/or computing "cores" per chip and/or per circuit.

Some embodiments of the present disclosure utilize computing chips and/or circuits that contain a graphics processing unit (GPU) within the chips and/or within a computing circuit.

Types of Computing Tasks

Some embodiments of the present disclosure incorporate, utilize, energize, and/or operate, computers organized, interconnected, controlled, and/or configured, so as to optimize the loading, execution, and reporting of results, related to arbitrary computational tasks.

These types of arbitrary computational tasks might be typical of services that execute programs for others, and/or provide computational resources with which others may execute their own programs, often in exchange for a fee based on attributes of the tasks and/or resources used, that might include, but would not be limited to: size (e.g. in bytes) of program and/or data executed, size (e.g. in bytes) of data created during program execution and/or returned to the owner of the program, number of computing cycles (number of computational operations) consumed during program execution, amounts of RAM, and/or hard disk space, utilized during program execution, other computing resources, such as GPUs, required for program execution, and the amount of electrical power consumed during and/or by a program's execution.

Embodiments optimized to perform arbitrary computational tasks might utilize "disk-free computing devices" in conjunction with "storage area networks" so as to utilize memory and/or data storage components and/or devices more efficiently.

Some embodiments of the present disclosure incorporate, utilize, energize, and/or operate, computers organized, interconnected, controlled, and/or configured, so as to optimize the loading, execution, and reporting of results, related to "cryptocurrency (e.g. Bitcoin) mining," i.e. to the calculation of cryptocurrency ledgers, and the identification of suitable ledger-specific "nonce" values, and/or related to the loading, execution, and reporting of results, related to other "proof of work" programs. The computers, and/or computing resources, of some embodiments are optimized to calculate blockchain blocks.

Some embodiments of the present disclosure incorporate, utilize, energize, and/or operate, computers organized, interconnected, controlled, and/or configured, so as to optimize the loading, execution, and reporting of results, related to neural networks and/or artificially intelligent programs. Some embodiments will facilitate the cooperate execution of programs related to neural networks and/or artificially intelligent programs through the direct, physical, and/or virtual, interconnection of their internal networks and/or computing devices.

Some embodiments of the present disclosure incorporate, utilize, energize, and/or operate, computers organized, interconnected, controlled, and/or configured, so as to optimize the loading, execution, and reporting of results, related to the serving of web pages and/or search results, and/or to otherwise perform the tasks, and/or to provide the services, typically associated with "server farms."

Some embodiments of the present disclosure incorporate, utilize, energize, and/or operate, computers organized, interconnected, controlled, and/or configured, so as to optimize the loading, execution, and reporting of results, related to the solving of "n-body problems," the simulation of brains, gene matching, and solving "radar cross-section problems."

Some embodiments of the present disclosure incorporate, utilize, energize, and/or operate, computers organized, interconnected, controlled, and/or configured, so as to optimize the loading, execution, and reporting of results, consistent with the functionality provided by "terminal servers," colocation servers and/or services, and/or to provide offsite backups for enterprises.

Types of Computing Task Management

An embodiment of the present disclosure receives a task from a remote source and/or server. An embodiment receives a task from a radio and/or electromagnetic transmission broadcast by a satellite (e.g. which a plurality of other devices also receive and/or are able to receive). An embodiment receives a task across and/or via a transmission across a fiber-optic cable. An embodiment receives a task across and/or via a transmission across a LAN and/or Ethernet cable.

An embodiment adds the task to a task queue of pending tasks if:

it possesses, incorporates, and/or operates, all of the hardware required to complete and/or execute the task efficiently;

there is sufficient room in its task queue;

there is a sufficient likelihood that it will be able to complete the task no later than any deadline associated with the task; and, the estimated duration of the task's execution is no more than the likely operational time available to the device (e.g. given current energy reserves, current power generation levels, etc.).

When an embodiment begins execution of a task, it marks the task as "in-progress" and sets a "timeout" value, after which the task will be restarted if not yet complete.

When am embodiment determines that the level of its power generation has decreased, and the continued and/or continuous operation of its currently "active" computing devices can no longer be sustained, then it stops execution of a sufficient number of its most-recently started computational tasks, and powers down the corresponding computing devices, so that there will remain sufficient power to complete the computation of the remaining tasks and still-active computing devices.

An embodiment transmits the results of a completed task to a remote source and/or server (e.g. the remote source and/or server from which the task originated). After receipt and/or validation of the completed-task results, the remote source and/or server broadcasts to all of the devices which (would have been expected to have) received the now-completed task, a message and/or signal to indicate that the task has been completed. Each of the devices receiving the "task-completed" message and/or signal then removes that task from its task queue, and terminates execution of the task if the execution of the task is in progress.

An embodiment facilitates the receipt of the same task by a plurality of devices, each of which may elect to place the task in its respective task queue, and/or to execute the task when sufficient computing resources and/or energy are available.

In addition to the results of a task, an embodiment also returns to a remote source and/or server, information that is sufficient to allow the benefactor of the task's execution to be charged and/or billed an amount of money consistent with a payment contract. Such "billing-relevant information" might include, but is not limited to, the following:
  size (e.g. in bytes) of the program executed;
  size (e.g. in bytes) of the results generated;
  amount (e.g. in bytes) of RAM required to complete the program's execution;
  number of instruction cycles required to complete the program's execution;
  number of CPUs required to complete the program's execution;
  number and/or cycles required of GPUs to complete the program's execution;
  amount of energy (e.g. kWh) expended to complete the execution of the program;
  degree of requested task priority that influenced priority of task execution;
  degree and/or percentage of available computing resources busy with other tasks at time of task execution (e.g. level of demand at time of task execution);
  amount of task-results data (e.g. in bytes) returned to the remote source and/or server;
  cost for satellite bandwidth consumed (e.g. bytes) and/or required in order to transmit task and associated data to device; and/or
  cost for satellite bandwidth consumed (e.g. bytes) and/or required in order to transmit task results to remote source and/or server.

An embodiment of the present disclosure sends task-execution-specific data, messages, and/or signals, to a remote source and/or server which indicate, among other things:
  which tasks are waiting in a task queue;
  which tasks are being executed;
  estimated time remaining to complete execution of tasks being executed;
  an estimate of the amount of energy required to complete tasks being executed;
  an estimate of the rate of electrical power generation;
  an estimate of the amount of shared memory required to complete tasks being executed;
  and an estimate of the amount of shared memory currently available.

A global task controlling and/or coordinating computer and/or server may use such task-execution-specific data in order to forecast which tasks are likely to be successfully completed by a future time. And, if the likelihood of a particular task's completion by a future time is sufficiently great then other devices notified at an earlier time of the task, and potentially storing the task in their respective task queues, may be notified of that task's likely completion by a device. Those other devices may then elect to reduce the priority of the task, or to remove it from their task queues.

Types of Computing-Task Processing

Some embodiments of the present disclosure execute encrypted programs and/or data for which a decryption key, algorithm, and/or parameter, is not available, nor accessible, to other tasks, programs, and/or computing circuits and/or devices, on the respective embodiments. Some embodiments of the present disclosure execute encrypted programs and/or data for which a decryption key, algorithm, and/or parameter, is not available, nor accessible, to an embodiment device, nor to the remote source(s) and/or server(s) which transmitted the encrypted program and/or data to the device.

Some embodiments of the present disclosure execute two or more encrypted programs that are encrypted with different encryption keys, algorithms, and/or parameters, and must be decrypted with different decryption keys, algorithms, and/or parameters.

Some embodiments of the present disclosure utilize a plurality of CPUs and/or computing circuits to independently, and/or in parallel, execute the same program, operating on the same data set, wherein each execution will nominally and/or typically produce identical task results.

Some embodiments of the present disclosure utilize a plurality of CPUs and/or computing circuits to execute the same program, operating on the same data set, in a parallelized fashion wherein each individual CPU and/or computing circuit will execute the program with respect to a portion of the full data set, thereby contributing piecemeal to the complete execution of the task.

Types of Data Transmission

Some embodiments of the present disclosure communicate data to and from a remote and/or terrestrial digital data network and/or internet, and/or exchange data with other computers and/or networks remote from the embodiment, and/or not physically attached to, nor incorporated within, the embodiment, by means of "indirect network communication links" which include, but are not limited to:
  satellite, Wi-Fi, radio, microwave, modulated light (e.g. laser, LED), "quantum-data-sharing network" (e.g., in which quantum entangled atoms, photons, atomic particles, quantum particles, etc., are systematically altered so as to transmit data from one point [e.g., the location of one particle] to another point [e.g., the location of another particle]), as well as:
  fiber-optic cable(s), LAN cable(s), Ethernet cable(s), and/or other electrical and/or optical cables.

Some free-floating embodiments of the present disclosure, as well as some anchored and/or moored embodiments that are not directly connected to land by means of a cable, utilize one or more indirect network communication links.

Some embodiments of the present disclosure which communicate with other and/or terrestrial data transmission and/or exchange networks transmit data to a remote receiver by means of modulated light (e.g. laser or LED) which is limited to one or more specific wavelengths and/or ranges of wavelengths. The sensitivity of the remote receiver is then improved through the receiver's use of complementary filter(s) to exclude wavelengths of light outside the one or more specific wavelengths and/or ranges of wavelengths used by the transmitting embodiment. A remote receiver might utilize multiple such wavelength-specific filters, e.g. utilize one at a time, so as to limit and/or discriminate its receipt of data to that transmitted from one or more specific devices at a time and/or from among many such devices, each of which, and/or each subset of which, utilizes a specific wavelength(s) and/or range(s) of wavelengths.

Some embodiments of the present disclosure which communicate with other and/or terrestrial data transmission and/or exchange networks transmit data to a remote receiver by means of modulated light (e.g. laser or LED) receive data from a remote transmitter by means of modulated light (e.g. laser or LED) which is limited to one or more specific wavelengths and/or ranges of wavelengths. The sensitivity of the embodiment's receiver is then improved through the receiver's use of complementary filter(s) to exclude wavelengths of light outside the one or more specific wavelengths and/or ranges of wavelengths used by the transmitting remote transmitter.

Some embodiments of the present disclosure exchange data with neighboring and/or proximate other and/or complementary devices through the use of one wavelength, one range of wavelengths, and/or one set of wavelengths. And some of these embodiments exchange data with terrestrial and/or remote network nodes linked to remote network(s) and/or remote computer(s) through the use of another and/or different wavelength, another and/or different range of wavelengths, and/or another and/or different set of wavelengths.

Some embodiments of the present disclosure exchange data with neighboring and/or proximate other and/or complementary devices through the use of one or more types and/or channels of data communication and/or transmission, e.g. Wi-Fi, modulated light, radio, and/or microwave, while exchanging data with remote computer(s) and/or network(s) (e.g. the internet) through the use of one or more other and/or different types and/or channels of data communication and/or transmission, e.g. satellite, quantum-entanglement transmitters/receivers.

Some embodiments of the present disclosure exchange data with neighboring and/or proximate other and/or complementary devices, and/or remote and/or terrestrial computers and/or networks, through data passed to, from, through, and/or between, aerial drones, surface water drones, underwater drones, balloon-suspended transmitter/receiver modules, devices, or systems, manned planes, boats, and/or submarines.

Some embodiments of the present disclosure exchange data with neighboring and/or proximate other and/or complementary devices, and/or remote and/or terrestrial computers and/or networks, through data passed to, from, through, and/or between, underwater transmitter/receiver modules, devices, or systems drifting on, and/or in, the body of water, and/or modules, devices, or systems resting on, and/or attached to, the seafloor, by means including, but not limited to, the generation, detection, encoding, and/or decoding, of acoustic signals, sounds, and/or data.

Some embodiments of the present disclosure receive "global" transmissions of data from a remote and/or terrestrial computer and/or network via one channel, frequency, wavelength, and/or amplitude modulation, broadcast by a satellite, radio, microwave, modulated light, and/or other means of electro-magnetic data transmission. Some of these embodiments transmit device-specific, and/or device-group-specific (e.g. two or more "cooperating" devices, two or more devices whose device-specific computer(s) and/or computer network(s) are linked, e.g. by Wi-Fi), on other and/or different channels, frequencies, wavelengths, and/or amplitude modulations, to a compatible and/or complementary receiver on a satellite, and/or other receiver of radio, microwave, modulated light, and/or other means of electro-magnetic data transmissions.

In some deployments of some embodiments of the present disclosure, a satellite will broadcast to a plurality of the deployed devices, on a channel and/or frequency shared by many, if not all, of the devices in a deployment, information including, but not limited to: data, tasks, requests for information (e.g. status of tasks, geolocation of a device or group of devices, amount(s) of energy available for computational tasks and/or for locomotion, amount of electrical power being generated in response to the current wind conditions of a device and/or group of devices, status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, etc.).

In some deployments of some embodiments of the present disclosure, a satellite will broadcast to a specific deployed device, and/or subset or group of deployed devices, on a channel and/or frequency specific to the device, and/or subset or group of deployed devices, information including, but not limited to: device- or group-specific data (e.g. which range of Bitcoin nonce values to evaluate), device- or group-specific tasks (such as which types of observation to prioritize, e.g. submarines), requests for information (e.g. wind conditions at location of device), etc.

In some deployments of some embodiments of the present disclosure, each device, or subset of devices, will broadcast to a satellite on a channel and/or frequency specific to the device, or subset of devices, (i.e. and not shared by other devices in a deployment) information including, but not limited to: data, task results (e.g. Bitcoin ledgers and corresponding nonce values), requests for information (e.g. new tasks, weather and/or wind forecasts for a given geolocation, results of self-diagnostics on hardware, software, memory integrity, etc., status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, observations (e.g. visual, audio, radar) of aircraft, observations of other floating vessels, observations of submarines, observations of marine life, observations of weather and/or wind conditions, environmental sensor readings, etc.).

Types of Inter-Device Data Sharing

Some embodiments of the present disclosure facilitate communication, coordination, and/or the transfer of data, between two or more of their respective computing devices and/or circuits by means of a common distributed network, e.g. Ethernet, and/or TCP/IP.

Some embodiments of the present disclosure facilitate communication, coordination, and/or the transfer of data, between the computers, circuits, and/or internal and/or physical networks on, and/or incorporated within, two or more devices by means of virtual and/or electromagnetic network connections and/or links, e.g. WAN, Wi-Fi, satellite-mediated, radio, microwave, and/or modulated light.

The devices of such embodiments share data, programs, and/or otherwise cooperate, without the benefit of a physical network connection.

Some embodiments of the present disclosure transmit, receive, transfer, share, and/or exchange, data by means of electrical signals transmitted through the seawater on which they float. By inducing localized currents, and/or charges, within the seawater that surrounds it, an embodiment can create electrical signals in the seawater that travel through the seawater, and/or radiate away from the device within the seawater, and can be detected and/or received by one or more other similar devices. In this way, a two-way exchange of data, as well as broadcasts of data from one device to many others, can be completed, executed, and/or realized.

Some embodiments of the present disclosure facilitate the sharing, and/or exchange, of data between widely separated devices, e.g. devices which are so distant from one another that line-of-sight communication options, e.g. modulated light, are not available, by daisy-chaining inter-device communications, signals, transmissions, and/or data transfers. Data may be exchanged between two widely separated devices through the receipt and re-transmission of that data by devices located at intermediate positions.

Some embodiments of the present disclosure transmit, receive, transfer, share, and/or exchange, data by means of light and/or "flashes" shined on, and/or reflected or refracted by, atmospheric features, elements, particulates, droplets, etc. An embodiment will encode data (and preferably first encrypt the data to be transmitted) into a series of modulated light pulses and/or flashes that are projected into the atmosphere in at least an approximate direction toward another such device. The receiving device, e.g. through the use of wavelength-specific filters, and/or temporally-specific frequency filters, will then detect at least a portion of the transmitted light pulses and decode the encoded data. The return of data by the receiving device is accomplished in a similar manner.

Such a "reflected and/or refracted and light-modulated" data stream can be made specific to at least a particular wavelength, range of wavelengths, pulse frequency, and/or range of pulse frequencies. By such a data communication scheme and/or process, an individual device can be configured to transmit data to one or more individual other devices (e.g. on separate wavelength-specific channels), and/or to a plurality of other devices. It can be configured to receive data from one or more individual other devices (e.g. on separate wavelength-specific channels), and/or to a plurality of other devices.

Types of Data Transmission Networks

Some embodiments of the present disclosure interconnect at least some of their computing devices with, and/or within, a network in which each of a plurality of the computing devices are assigned, and/or associated with, a unique internet, and/or "IP" address. Some embodiments of the present disclosure interconnect at least some of their computing devices with, and/or within, a network in which a plurality of the computing devices are assigned, and/or associated with, a unique local subnet IP address.

Some embodiments of the present disclosure interconnect at least some of their computing devices with, and/or within, a network that incorporates, includes, and/or utilizes, a router.

Some embodiments of the present disclosure interconnect at least some of their computing devices with, and/or within, a network that incorporates, includes, and/or utilizes, a modem.

Some embodiments of the present disclosure interconnect at least some of their computing devices with, and/or within, a network that incorporates, includes, and/or utilizes, a "storage area network."

Types of Cooling

Some embodiments of the present disclosure passively cool their computing devices by facilitating the conductive and/or convective transmission of heat from the computing devices and/or their environment to the water on which the device floats, e.g. through a thermally conductive wall, and/or fins or heat baffles, separating the devices from the water.

Some embodiments of the present disclosure passively cool their computing devices by facilitating the conductive and/or convective transmission of heat from the computing devices and/or their environment to the air above the water on which the device floats, e.g. through a thermally conductive wall, and/or fins or heat baffles, separating the devices from the air.

Some embodiments of the present disclosure actively cool their computing devices by means of a heat exchanger that absorbs heat from the computing devices and/or their environment, and carries it to a heat exchanger in thermal contact with the water on which the device floats and/or the air above that water, and to which at least a portion of the conducted heat is transferred, transmitted, communicated, and/or dissipated.

Much, if not all, of the energy imparted to computational devices within an embodiment of the present disclosure will end up as heat. And, excessive levels of heat might damage or impair those computational devices. Therefore, it is prudent for an embodiment to remove heat from its "active" computational devices as quickly and/or efficiently as possible, and/or quickly enough to avoid excessive heating of the computational devices.

Some embodiments of the present disclosure facilitate the passive conductive and/or convective cooling of at least some of their computational devices, and/or of the ambient environments of those computation devices. Some embodiments of the present disclosure actively remove heat from their computational devices, and/or from the ambient environments of those computational devices.

Some embodiments of the present disclosure passively cool their computing devices, and/or of the ambient environments of their computing devices, by providing a thermally conductive connection between the computing devices and the water on which the embodiment floats. Some embodiments promote this conduction of heat from the computing devices to the ambient water by using "fins" and/or other means of increasing and/or maximizing the surface area of the conductive surface in contact with the water. Some embodiments promote this conduction of heat from the computing devices to the ambient water by using "fins" and/or other means of increasing and/or maximizing the surface area of the conductive surface in contact with the computing devices and/or the ambient environments of their computing devices. Some embodiments promote this conduction of heat from the computing devices to the ambient water by using copper and/or copper/nickel heatsink poles and/or plates extending into the water and/or into the chamber(s) in which at least a portion of the embodiment's computing devices are located.

Some embodiments of the present disclosure passively cool their computing devices, and/or of the ambient environments of their computing devices, by providing a thermally conductive connection between the computing devices and the air that surrounds the embodiment. Some embodiments promote this conduction of heat from the computing devices to the ambient air by using "fins" and/or other means of increasing and/or maximizing the surface area of the conductive surface in contact with the air. Some embodiments promote this conduction of heat from the computing devices to the ambient air by using "fins" and/or other means of increasing and/or maximizing the surface area of the conductive surface in contact with the computing devices and/or the ambient environments of their computing devices.

Some embodiments of the present disclosure are positioned within sealed chambers containing air, nitrogen, and/or another gas or gases. Some embodiments of the present disclosure are positioned within chambers into which air, nitrogen, and/or another gas or gases, are pumped.

Some embodiments of the present disclosure promote the conduction of heat from their computing devices to the ambient air and/or water by immersing, surrounding, bathing, and/or spraying, the computing devices with and/or in a thermally conductive fluid and/or gas. The thermally conductive fluid and/or gas is ideally not electrically conductive, as this might tend to short-circuit, damage, and/or destroy, the computing devices. The thermally conductive fluid and/or gas ideally has a high heat capacity that allows it to absorb substantial heat without experiencing a substantial increase in its own temperature. The thermally conductive fluid and/or gas carries at least a portion of the heat generated and/or produced by at least some of the computing devices to one or more other thermally conductive interfaces and/or conduits through which at least a portion of the heat may pass from the fluid and/or gas to the ambient air or water proximate to the embodiment.

Because a computing device operating in an air environment (e.g. inside a compartment or module on and/or within an embodiment of the present disclosure) may not transmit heat with sufficient efficiency to prevent and/or preclude an overheating of the computing device, the use, by some embodiments, of a thermally conductive fluid and/or gas to facilitate the passage of heat from the various components (e.g. the CPUs) within the computing devices to the ambient air or water proximate to the embodiment may reduce the risk of overheating, damaging, and/or destroying some, if not all, of the computing devices therein.

Some embodiments of the present disclosure provide improved "buffering" of the heat that they absorb from their respective computing devices, while that heat is being transmitted to the surrounding air and/or water through their use of, and/or surrounding of at least some of their respective computing devices with, a phase-changing refrigerant, including, but not limited to: "organic PCMs" such as various paraffin waxes and fatty acids, "inorganic PCMs" such as various salt hydrates, and "Eutectics."

A significant advantage of embodiments of the present disclosure is that a large number of computing devices can be deployed in such a way (i.e. within a large number of embodiments) that relatively the large number of computing devices is partitioned into relatively small groups, which, in addition to being powered, at least in part, by the energy available in the environment proximate to each embodiment, and the relatively small number of computing devices therein, are also immediately adjacent, and/or proximate, to a heat sink characterized by a relatively cool temperature and a relatively large heat capacity, i.e. the sea. By deploying relatively small numbers of computing devices in self-powered and passively cooled autonomous units, environmental energy is used with maximal efficiency (e.g. without suffering the losses and costs associated with transmitting the power to shore), and requisite cooling is accomplished with minimal, if any, expenditure of energy.

By contrast, the concentration of larger numbers of computing devices such as might be found within traditional data centers and/or server farms, e.g. the number of computing devices that might be associated with hundreds or thousands of embodiments of the present disclosure, requires that power be generated elsewhere and transmitted to the concentrated collection(s) of computing devices, thereby increasing costs and incidental losses of energy, and that heat be actively and energetically removed from the "mass(es)" of computing devices, concentrated in a relatively small space, and/or volume, by means requiring significant expenditure of capital and additional energy.

Energy Management

Some embodiments of the present disclosure activate and deactivate subsets of their computers, thereby changing and/or adjusting the number and/or percentage of their computers that are active at any given time, in response to changes in wind conditions, and/or changes in the amount of electrical power generated by the power takeoffs of their respective devices, so as to match the amount of power being consumed by the computers to the amount being generated.

Some embodiments of the present disclosure incorporate, and/or utilize components and/or mechanism, including, but not limited to: batteries, capacitors, springs, components, features, circuits, devices, processes, and/or chemical fuel (e.g. hydrogen) generators and storage mechanisms. These energy storage mechanisms permit the embodiments to store, at least for a short time (e.g. 10 seconds), at least a portion of the electrical and/or mechanical energy generated by the embodiment in response to wind motion. Such energy storage may have the beneficial effect of integrating and/or smoothing the generated electrical power.

Some embodiments, when tethered to other devices, may further stabilize their own energy supplies, as well as helping to stabilize the energy supplies of other tethered devices, by sharing electrical energy, batteries, capacitors, and/or other energy storage means, components, and/or systems, and/or by sharing and/or distributing generated power, across a shared, common, and/or networked power bus and/or grid. This capability and deployment scenario will facilitate the ability of some tethered collections and/or farms of devices to potentially utilize a smaller total number of batteries, capacitors, and/or other energy storage means, components, and/or systems, since the sharing of such components, systems, and/or reserves will tend to reduce the amount of energy that any one device will need to store in order to achieve a certain level of stability with respect to local variations in generated power and/or computing requirements.

Such energy storage, especially if a sufficiently great amount of energy may be thus stored, may allow device to continue powering a total number of computers than could be directly powered by any instantaneous level of generated electrical power. For example, an embodiment able to store enough power to energize all of its computers for a day in the absence of wind, may be able to avoid reducing its number of active computers during a "lull" in the wind, and continue energizing them until the wind resumes.

Some embodiments of the present disclosure apply, consume, utilize, and/or apply, at least 50% of the electrical power that they generate to the energizing, and/or operation, of their respective computing devices and/or circuitry. Some embodiments of the present disclosure apply, consume, utilize, and/or apply, at least 90% of the electrical power that they generate to the energizing, and/or operation, of their respective computing devices and/or circuitry. Some embodiments of the present disclosure apply, consume, utilize, and/or apply, at least 99% of the electrical power that they generate to the energizing, and/or operation, of their respective computing devices and/or circuitry.

Some embodiments of the present disclosure incorporate, utilize, energize, and/or operate, with a "power usage effectiveness" (PUE) of no more than 1.1. Some embodiments of the present disclosure incorporate, utilize, energize, and/or operate, with a "power usage effectiveness" (PUE) of no more than 1.01. Some embodiments of the present disclosure incorporate, utilize, energize, and/or operate, with a "power usage effectiveness" (PUE) of no more than 1.001.

Some embodiments of the present disclosure turn at least a portion of their respective computing devices on and off so as to at least approximately match the amount of electrical power being consumed by their respective "active" (i.e. energized, working, operating, computing, and/or functioning) computing devices, to the amount of electrical power being generated by the embodiments, and/or the rate at which the embodiments are extracting energy from the winds that buffet them.

Some embodiments of the present disclosure turn at least a portion of their respective computing devices on and off so as to at least approximately match the amount of electrical power that their own computers forecast and/or estimate that they will generate at a future time. Some embodiments of the present disclosure turn at least a portion of their respective computing devices on and off so as to at least approximately match the amount of electrical power that has been forecast and/or estimated by a computer on another device, and/or on a computer at another remote location, that they will generate at a future time.

Some embodiments of the present disclosure select those tasks that they will attempt to compute and/or execute so as to at least approximately match the amount of future computing power, and/or the amount of time, required to complete those tasks will at least approximately match a forecast and/or estimated of computing power, and/or operational time, that will be available to the embodiment at a future time.

Some embodiments of the present disclosure, when deployed within a farm configuration in which the devices are collectively electrically connected to one or more terrestrial and/or other sources of electrical power, may, e.g. when their power generation exceeds their computing power requirements, send excess generated electrical power to shore. Conversely, devices deployed in such a farm configuration, in which the devices are collectively electrically connected to one or more terrestrial and/or other sources of electrical power, may, when their computing demands require more electrical energy than can be provided through the conversion of wind energy (e.g. when winds are small), draw energy from those one or more terrestrial sources of power so as to continue computing and/or recharge their energy reserves.

Types of Deployments

Some embodiments of the present disclosure float freely, and/or "drift," adjacent to a surface of water in a passive manner which results in their movement in response to wind, waves, currents, tides, etc. Some embodiments are anchored and/or moored so as to retain an approximately constant position relative to a position on the underlying seafloor. And, some embodiments are self-propelled, and/or capable of exploiting natural movements of air and/or water.

Some embodiments of the present disclosure are self-propelled and/or capable of exploiting natural movements of air and/or water so as to change their positions in at least a somewhat controlled manner. Some self-propelled embodiments achieve their directed motions by means that include, but are not limited to: rigid sails, ducted fans, propellers, sea anchors, Flettner rotors, and/or drogue anchors. Some also achieve their directed motions by means that include, but are not limited to: the utilization of objects, including those that are rigid, flexible, inflatable (e.g., with water), and/or deflatable, that are positioned at a depth sufficient to cause the object to interact with a current that may differ in direction and/or speed from a current adjacent to the surface of the body of water on which an embodiment floats, and thereby to be "dragged" at least to a degree by that sub-surface current.

A self-propelled embodiment achieves at least a portion of its directed motion through the utilization of an "airplane-like" drone/kite connected to the embodiment by a flexible connector and/or tether (e.g., a rope, chain, cable, and/or linkage). The embodiment controls the "control surfaces," e.g., the ailerons of the wings, the elevators of the horizontal stabilizers, and/or the rudder of the vertical stabilizer, by means that include, but are not limited to, electrical signals communicated through the flexible connector (e.g., through a metal connector using the seawater as the ground), acoustic signals issued by a transducer attached to a bottom surface of the buoy, etc. By directing the "plane-kite" to "bank left or right" and to pull in that direction, relative to a subsurface current moving in a different direction than the embodiment, the embodiment can impart to itself a current-driven force oriented across a range of angles relative to the direction of the subsurface current's flow.

Some embodiments of the present disclosure are deployed so as to be free-floating and so as to drift with the ambient winds, currents, and/or other environmental influences that will affect and/or alter its geolocation. Some embodiments of the present disclosure are deployed such that individual devices are anchored and/or moored (e.g. to the seafloor) so as to remain approximately stationary.

Some embodiments of the present disclosure are anchored and/or moored proximate to other such devices, and some embodiments are moored to one another. Some embodiments are deployed in "farms" and their computers may be directly and/or indirectly interconnected such that they may interact, e.g. when cooperating to complete various computing tasks. Some devices deployed in farms communicate with computers and/or networks on land by means of one or more subsea data transmission cables, including, but not limited to: fiber optic cables, LAN cables, Ethernet cables, and/or other electrical cables. Some devices deployed in farms communicate with computers and/or networks on land by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure which drift and/or are self-propelled, directly and/or indirectly interconnect their computers and/or onboard data networks so they may interact, e.g. when cooperating to complete various computing tasks. For example, some drifting embodiments act as clusters within a larger virtual cluster so as to cooperatively complete computing tasks that are larger than individual devices could complete individually. And, for example, some self-propelled embodiments travel the seas together in relatively close proximity to one another, though not directly connected.

Drifting, and/or self-propelled, embodiments communicate with computers and/or networks on land, and/or with each other, by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure are deployed so as to be "virtually" interconnected to one or more other devices (e.g. by Wi-Fi, radio, microwave, modulated light, satellite links, etc.), and together to drift with the ambient winds, currents, and/or other environmental influences that will affect and/or alter its geolocation. Some embodiments of the present disclosure are deployed so as to be "virtually" interconnected to one or more other devices (e.g. by Wi-Fi, radio, microwave, modulated light, satellite links, etc.), and, because they are "self-propelled" and/or able to actively influence their geolocation, and/or changes in same, through their manipulation of ambient winds, currents, and/or other environmental influences. Some embodiments of the present disclosure are deployed so as to be tethered, and to be directly inter-connected, to one or more other devices, wherein one or more of the tethered devices are anchored and/or moored (e.g. to the seafloor) so as to remain approximately stationary, thereby limiting the range of motion and/or position of the entire tethered assembly.

Some embodiments, when directly and/or indirectly inter-connected with one or more other devices, whether drifting or anchored, will link their computers and/or computing networks, e.g. by means of satellite-mediated inter-device communications of data, so as to act, behave, cooperate, and/or compute, as subsets of a larger, integrated, and/or inter-connected set of computers. Some such inter-connected and/or cooperating embodiments utilize, and/or assign to, a single device (or subset of the inter-connected group of devices) to be responsible for a specific portion, part, and/or subset, of the system-level calculations, estimates, scheduling, data transmissions, etc., on which the group of devices depends.

Types of Propulsion

Some embodiments of the present disclosure propel themselves, at least in part, through their incorporation, use, and/or operation, of devices, technologies, modules, and/or propulsion systems, that include, but are not limited to:
rigid sails,
ducted fans,
electrical-motor-driven propellers,
sea anchors,
drogues,
water jets,
the drag forces imparted to an embodiment's one or more wind turbines,
submerged, tethered airplane-like kite and/or drone, and/or
inflatable water-filled (or emptied) sack.

Military/Rescue/Research

Some embodiments of the present disclosure present tethers, mooring lines, cables, and/or connectors, to which another vessel may attach, and/or moor, itself.

Some embodiments of the present disclosure present connectors, APIs, and/or other devices or components, by and/or through which energy may be transferred from the embodiments to another vessel. The vessels that receive such energy include, but are not limited to:
autonomous underwater vehicles, autonomous surface vessels, autonomous aircraft; and/or
manned underwater vehicles (e.g. submarines), manned surface vessels (e.g. cargo and/or container ships), and manned aircraft (e.g. helicopters).

Some of the vessels to which energy is transferred and/or transmitted possess weapons.

Some embodiments of the present disclosure detect, monitor, log, track, identify, and/or inspect (e.g. visually, audibly, and/or electromagnetically), other vessels passing within a sufficiently short to distance of a device such that at least some of the device's sensors are able to detect, analyze, monitor, identify, characterize, and/or inspect, such other vessels.

Aircraft operating near some embodiments are detected and/or characterized by means and/or methods that include, but are not limited to:
visually (e.g. with one or more cameras, detecting one or more wavelengths of light, including, but not limited to visible light and infrared light),
the detection of specific, e.g. engine-related, noises,
the detection of electromagnetic emissions and/or radiation (e.g. radio transmissions and heat),
the detection of gravimetric distortions,
the detection of magnetic distortions,
the detection of changes in ambient radioactivity,
the detection of gamma-ray emissions, and/or
the detection of noise and/or other vibrations induced in the water on which the device floats.

Surface vessels operating near some embodiments are detected and/or characterized by means and/or methods that include, but are not limited to:
visually (e.g. with one or more cameras, detecting one or more wavelengths of light, including, but not limited to visible light and infrared light),
the detection of specific, e.g. engine-related, noises and/or vibrations, especially those that might be transmitted through and/or in the water on which the device floats,
the detection of electromagnetic emissions and/or radiation (e.g. radio transmissions and heat),
the detection of gravimetric distortions,
the detection of magnetic distortions,
the detection of changes in ambient radioactivity,
the detection of gamma-ray emissions, and/or
the detection of observed changes in the behavior of local marine organisms (e.g. the direction in which a plurality of fish swim).

Sub-surface vessels operating near some embodiments are detected and/or characterized by means and/or methods that include, but are not limited to:
the detection of specific, e.g. engine-related, noises and/or vibrations, transmitted through and/or in the water on which the device floats,
the detection of electromagnetic emissions and/or radiation (e.g. radio transmissions and heat),
the detection of gravimetric distortions,
the detection of magnetic distortions,
the detection of changes in ambient radioactivity,
the detection of gamma-ray emissions,
the detection of changes in the behavior of local marine organisms (e.g. the direction in which a plurality of fish swim), and/or
the detection of changes in the volume and/or clarity of ambient noises nominally and/or typically generated by marine organisms, geological phenomena (e.g. volcanic and/or seismic events), current-induced noises (e.g. water movements around geological formations), and/or reflected noises (e.g. the noise of overpassing planes reflecting in specific patterns off the seafloor).

A plurality of devices able to exchange data, message, and/or signals, and/or otherwise interconnected, obtain high-resolution information about the nature, structure, behavior, direction, altitude and/or depth, speed, condition (e.g. damaged or fully functional), incorporation of weapons, etc., through the sharing and synthesis of the relevant data gathered from the unique perspectives of each device.

Some embodiments of the present disclosure transmit, e.g. via satellite, to a remote computer and/or server, the detection, nature, character, direction of travel, speed, and/or other attributes, of detected, monitored, tracked, and/or observed, other vessels. Some embodiments receive, e.g. via satellite, and respond to commands and/or requests for additional types of observations, sensor readings, and/or responses, including, but not limited to: the firing of missiles, the firing of lasers, the emission of electromagnetic signals intended to jam certain radio communications, the firing of torpedoes, the vigilant tracking of specific vessels (e.g. a prioritization of the tracking and/or monitoring of specific vessels over other nearby vessels), the release of tracking devices, the emission of misleading electromagnetic transmissions (e.g. to mislead GPS readings, to mimic radio beacons and/or radars, etc.) . . . even the self-destruction of the embodiments themselves.

Some embodiments of the present disclosure present connectors, APIs, and/or other devices or components, by and/or through which data may be exchanged between the embodiment and another vessel. Such other vessels utilize such a data connection in order to obtain cached data, messages, signals, commands, and/or instructions, including some which are encrypted, transmitted to the device from a remote source and/or server, and stored within the device, and/or within a plurality of devices, any one of which may be accessed by another vessel for the purpose of obtaining command and control information.

Such embodiments facilitate the transmission of data, messages, status reports, and/or signals, preferably encrypted, from the other vessels to the remote source and/or server, especially by masking the source of any such transmission within equivalent, but potentially meaningless, transmissions from a plurality, if not from all, other devices. If all of the devices of such an embodiment regularly transmit blocks of encrypted and/or fictitious data to a particular remote source and/or server, then the replacement of one device's block of data with actual data (the nature and/or relevance of which might only be discernable to a receiver with one or more appropriate decryption keys, algorithms, and/or parameters) will effectively hide the location of any and/or all such other vessels with respect to the detection of such data transmissions. This mechanism of hiding the location of a device to which another vessel is connected is particularly useful when the other vessel is a submersible and/or submarine, since it would presumably also be hidden from visual and (while at rest, connected to a device) audio detection.

Dual-Purpose Buoys

Some embodiments of the present disclosure, when deployed in anchored farms of devices, will send electricity back to an onshore electrical power grid via a subsea electrical power cable. However, when the electrical demands of that terrestrial grid are not high, and/or the price of electrical power sold into that grid is too low, then some or all of the devices in the farm may perform computations, such as Bitcoin mining and/or arbitrary or custom computational tasks for third parties, in order to generate revenue and/or profits.

Some embodiments of the present disclosure, when deployed in anchored farms of devices, or when free-floating, especially as individual devices, will primarily generate and store electrical energy that may then be transmitted conductively and/or inductively to autonomous vessels and/or aircraft (i.e. "drones") via charging connections and/or pads. However, when any connected drones are fully charged and/or a device's energy stores are full, then the device may consume any surplus generated electrical power performing computations, such as Bitcoin mining and/or arbitrary or custom computational tasks for third parties, in order to generate revenue and/or profits. Such a dual purpose may also facilitate the role of device in charging drones, and/or may facilitate the hiding of drones when the ratio of devices to drones is high.

Some embodiments of the present disclosure, when deployed in anchored farms of devices, or when free-floating, especially as individual devices, will primarily energize, operate, and monitor various sensors, such as, but not limited to: sonar, radar, cameras, microphones, hydrophones, antennae, gravimeters, magnetometers, and Geiger counters, in order to monitor their environments (air and water) in order to detect, monitor, characterize, identify, and/or track other vessels and/or aircraft. However, when there are no proximate vessels and/or aircraft to track, then a device might utilize some of its underutilized electrical energy (and computational power) in order to perform computations, such as Bitcoin mining and/or arbitrary or custom computational tasks for third parties, in order to generate revenue and/or profits.

Wind and Waves

Some embodiments of the present disclosure, energize their constituent computational circuits, devices, modules, and/or systems, at least in part, with energy extracted from both winds and waves. For example, some embodiments utilize both wind turbines and wave energy conversion devices in order to power their computational circuits.

UTILITY

The current disclosure offers many potential benefits, including, but not limited to: a decoupling of computing power (e.g. available CPUs and/or instructions per second) from the typically correlated supporting and/or enabling requirements, e.g., such as those associated with the construction, operation, and/or maintenance, of data centers and/or server farms.

These requirements include the need that sufficient electrical power be provided to energize a large number of computers. In order to transmit large amounts of electrical power into concentrated collections of computers, it is typically necessary to bring the power to the collections of computers at a high voltage and/or a high current. However, since individual computers, computing devices, and/or computing circuits, require electrical power that is typically of a lower voltage and/or current, it is often necessary and/or preferred to partition the high-energy electrical power into multiple circuits of lower-energy power. These changes in voltage and/or current can result in some loss of energy and/or efficiency.

These requirements include the need to remove heat, and/or introduce cooling, fast enough to compensate for the significant amounts of heat that are generated by highly concentrated and extensive collections of electrically-powered computing devices. Such cooling is relatively energy intensive, e.g. significant electrically-powered refrigeration, fans, pumped liquid heat exchangers, etc.

Embodiments of the present disclosure obtain relatively small amounts of electrical power from winds and utilize that electrical power to energize a relatively small number of computing devices. By contrast with large, highly-concentrated, collections of computers, the computers within embodiments of the current disclosure are able to be energized with electrical power that, at least approximately, matches electrical requirements of the computers, i.e. there is no need to transmit highly-energetic electrical power from distant sources before reducing that power down to voltages and/or currents that are compatible with the computers to be energized.

Some embodiments of the present disclosure achieve and/or satisfy all of their cooling requirements through purely passive and convective and/or conductive cooling. Thermally-conductive walls and/or pathways facilitate the natural transmission of heat from the computing devices to the air and/or water outside the device. A relatively smaller number of devices means relatively less heat is generated. And, the proximity of a heat sink of significant capacity (i.e. the water on which the device floats) means that the removal of these relatively small amounts of heat conductively and/or convectively is achieved with great efficiency and in the absence of any additional expenditures of energy.

The current disclosure increases the modularity of clusters of computing devices by not only isolating them physically, but also by powering them independently and autonomously, and by cooling them passively. Through the creation and deployment of additional self-powered computing buoys, a computing capability can be scaled in an approximately linear fashion, typically, if not always, without the non-linear and/or exponential support requirements and/or consequences, e.g. cooling, that might otherwise limit an ability to grow a less modular architecture and/or embodiment of computing resources.

The current disclosure provides a useful application for wind-energy conversion devices that requires significantly less capital expenditures and/or infrastructure. For instance, a free-floating and/or drifting device of the current disclosure can continuously complete computational tasks, such as calculating Bitcoin ledgers and associated nonce values, while floating freely in very deep water (e.g. 3 miles deep) in the middle of an ocean, hundreds or thousands of miles from shore. Such an application does not depend upon, nor require, a subsea power cable to send electrical power to shore. It does not require extensive mooring and/or the deployment of numerous anchors in order to fix the position of a device, e.g. so that it can be linked to a subsea power cable.

By providing alternate computational resources, that draw their power directly from the environment, and by completing computational tasks currently executed in terrestrial clusters of computers, the amount of electrical power required on land can be reduced. And, thereby, the amount of electrical power generated through the consumption of fossil fuels, and the concomitant generation of greenhouse gases, can be reduced.

All potential variations in sizes, shapes, thicknesses, materials, orientations, methods, mechanisms, procedures, processes, electrical characteristics and/or requirements, and/or other embodiment-specific variations of the general inventive designs, structures, systems, and/or methods disclosed herein are included within the scope of the present disclosure.

We claim:

1. A buoyant proof-of-work computation apparatus, comprising:
   a buoyant member;
   a wind-to-electrical-energy converter mounted on the buoyant member;
   a plurality of integrated circuits, said plurality of integrated circuits energized by the wind-to-electrical-energy converter and adapted for identifying cryptocurrency proof-of-work values.

2. The buoyant proof-of-work apparatus of claim 1, further comprising a data communication system mounted on the buoyant member for communicating computational task specifications to the plurality of integrated circuits.

3. The buoyant proof-of-work apparatus of claim 2, wherein the data communication system includes an antenna.

4. The buoyant proof-of-work apparatus of claim 1, wherein the buoyant member is a spar buoy and the wind-to-electrical-energy converter includes a wind turbine and an electrical generator.

5. The buoyant proof-of-work apparatus of claim 1, further comprising an activation system, and wherein application-specific integrated circuits are turned on by the activation system in response to an increase in electrical power from the wind-to-electrical-energy converter.

6. The buoyant proof-of-work apparatus of claim 1, wherein the plurality of integrated circuits is specialized for calculating hash values for obtaining valid blockchain blocks.

7. The buoyant proof-of-work apparatus of claim 1, wherein the plurality of integrated circuits is disposed below a mean waterline of the buoyant proof-of-work apparatus.

8. The buoyant proof-of-work apparatus of claim 7, further comprising a submerged heat exchanger adapted to communicate heat from the plurality of integrated circuits to a body of water.

9. The buoyant proof-of-work apparatus of claim 1, further comprising a compartment mounted on the buoyant structure and housing an immersion liquid having boiling point lower than that of water, and wherein the plurality of integrated circuits warms the immersion liquid to dissipate heat.

10. A buoyant machine learning apparatus, comprising:
    a buoyant member;
    a wind-to-electrical-energy converter mounted on the buoyant member;
    a plurality of integrated circuits, said plurality of integrated circuits energized by the wind-to-electrical-energy converter and adapted for training of a machine learning model; and
    a data communication system mounted on the buoyant member for communicating machine learning task specifications to the plurality of integrated circuits.

11. The buoyant machine learning apparatus of claim 10, wherein the data communication system includes an antenna.

12. The buoyant machine learning apparatus of claim 10, wherein the buoyant member is a spar buoy and the wind-to-electrical-energy converter includes a wind turbine and an electrical generator.

13. The buoyant machine learning apparatus of claim 10, further comprising an activation system, and wherein the integrated circuits are turned on by the activation system in response to an increase in available electrical power from the wind-to-electrical-energy converter.

14. The buoyant machine learning apparatus of claim 10, wherein the plurality of integrated circuits is specialized for training of a neural network.

15. The buoyant machine learning apparatus of claim 10, wherein the plurality of integrated circuits is specialized for performing tensor operations.

16. The buoyant machine learning apparatus of claim 10, wherein the plurality of integrated circuits is disposed below a mean waterline of the buoyant machine learning apparatus.

17. The buoyant machine learning apparatus of claim 10, further comprising a submerged heat exchanger adapted to communicate heat from the plurality of integrated circuits to a body of water.

18. The buoyant machine learning apparatus of claim 10, further comprising a compartment mounted on the buoyant structure and housing an immersion liquid having boiling point lower than that of water, and wherein the plurality of integrated circuits warms the immersion liquid to dissipate heat.

19. A marine cryptocurrency mining system, comprising:
a buoyant computing apparatus; and
a remote task administrator computer;
wherein the buoyant computing apparatus includes a buoyant member, a wind-to-electrical-energy converter mounted on the buoyant member, and a plurality of integrated circuits mounted on the buoyant member;
wherein the plurality of integrated circuits is energized by the wind-to-electrical-energy converter and configured for identifying blockchain nonce values; and
wherein the remote task administrator computer is configured to transmit blockchain parameters to the buoyant computing apparatus for identifying blockchain nonce values.

20. The marine cryptocurrency mining system of claim 19, further comprising a data reception antenna mounted on the buoyant member, and wherein the remote task administrator computer transmits encoded blockchain block header specifications to the buoyant hashing apparatus via the data reception antenna.

21. The marine cryptocurrency mining system of claim 20 wherein the remote task administrator computer transmits encoded blockchain transaction parameters to the buoyant hashing apparatus via the data reception antenna.

22. The marine cryptocurrency mining system of claim 19, further comprising an activation system, and wherein application-specific integrated circuits are turned on by the activation system in response to an increase in available electrical power.

23. A marine machine learning processing system, comprising:
a buoyant machine learning apparatus; and
a remote task administrator computer;
wherein the buoyant machine learning apparatus includes a buoyant member, a wind-to-electrical-energy converter mounted on the buoyant member, and a plurality of integrated circuits mounted on the buoyant member;
wherein the plurality of integrated circuits is energized by the wind-to-electrical-energy converter and configured for training of a machine learning model; and
wherein the remote task administrator computer is configured to transmit machine learning task specifications to the buoyant machine learning apparatus for processing.

24. The marine machine learning processing system of claim 23, wherein the buoyant member is a spar buoy.

25. The marine machine learning processing system of claim 23, further comprising an activation system, and wherein the integrated circuits are turned on by the activation system in response to an increase in available electrical power.

26. The marine machine learning processing system of claim 23, further comprising a compartment mounted on the buoyant member and housing an immersion liquid having boiling point lower than that of water, and wherein the plurality of integrated circuits warms the immersion liquid to dissipate heat.

27. The marine machine learning processing system of claim 23, further comprising a data reception antenna mounted on the buoyant member, and wherein the remote task administrator computer transmits encoded machine learning task specifications to the buoyant machine learning apparatus via the data reception antenna.

28. The marine machine learning processing system of claim 23, wherein said plurality of application-specific integrated circuits is configured for training of a neural network.

29. The marine machine learning processing system of claim 23, wherein said plurality of application-specific integrated circuits is specialized for performing tensor operations.

30. A wind-powered marine task processor, comprising:
a buoyant computing apparatus having a buoyant structure, a wind turbine mounted on the buoyant structure, a power-take-off, and a plurality of computing processors;
said buoyant computing apparatus adapted to float adjacent to an upper surface of a body of water;
said wind turbine configured to rotate in response to wind impinging upon the wind turbine;
said power-take-off operatively connected to the wind turbine such that the power-take-off generates electrical power in response to rotation of the wind turbine;
said plurality of computing processors being energized by electrical power generated by the power-take-off;
said plurality of computing processors configured to produce computational results by the execution of computational tasks specified by encoded signals received by the buoyant computing apparatus;
wherein the buoyant computing apparatus receives, via encoded signals, computational tasks; and
wherein the buoyant computing apparatus transmits, via encoded signals, computational results derived from received computational tasks.

31. The wind-powered marine task processor of claim 30, wherein the power-take-off includes an electrical generator.

32. The wind-powered marine task processor of claim 30, wherein the wind turbine is a horizontal axis wind turbine.

33. The wind-powered marine task processor of claim 30, wherein the plurality of computing processors is disposed below a mean waterline of the buoyant computing apparatus.

34. The wind-powered marine task processors of claim 30, further comprising a propulsion system mounted on the buoyant structure for moving the buoyant computing apparatus on a body of water.

35. The wind-powered marine task processor of claim 30, wherein the plurality of computing processors includes application-specific integrated circuits adapted for calculating cryptographic hash values for producing valid blockchain blocks.

36. The wind-powered marine task processor of claim 30, wherein the plurality of computing processors includes application-specific integrated circuits adapted for training a neural network.

37. The wind-powered marine task processor of claim 30, wherein the plurality of computing processors includes application-specific integrated circuits adapted for performing inference using a neural network.

38. The wind-powered marine task processor of claim 30, wherein the plurality of computing processors is configured for brain simulation.

39. The wind-powered marine task processor of claim 30, further comprising a compartment mounted on the buoyant structure and housing an immersion liquid having boiling point lower than that of water, and wherein the plurality of computing processors warms the immersion liquid to dissipate heat.

40. The wind-powered marine task processor of claim 30, further comprising an activation system, and wherein computing processors are turned on by the activation system in response to an increase in available electrical power.

41. The wind-powered marine task processor of claim 30, further comprising a data communication system for communicating computational task specifications to the buoyant computing apparatus.

42. The wind-powered marine task processor of claim 41, wherein the data communication system includes a phased array antenna coupled to the buoyant computing apparatus.

43. The wind-powered marine task processor of claim 41, wherein the data communication system includes a 5G antenna coupled to the buoyant computing apparatus.

44. The wind-powered marine task processor of claim 41, further comprising a data reception computer positioned upon land and a remote receiving antenna positioned upon land, and wherein the data reception computer processes computational results received from the plurality of computing processors via the remote receiving antenna.

45. The wind-powered marine task processor of claim 41, further comprising a data reception computer positioned upon land and a remote receiving antenna positioned upon land, and wherein the data reception computer relays to a computer network computational results received from the plurality of computing processors via the remote receiving antenna.

46. The wind-powered marine task processor of claim 41, further comprising a submerged heat exchanger for dissipating heat from the plurality of computing processors to a body of water.

47. The wind-powered marine task processor of claim 41, further comprising a heat exchanger disposed above a mean waterline of the buoyant computing apparatus for dissipating heat from the plurality of computing processors to the atmosphere.

48. The wind-powered marine task processor of claim 41, wherein the power-take-off includes a battery.

49. The wind-powered marine task processor of claim 41, further comprising a task administrator computer positioned upon land and a remote transmission antenna positioned upon land, and wherein the task administrator computer operates with the remote transmission antenna to transmit computational task specifications to the plurality of computing processors via the remote transmission antenna.

50. The wind-powered marine task processor of claim 41, wherein the plurality of computing processors is configured to produce a computational result selected from the group consisting of a parameter of a neural network, a parameter of a machine learning model, a parameter of an artificially intelligent system, a cryptocurrency hash value, and a mathematical model parameter consistent with a set of data values.

51. The wind-powered marine task processor of claim 41, wherein the plurality of computing processors includes at least 50 processing units selected from the group consisting of central processing units (CPUs), graphics processing units (GPUs), tensor processing units (TPUs), application-specific integrated circuits (ASICs), and quantum processing units (QPUs).

52. The wind-powered marine task processor of claim 41, wherein at least 50% of the electrical power generated by the power-take-off is consumed by the plurality of computing processors.

53. The wind-powered marine task processor of claim 41, further comprising a submerged electrical cable and connector adapted for coupling with a submerged vessel.

54. The wind-powered marine task processor of claim 41, further comprising a submerged data transmission cable and connector adapted for coupling with a submerged vessel.

55. The wind-powered marine task processor of claim 41, further comprising a local data reception antenna mounted to the buoyant structure, and wherein the buoyant computing apparatus is configured to receive electromagnetically encoded computational task specifications via the local data reception antenna.

56. The wind-powered marine task processor of claim 41, wherein the buoyant structure is a spar buoy.

57. The wind-powered marine task processor of claim 56, wherein the buoyant computing apparatus is adapted to float with a draft at least five times greater than a widest submerged width of the buoyant structure.

58. A buoyant computing apparatus, comprising:
a buoyant member;
a wind-to-electrical-energy converter mounted on the buoyant member;
a computing device powered by the wind-to-electrical-energy converter for generating status information of the buoyant computing apparatus and communicating status information of the buoyant computing apparatus to a remote receiver; and
a plurality of computing processors mounted on the buoyant member, said plurality of computing circuits energized by the wind-to-electrical-energy converter and configured to perform computational processing unrelated to generating and communicating status information of the buoyant computing apparatus.

59. The buoyant computing apparatus of claim 58, wherein the plurality of computing processors is configured to derive a computational result selected from the group consisting of a parameter of a neural network, a parameter of a machine learning model, a parameter of an artificially intelligent system, an inference output of a neural network, an inference output of a machine learning model, and inference output of an artificially intelligent system, a cryptocurrency hash value, and a mathematical model consistent with a set of data values.

* * * * *